United States Patent
Kim et al.

(10) Patent No.: US 9,344,247 B2
(45) Date of Patent: May 17, 2016

(54) METHOD FOR TRANSMITTING AND RECEIVING UE-SPECIFIC REFERENCE SIGNAL AND APPARATUS FOR SAME

(75) Inventors: Dongcheol Kim, Anyang-si (KR);
Hangyu Cho, Anyang-si (KR);
Seunghee Han, Anyang-si (KR);
Minseok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 14/342,702

(22) PCT Filed: Sep. 10, 2012

(86) PCT No.: PCT/KR2012/007268
§ 371 (c)(1),
(2), (4) Date: Mar. 4, 2014

(87) PCT Pub. No.: WO2013/036090
PCT Pub. Date: Mar. 14, 2013

(65) Prior Publication Data
US 2015/0003346 A1    Jan. 1, 2015

Related U.S. Application Data

(60) Provisional application No. 61/532,558, filed on Sep. 9, 2011.

(51) Int. Cl.
*H04W 4/00* (2009.01)
*H04L 5/00* (2006.01)
*H04L 25/02* (2006.01)

(52) U.S. Cl.
CPC .............. *H04L 5/0051* (2013.01); *H04L 5/001* (2013.01); *H04L 25/022* (2013.01)

(58) Field of Classification Search
CPC ........................................................ H04W 28/04
USPC ............................................................ 370/329
See application file for complete search history.

(56) References Cited

U.S. PATENT DOCUMENTS

| 2005/0208889 A1* | 9/2005 | Baker | H04B 7/155 455/7 |
| 2011/0019635 A1* | 1/2011 | Park | H04L 5/0048 370/329 |

(Continued)

FOREIGN PATENT DOCUMENTS

| KR | 10-2009-0105789 A | 10/2009 |
| KR | 10-2010-0069556 A | 6/2010 |
| KR | 10-2010-0078232 A | 7/2010 |

(Continued)

*Primary Examiner* — Christopher R Crompton
(74) *Attorney, Agent, or Firm* — Birch, Stewart, Kolasch & Birch, LLP

(57) ABSTRACT

Disclosed are a method for transmitting and receiving a UE-specific reference signal and an apparatus for same. A method for a base station transmitting the UE-specific reference signal in a wireless communication system, according to one embodiment of the present invention, comprises a step of the base station transmitting the UE-specific reference signal to the UE by using a pre-determined pattern, wherein the pre-determined pattern can be a pattern which is mapped onto an RE, in which the UE-specific reference index is an index including symbol indexes 0, 3 and 6 from an even-numbered index slot within one resource block (RB), or mapped onto an RE in which the UE-specific reference index is an index including symbol indexes 2 and 5 from an odd-numbered index slot within the RB.

6 Claims, 110 Drawing Sheets

(56) References Cited

U.S. PATENT DOCUMENTS

2011/0274067 A1  11/2011  Lee et al.
2012/0120905 A1*  5/2012  Ko ........................ H04B 7/0413
                                                                370/329

FOREIGN PATENT DOCUMENTS

| WO | WO 2010/077042 A2 | | 7/2010 |
| WO | WO 2010/106923 A1 | | 9/2010 |
| WO | WO 2011/019242 A2 | * | 2/2011 |

* cited by examiner

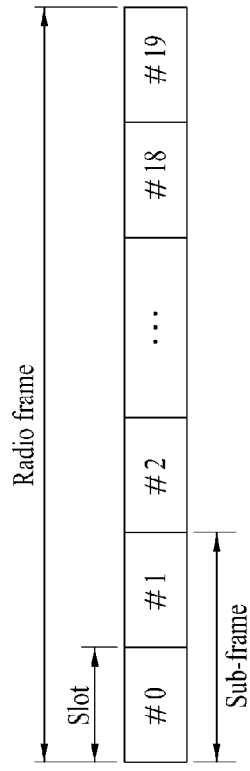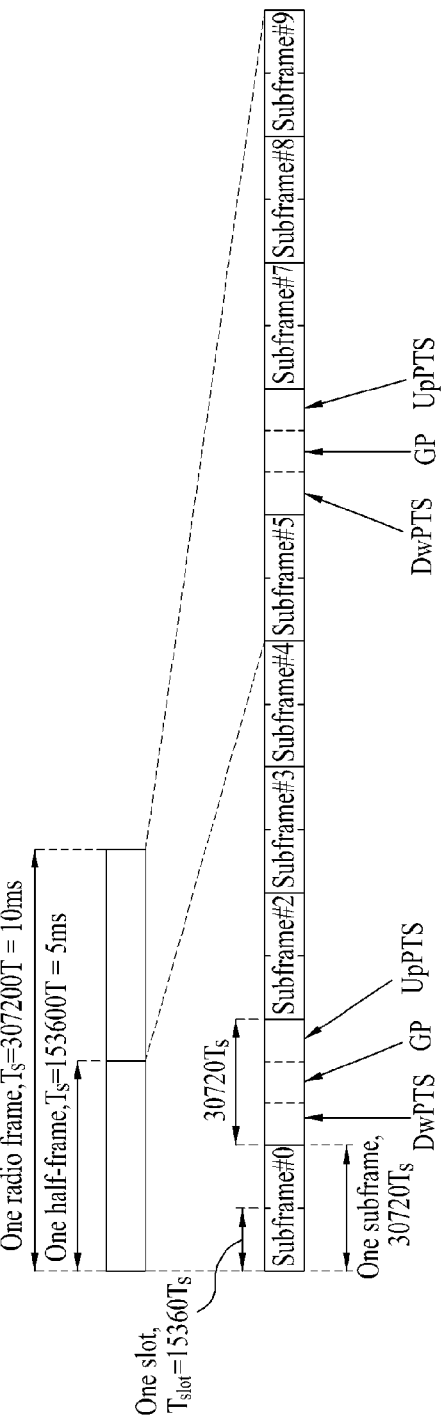

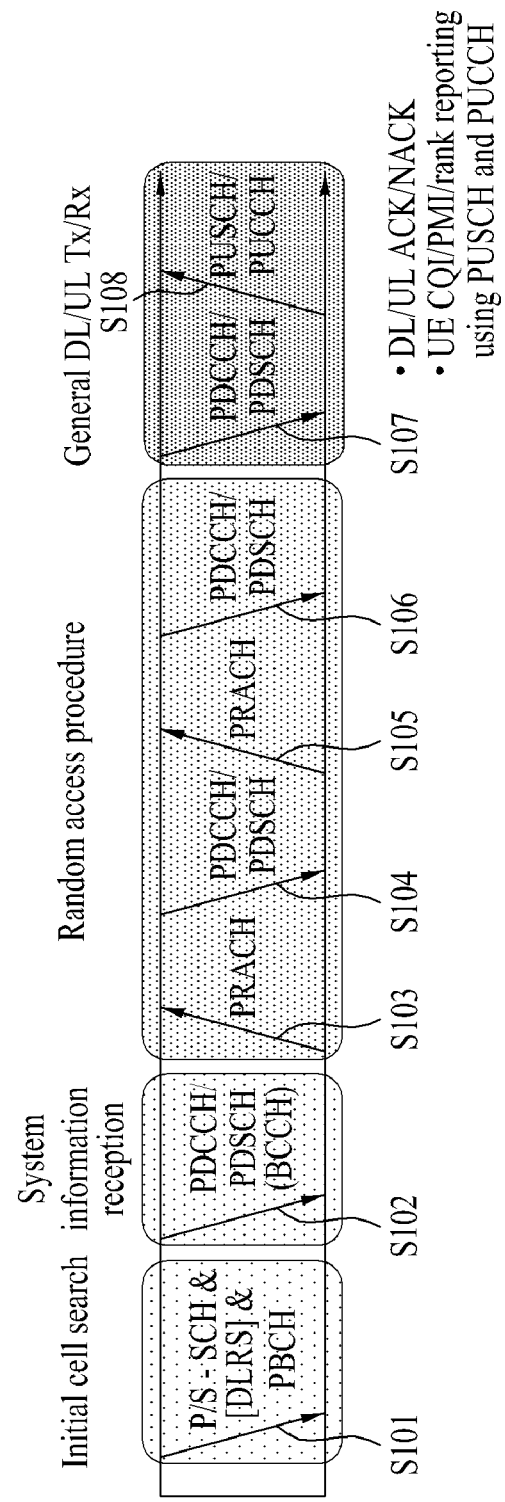

FIG. 7
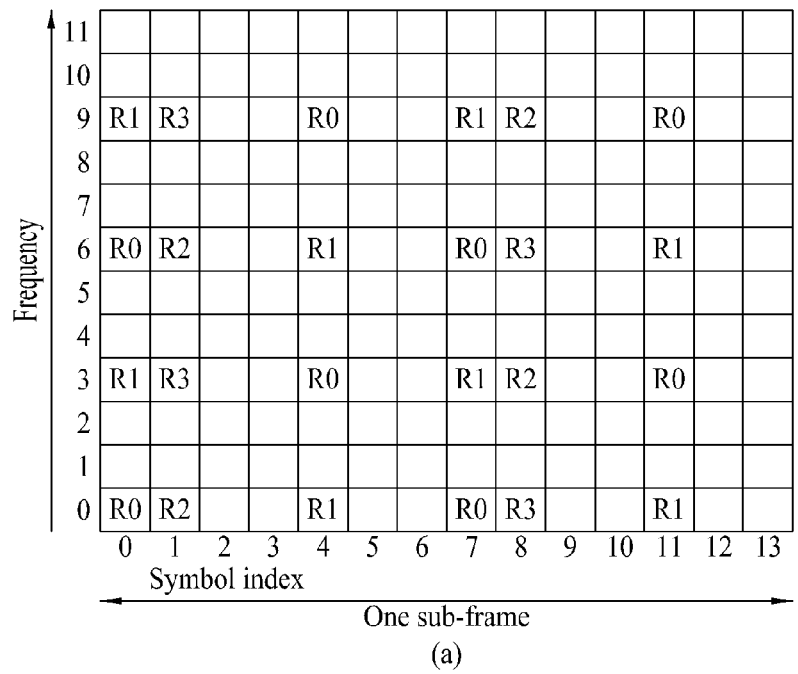
(a)
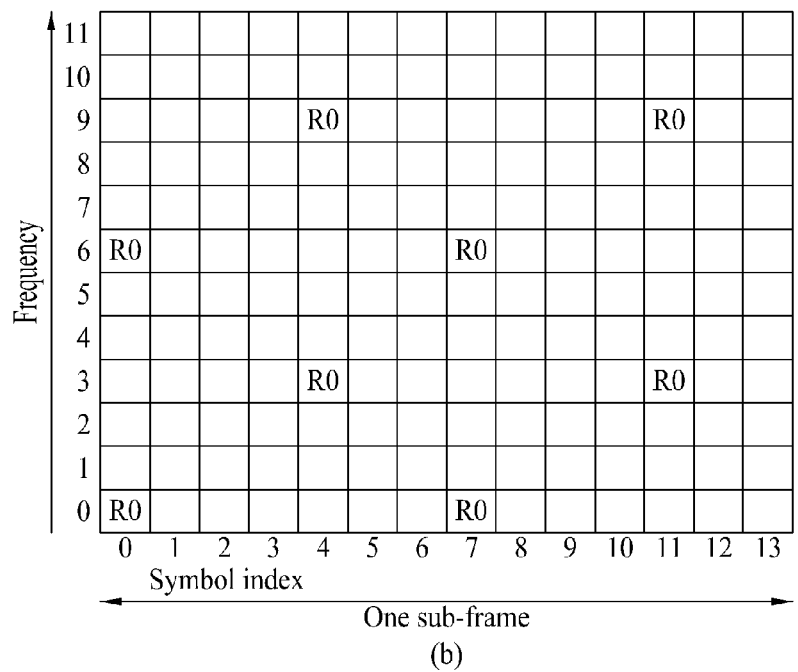
(b)

FIG. 27B
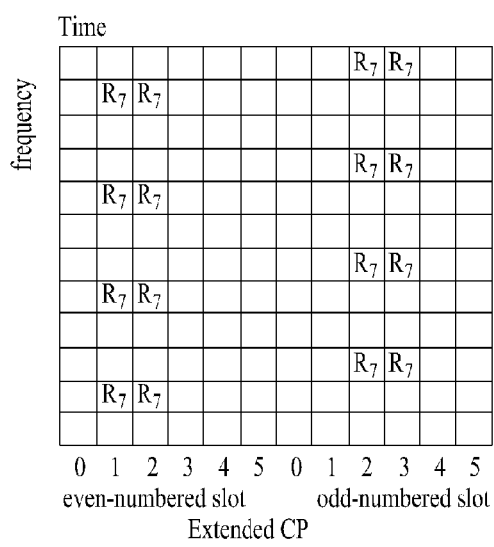
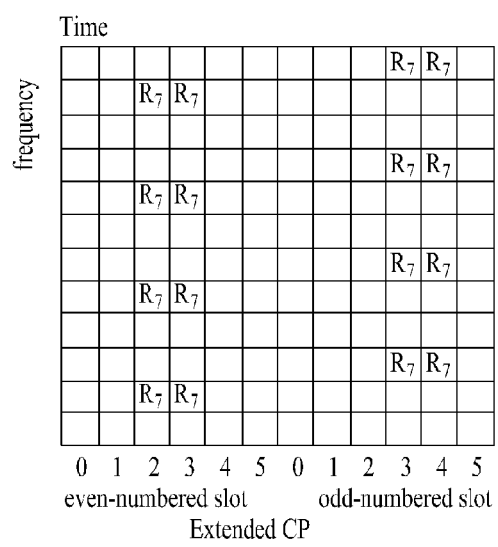

METHOD FOR TRANSMITTING AND RECEIVING UE-SPECIFIC REFERENCE SIGNAL AND APPARATUS FOR SAME

This application is the National Phase of PCT/KR2012/007268 filed on Sep. 10, 2012, which claims priority under 35 U.S.C. 119(e) to U.S. Provisional Application No. 61/532,558 filed on Sep. 9, 2011, all of which are hereby expressly by reference into present application.

TECHNICAL FIELD

The present invention relates to wireless communication and, more particularly, to a method for transmitting and receiving a UE-specific reference signal and an apparatus for the same.

BACKGROUND ART

LTE-A, the standard of next-generation mobile communication systems, supports CoMP (coordinated multi-point) and MU-MIMO (multi-user MIMO) to improve data throughput. Here, CoMP refers to a scheme by which two or more base stations (BSs) or cells cooperate with each other to communicate with UEs in order to improve communication performance of UEs and BSs (cells or sectors) located in a gap. CoMP may be classified into CoMP-JP processing (CoMP-JP) in the form of cooperative MIMO through data sharing and CoMP-coordinated scheduling/beamforming (CoMP-CS). According to CoMP-JP, a UE can instantaneously receive data from BSs performing CoMP at the same time and combine signals received from the BSs to improve reception performance. According to CoMP-CS, the UE can instantaneously receive data from one BS through beamforming. MU-MIMO is a scheme through which a BS allocates antenna resources to UEs. According to MU-MIMO, the BS selects a UE capable of achieving high data throughput per antenna and schedules the UE. MU-MIMO improve system throughput.

In addition, next-generation LTE-A is designed to accomplish transmission of a large amount of data. LTE-A employs carrier aggregation (CA) to aggregate a plurality of component carriers (CCs) and to perform transmission through the CCs, thereby improving transmission bandwidth of a UE and increasing frequency use efficiency. LTE-A can extend a bandwidth up to 100 MHz by aggregating a plurality of carriers (i.e. multi-carrier) used in LTE Rel-8/9. In other words, a carrier defined as up to 20 MHz in LTE Rel-8/9 is redefined as a component carrier (or element carrier) and up to 5 component carriers (CCs) can be used by one UE through CA.

A new carrier type is introduced with the introduction of CA. Data instead of control information may be loaded at the start of a specific subframe of a carrier of the new carrier type.

However, a control channel was disposed at the start of a conventional subframe and a UE-specific reference signal mapping pattern was proposed only for this case and a UE-specific mapping pattern for a case in which data instead of the control channel is loaded at the start of the subframe has not been suggested.

DISCLOSURE

Technical Problem

An object of the present invention devised to solve the problem lies in a method by which a BS transmits a UE-specific reference signal in a wireless communication system.

Another object of the present invention is to provide a method by which a UE receives a UE-specific reference signal in a wireless communication system.

Still another object of the present invention is to provide a BS for transmitting a UE-specific reference signal in a wireless communication system.

Yet another object of the present invention is to provide a UE for receiving a UE-specific reference signal.

The technical problems solved by the present invention are not limited to the above technical problems and those skilled in the art may understand other technical problems from the following description.

Technical Solution

The object of the present invention can be achieved by providing a method for transmitting a user equipment (UE)-specific reference signal by a base station (BS) in a wireless communication system, the method including transmitting the UE-specific reference signal to a UE using a predetermined pattern, wherein the predetermined pattern is a pattern in which the UE-specific reference signal is mapped to reference elements (REs) corresponding to indices including symbol indices 0, 3 and 6 in an even-numbered index slot in one resource block (RB) and mapped to REs corresponding to indices including symbol indices 2 and 5 in an odd-numbered index slot in the RB. The predetermined pattern may be applied to a subframe to which a normal cyclic prefix (CP) is applied. The UE-specific reference signal may be mapped to REs corresponding to subcarrier indices 1, 5 and 9 or subcarrier indices 3, 7 and 11 among the REs corresponding to the indices including the symbol indices 0, 3 and 6 in the predetermined pattern.

In another aspect of the present invention, provided herein is a method for transmitting a user equipment (UE)-specific reference signal by a base station (BS) in a wireless communication system, the method including transmitting the UE-specific reference signal to a UE using a predetermined pattern, wherein the predetermined pattern is a pattern in which the UE-specific reference signal is mapped to REs corresponding to indices including symbol indices 1 and 4 per slot in one resource block (RB). The predetermined pattern may be applied to a subframe to which an extended CP is applied. The UE-specific reference signal may be mapped to REs corresponding to subcarrier indices 0, 3, 6 and 9 or subcarrier indices 2, 5, 6 and 11 among the REs corresponding to the indices including the symbol indices 1 and 4 in the predetermined pattern.

In another aspect of the present invention, provided herein is a method for receiving a UE-specific reference signal by a user equipment (UE) in a wireless communication system, the method including receiving the UE-specific reference signal from a base station (BS) using a predetermined pattern, wherein the predetermined pattern is a pattern in which the UE-specific reference signal is mapped to REs corresponding to indices including symbol indices 0, 3 and 6 in an even-numbered index slot in one resource block (RB) and mapped to REs corresponding to indices including symbol indices 2 and 5 in an odd-numbered index slot in the RB.

In another aspect of the present invention, provided herein is a method for receiving a user equipment (UE)-specific reference signal by a user equipment (UE) in a wireless communication system, the method including receiving the UE-specific reference signal from a base station (BS) using a predetermined pattern, wherein the predetermined pattern is a pattern in which the UE-specific reference signal is mapped to REs corresponding to indices including symbol indices 1 and 4 per slot in one RB.

In another aspect of the present invention, provided herein is a base station (BS) for transmitting a user equipment (UE)-specific reference signal in a wireless communication system, including a transmitter for transmitting the UE-specific reference signal to a user equipment (UE) using a predetermined pattern, wherein the predetermined pattern is a pattern in which the UE-specific reference signal is mapped to REs corresponding to indices including symbol indices 0, 3 and 6 in an even-numbered index slot in one RB and mapped to REs corresponding to indices including symbol indices 2 and 5 in an odd-numbered index slot in the RB.

In another aspect of the present invention, provided herein is a user equipment (UE) for receiving a UE-specific reference signal in a wireless communication system, including a receiver for receiving the UE-specific reference signal from a base station (BS) using a predetermined pattern, wherein the predetermined pattern is a pattern in which the UE-specific reference signal is mapped to REs corresponding to indices including symbol indices 0, 3 and 6 in an even-numbered index slot in one RB and mapped to REs corresponding to indices including symbol indices 2 and 5 in an odd-numbered index slot in the RB.

Advantageous Effects

According to embodiments of the present invention, it is possible to prevent data demodulation performance deterioration and to enable efficient communication even when data instead of a downlink control channel is disposed at the start of a subframe.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 2A illustrates a radio frame structure for use in 3GPP LTE ($3^{rd}$ generation partnership project long term evolution);

FIG. 2B illustrates frame structure type 2 for use in 3GPP LTE;

FIG. 6 illustrates physical channels used in a 3GPP LTE and a signal transmission method using the same;

FIG. 7 illustrates a CRS pattern used in 3GPP LTE;

FIGS. 27A to 27H illustrate UE-specific reference signal mapping patterns for antenna port 7 in the case of all downlink subframes other than the special subframe, to which the extended CP is applied;

BEST MODE

Figure 1:
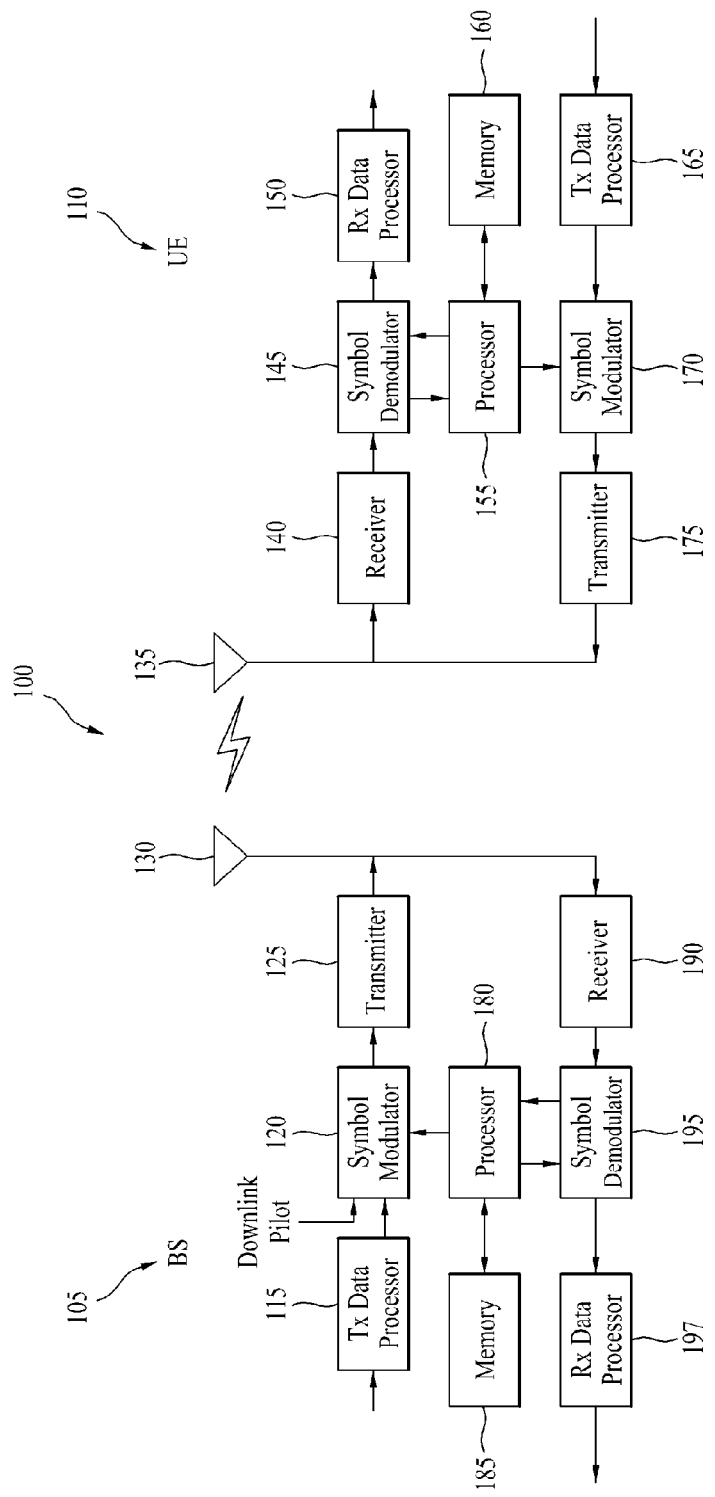
FIG. 1 is a block diagram showing configurations of a BS 105 and a UE 110 in a wireless communication system 100.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term 'base station (BS)' is assumed to refer to any node of a network end, such as a Node B, eNode B, an access point (AP), etc., communicating with a UE. In the specification, the BS may include a cell, a sector, etc.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is based on 3GPP LTE/LTE-A for clarity, the technical spirit of the present invention is not limited thereto. In addition, it should be noted that specific terms disclosed in the present invention are proposed for convenience of description and better understanding of the present invention, and the use of these specific terms may be changed to other formats within the technical scope or spirit of the present invention.

FIG. 1 is a block diagram illustrating configurations of a BS 105 and a UE 110 in a wireless communication system 100.

While one BS 105 and one UE 110 are shown in FIG. 1 to simplify the configuration of the wireless communication system 100, the wireless communication system 100 may obviously include one or more BSs and/or one or more UEs.

Referring to FIG. 1, the BS 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, the BS 105 and the UE 110 include multiple antennas. Hence, the BS 105 and the UE 110 support MIMO (Multiple Input Multiple Output). Furthermore, the BS 105 may support both single user-MIMO (SU-MIMO) and multi-user-MIMO (MU-MIMO) in the present invention.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180.

When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the network exchange RRC messages through the RRC layer.

FIG. 2A illustrates a radio frame structure used in 3GPP LTE.

Referring to FIG. 2A, a radio frame has a duration of 10 ms (327200 Ts) and is composed of 10 subframes of equal size. Each subframe is 1 ms in duration and consists of 2 slots. Each slot is 0.5 ms (15360 Ts) in duration. Here, Ts is sampling time and is represented by Ts=1/(15 kHz×2048)=3.2552× $10^{-8}$ (about 33 ns). A slot includes a plurality of OFDM symbols or SC-FDMA symbols in the time domain and includes a plurality of resource blocks (RBs) in the frequency domain.

In LTE, one RB includes 12 subcarrier×7(6) OFDM symbols or single carrier-frequency division multiple access (SC-FDMA) symbols. A transmit time interval (TTI), a unit time for which data is transmitted, can be determined as one or more subframes. The above-described radio frame structure is exemplary and the number of subframes included in a radio frame, the number of slots included in a subframe and the number of OFDM symbols or SC-FDMA symbols included in a slot can be varied.

FIG. 2B illustrates frame structure type 2 for use in 3GPP LTE.

Referring to FIG. 2B, frame structure type 2 is applied to TDD. As shown in FIG. 2*a*, a radio frame has a duration of 10 ms (327200 Ts) and is composed of 10 subframes of equal size. Each subframe is 1 ms in duration and consists of 2 slots. Each slot is 0.5 ms (15360 Ts) in duration. Here, Ts is sampling time and is represented by Ts=1/(15 kHz×2048) =3.2552×$10^{-8}$ (about 33 ns).

Each half frame includes 5 subframes. A subframe denoted by "D" is a subframe for downlink transmission, a subframe denoted by "U" is a subframe for uplink transmission, a subframe denoted by "S" is a special subframe composed of a downlink pilot time slot (DwPTS), a guard period (GP), and an uplink pilot time slot (UpPTS). The DwPTS is used for initial cell search, synchronization or channel estimation at a UE. The UpPTS is used for channel estimation in BS and UL transmission synchronization acquisition in a UE. The GP eliminates UL interference caused by multi-path delay of a DL signal between UL and DL.

The special subframe S is present per half frame in the case of 5 ms DL-UL switch-point periodicity and present in the first half frame only in the case of 5 ms DL-UL switch-point periodicity. Subframes corresponding to subframe indices 0 and 5 and DwPTS correspond to a period for downlink transmission only. The UpPTS and a subframe immediately following the special subframe always correspond to a period for uplink transmission. When multiple cells are aggregated, a UE may assume the same UL-DL configuration for all cells and GPs of special subframes in different cells overlap by at least 1456 Ts. The radio frame structure is merely exemplary and the number of subframes included in the radio frame, the number of slots included in a subframe, and the number of symbols included in a slot can vary.

Table 1 shows special subframe configurations (DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows UL-DL configurations.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, there are seven UL-DL configurations in the type-2 frame structure in 3GPP LTE. The UL-DL configurations may have different positions or numbers of DL subframes, special subframes and UL subframes. A description will be given of various embodiments of the present invention based on the UL-DL configurations of the type-2 frame structure, shown in Table 2.

Figure 3A:
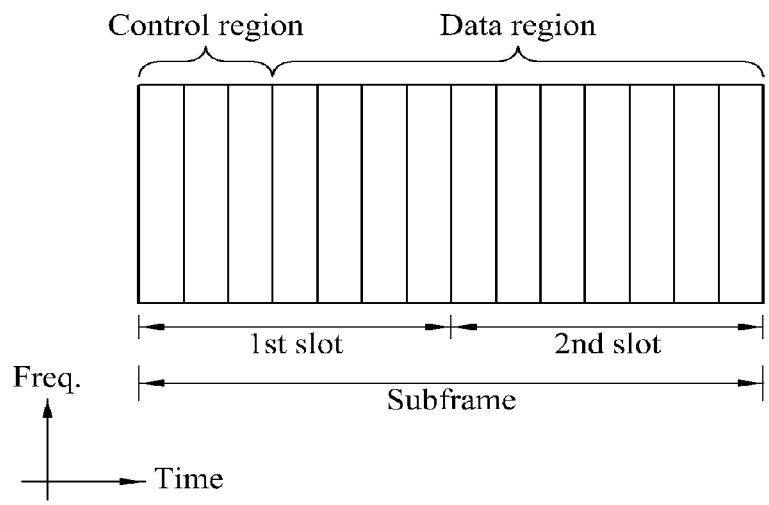
FIGS. 3a and 3b illustrate downlink and uplink subframe structures for use in 3GPP LTE.
Figure 3B:
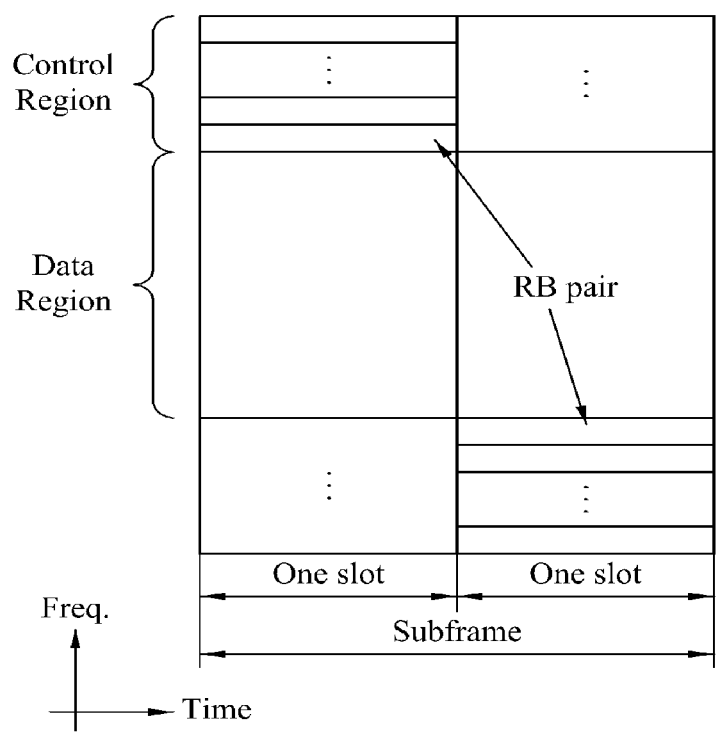

FIGS. 3A and 3B illustrate downlink and uplink subframe structures of 3GPP LTE.

Referring to FIG. 3A, one DL subframe includes two slots in the time domain. The first three OFDM symbols in the first slot of a subframe correspond to a control region to which a control channel is allocated and the remaining OFDM symbols correspond to a data region to which a physical downlink shared channel (PDSCH) is allocated.

Examples of a DL control channel used in 3GPP LTE include a physical control format indicator channel (PCFICH), a physical downlink control channel (PDCCH), a physical hybrid ARQ indicator channel (PHICH), etc. The PCFICH transmitted through the first OFDM symbol of a subframe carries information on the number of OFDM symbols (i.e. control region size) used for control channel transmission in the subframe. Information transmitted on the PDCCH is referred to as downlink control information (DCI). The DCI includes UL resource allocation information, DL resource allocation information, UL transmit (Tx) power control commands for UE groups, etc. That is, an ACK/NACK signal for UL data transmitted by a UE is transmitted on the PHICH.

The PDCCH will now be described in detail.

A BS can transmit transport format and resource allocation information of a PDSCH, resource allocation information (UL grant) of a PUSCH, a set of Tx power control (TPC) commands with respect to an arbitrary UE and individual UEs in a UE group, activation of a VoIP (voice over Internet protocol), etc. on the PDCCH. A plurality of PDCCHs can be transmitted in a control region. A UE can monitor the plurality of PDCCHs. The PDCCH includes an aggregate of one or several consecutive control channel elements (CCEs). The PDCCH can be transmitted in the control region after sub-block interleaving. A CCE is a logical allocation unit used to provide the PDCCH with a coding rate based on a state of a radio channel. The CCE corresponds to a plurality of resource element groups. A format of the PDCCH and the number of bits of an available PDCCH are determined according to a correlation between the number of CCEs and the coding rate provided by the CCEs.

Control information transmitted through the PDCCH by the BS is called DCI. The BS can transmit control information through the PDCCH according to DCI format shown in Table 3.

TABLE 3

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |

TABLE 3-continued

| DCI Format | Description |
|---|---|
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

Referring to Table 3, DCI format 0 indicates uplink resource allocation information, DCI format 1 to DCI format 2 are used to indicate downlink resource allocation information, and DCI format 3 and DCI format 3A indicate uplink transmit power control (TPC) commands for UE groups. DCI formats 3/3A include TPC commands for a plurality of UEs. In the case of DCI formats 3/3A, a BS masks CRC with TPC-ID. The TPC-ID is an identifier demasked by a UE to monitor a PDCCH carrying a TPC command. The TPC-ID is used for the UE to decode the PDCCH in order to check whether the TPC command is carried on the PDCCH. The TPC-ID may be defined by reusing an existing identifier such as C-RNTI (radio network temporary identifier), PI-RNTI, SC-RNTI or RA-RNTI or using a new identifier. The TPC-ID is distinguished from the C-RNTI for a specific UE and the PI-RNTI, SC-RNTI and RA-RNTI for all UEs in a cell since the TPC-ID is an identifier for UEs belonging to a specific set in a cell. This is because only N UEs can receive TPC commands therefor if DCI includes the TPC commands for the N UEs. If the DCI includes TPC commands for all UEs in a cell, the TPC-ID becomes an identifier for all UEs in the cell.

A UE searches a search space in a subframe for the TPC-ID by monitoring a set of PDCCH candidates. Here, the UE may search a common search space or a UE-specific search space for the TPC-ID. The common search space refers to a search space searched by all UEs in a cell whereas the UE-specific search space refers to a search space searched by a specific UE. When the TPC-ID is demasked for a corresponding PDCCH candidate and thus a CRC error is not detected, the UE can receive a corresponding TPC command on the PDCCH.

TPC-ID for a PDCCH that carries a plurality of TPC commands is defined. Upon detection of the TPC-ID, a UE receives a TPC command on a PDCCH corresponding to the TPC-ID. The TPC command is used to control uplink channel transmit power. Accordingly, it is possible to prevent failure of transmission to a BS or interference to other UEs due to incorrect power control.

A method of mapping resources by a BS for PDCCH transmission in an LTE system is described briefly.

In general, the BS can transmit scheduling allocation information and other control information through a PDCCH. A physical control channel may be transmitted through an aggregation of one or more contiguous CCEs. A CCE includes 9 resource element groups (REGs). The number of REGs which are not allocated to a PCFICH or PHICH is represented by NREG. CCEs that can be used in the system correspond to 0 to NCCE−1 (here, $N_{CCE} = \lfloor N_{REG}/9 \rfloor$). A PDCCH supports multiple formats as shown in the following table 2. A PDCCH composed of n contiguous CCEs starts from a CCE that performs i mod n=0 (here, i is a CCE number). Multiple PDCCHs may be transmitted through one subframe.

TABLE 4

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 4, the BS can determine a PDCCH format on the basis of the number of regions in which the BS will transmit control information. A UE can reduce overhead by reading the control information on a CCE basis.

Referring to FIG. 3B, an uplink subframe can be divided in the frequency domain into a control region and a data region. The control region is allocated a PUCCH for carrying uplink control information. The data region is allocated a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in two respective slots. The RB pair allocated to the PUCCH is frequency-hopped at a slot boundary.

Figure 4:
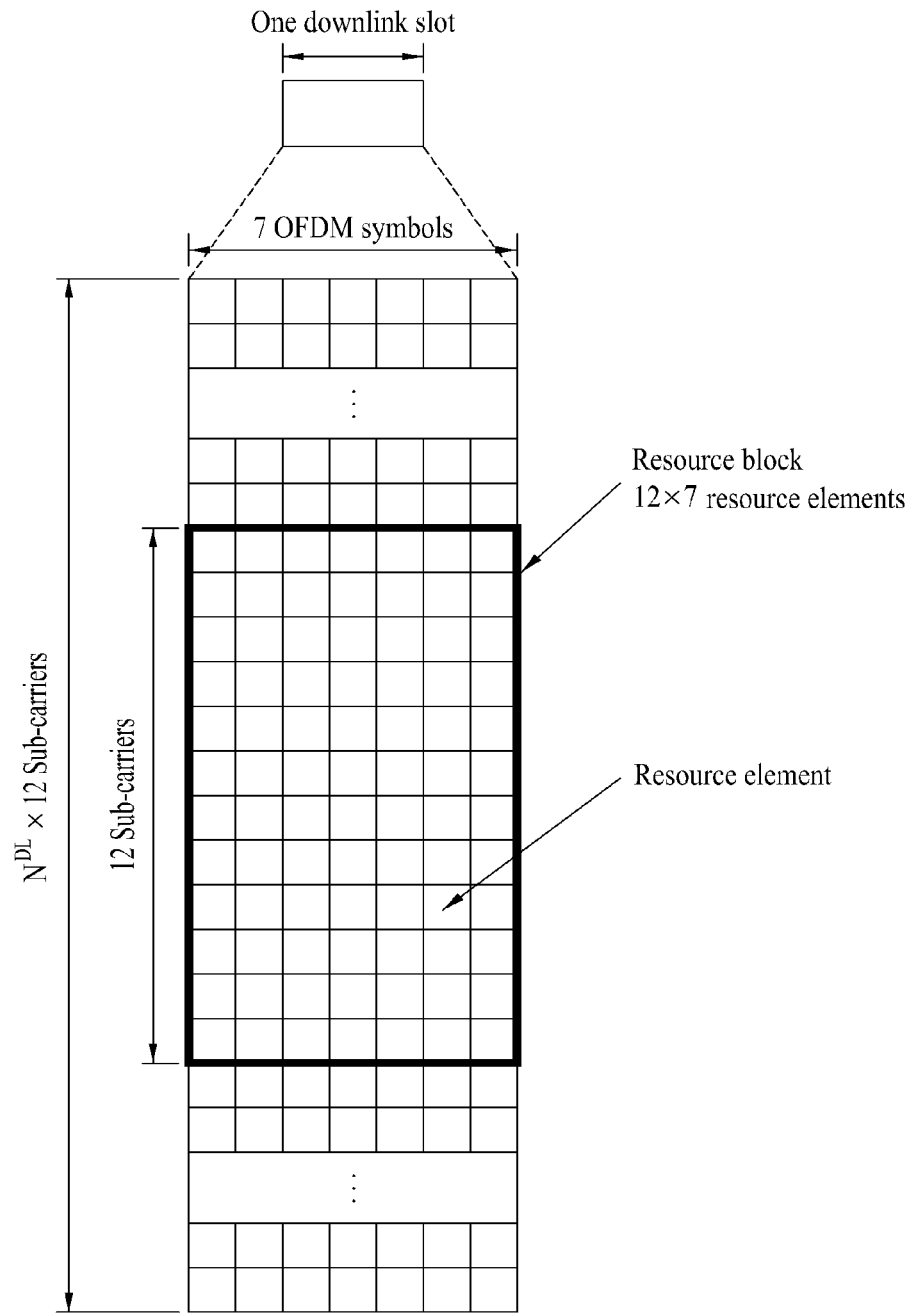
FIG. 4 illustrates a downlink time-frequency resource grid structure of 3GPP LTE.

FIG. 4 shows a downlink time-frequency resource grid structure used in 3GPP LTE.

A downlink signal transmitted in each slot may be described by a resource grid including $N_{RB}^{DL} \times N_{SC}^{RB}$ subcarriers and $N_{symb}^{DL}$ OFDM symbols. $N_{RB}^{DL}$ indicates the number of downlink resource blocks (RBs), $N_{SC}^{RB}$ represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here, $N_{RB}^{min,DL}$ indicates a minimum downlink bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of cyclic prefix (CP) and a subcarrier interval. In case of multi-antenna transmission, one resource grid can be defined per antenna port.

An element in the resource grid for each antenna port is called a resource element (RE) and uniquely identified by an index pair (k, l) in a slot. Here, k indicates a frequency-domain index ranging from 0 to $N_{RB}^{DL} N_{SC}^{RB} - 1$, and l indicates a time-domain index ranging from 0 to $N_{symb}^{DL} - 1$.

An RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{DL}$ may be predetermined values. For example, $N_{symb}^{DL}$ and $N_{SC}^{RB}$ may have values as shown in the following table 5. Accordingly, one PRB includes $N_{symb}^{DL} \times N_{SC}^{RB}$ REs. While one PRB can correspond to one slot in the time domain and correspond to 180 kHz in the frequency domain, the PRB is not limited thereto.

TABLE 3

| Configuration | | $N_{SC}^{RB}$ | $N_{symb}^{DL}$ |
|---|---|---|---|
| Normal cyclic prefix | Δf = 15 kHz | 12 | 7 |

TABLE 3-continued

| Configuration | | $N_{sc}^{RB}$ | $N_{symb}^{DL}$ |
|---|---|---|---|
| Extended cyclic prefix | Δf = 15 kHz | | 6 |
| | Δf = 7.5 kHz | 24 | 3 |

One PRB has a value in the range of 0 to $N_{RB}^{DL}-1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated a single VRB number $n_{VRB}$.

The VRB may have a size equal to the PRB. The VRB is classified into a LVRB and a DVRB. For each of the LVRB and DVRB, a pair of VRB having a single VRB index (which may be referred to as a VRB number) is allocated to two slots in one subframe. In other words, $N_{RB}^{DL}$ VRBs which belong to the first one of two slots in one subframe are allocated one of indexes in the range of 0 to $N_{RB}^{DL}-1$, and $N_{RB}^{DL}$ VRBs which belong to the second slot are also allocated one of the indexes in the range of 0 to $N_{RB}^{DL}-1$.

A description will be given of a procedure through which a BS transmits a PDCCH to a UE in LTE.

The BS determines a PDCCH format according to DCI to be transmitted to the UE and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information, a system information RNTI (SI-RNTI) may be masked to the CRC. When the PDCCH is for a random access response, a random access-RNTI (RA-RNTI) may be masked to the CRC. Table 6 shows examples of identifiers masked to the PDCCH.

TABLE 6

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

The PDCCH carries control information for a specific UE corresponding thereto if the C-RNTI is used and carries common control information received by all UEs or a plurality of UEs in a cell if other RNTIs are used. The BS performs channel coding on the DCI to which the CRC is attached to generate coded data. Then, the BS performs rate matching based on the number or CCEs allocated to the PDCCH format. Subsequently, the BS modulates the coded data to generate modulated symbols and maps the modulated symbols to physical resource elements.

Carrier aggregation will now be described.

3GPP (3$^{rd}$ Generation Partnership Project) has defined a next-generation wireless communication system as a successor to LTE named "LTE-A (Long Term Evolution-Advanced)" and designs LTE-A such that high-speed large-capacity data transmission can be achieved. LTE-A employs carrier aggregation (CA) to aggregate a plurality of component carriers (CCs) and transmit signals using the aggregated CCs, thereby improving the transmission bandwidth of a UE and frequency use efficiency. LTE-A can extend a bandwidth up to 100 MHz by aggregating a plurality of carriers used in LTE Rel-8/9. In other words, a carrier defined for up to 20 MHz in LTE Rel-8/9 is redefined as a component carrier and thus a maximum of 5 CCs can be used by one UE through CA.

CA has the following characteristics.

(1) Aggregation of contiguous CCs and aggregation of non-contiguous CCs are supported.

(2) The number of aggregated carriers for uplink may be different from the number of aggregated carriers for downlink. If backward compatibility is needed, then the same number of CCs can be configured for uplink and downlink.

(3) Different transmission bandwidths can be acquired by configuring different numbers of CCs for uplink and downlink.

(4) For a UE, each CC independently carries one transport block and includes an independent hybrid automatic repeat request (HARQ) mechanism.

Distinguished from LTE using a single carrier, CA using a plurality of CCs needs a method for effectively managing CCs. For efficient management of CCs, CCs can be classified according to role and characteristics thereof. CCs may be divided into a primary CC (PCC) and a secondary CC (SCC). The PCC is the center of CC management when multiple CCs are used and is defined per UE. The PCC may be called a primary cell (PCell).

CCs other than the PCC are defined as SCCs. An SCC may be called a secondary cell (SCell). The PCC can function as a core carrier managing all aggregated CCs and the remaining SCCs can provide additional frequency resources for achieving high throughput. For example, connection (RRC) for signaling between a BS and a UE can be established through the PCC. In addition, security and information for a higher layer may be provided through the PCC. When only one CC is present, the CC is a PCC. In this case, the CC can execute the same function as the carrier of LTE.

In CA, a DL resource may be defined as a DL CC and a UL resource may be defined as a UL CC. A combination of the DL resource and UL resource may be referred to as a cell. When the DL CC and UL CC are asymmetrically configured, the cell may refer to the DL CC (or UL CC) only. For example, when one serving cell is configured for a specific UE, one DL CC and one UL CC are provided. When two or more serving cells are configured for a specific UE, however, as many DL CCs as the number of cells are provided and the number of UL CCs may be equal to or less than the number of DL CCs. When a plurality of serving cells is configured for a specific UE, a CA environment in which the number of UL CCs is greater than the number of DL CCs may be supported.

Linkage between a carrier frequency (center frequency of a cell) of the DL resource and a carrier frequency of the UL resource may be indicated by system information (SI) transmitted on the downlink resource. For example, a combination of the DL resource and UL resource may be configured by linkage defined by SIB2 (system information block type 2).

CA may be regarded as aggregation of two or more cells having different carrier frequencies according to the above-described definition. That is, a case in which two or more serving cells having different carrier frequencies are configured for a specific UE may be referred to as a CA environment. For UEs supporting CA, one or more SCells and the PCell can be aggregated and used to support an increased bandwidth.

Here, a serving cell may correspond to a PCell or SCell. When an RRC_CONNECTED UE cannot support CA, only one serving cell including a PCell is present. When the RRC_CONNECTED UE supports CA, the term 'serving cell' refers to a set of one or more cells including a PCell and SCell.

The PCell is the center of control related communication from among serving cells configured in CA. A cell indicated or used in an initial connection establishment procedure, a connection re-establishment processor or a handover procedure of a UE may be the PCell. The UE can receive important control information (e.g. PUCCH) through the PCell thereof and perform a monitoring procedure for system information acquisition and modification only in the PCell. However, the UE may receive control information through an SCell as necessary. For a UE supporting CA, the BS can change the PCell only through a handover procedure using a message RRCConnectionReconfiguration including mobilityControlInfo.

SCells refer to cells other than the PCell from among serving cells configured for CA. A PUCCH is not present in an SCell. When an SCell is added, the BS can provide all system information related to operations in the corresponding cell in the RRC-CONNECTED state through dedicated signaling to a UE supporting CA. For an SCell, system information may be changed through release and addition of the corresponding SCell using a message RRCConnectionReconfiguration. The BS can transmit a dedicated signal having a parameter different from a parameter included in a broadcast message to the UE in the corresponding SCell. After an initial security activation procedure, the BS can configure one or more SCells in addition to a PCell (a cell configured as a serving cell during a connection establishment procedure) for the UE. The PCell is used to provide security input and higher layer system information and the SCells are used to provide an additional DL resource and a UL resource as necessary. The BS can independently add, remove or change an SCell through an RRC connection reconfiguration procedure using message RRCConnectionReconfiguration which includes or does not include mobilityControlInfo.

In CA, multiple carriers are classified into a PCell and SCells which are UE-specific parameters. A specific UE may have one or more configured serving cells. When a plurality of configured serving cells is present, one of the cells becomes a PCell and the remaining cells become SCells. Here, the PCell may be set to a cell having the lowest cell index (e.g. ServeCellIndex). When a UE has a plurality of configured serving cells in TDD, the same UL-DL configuration may define a UL subframe through which ACK/NACK for a PDSCH transmitted in a specific DL subframe is transmitted for all cells.

A UE may transmit UL control information such as channel state information (CSI) (including CQI, RI, PMI, etc.), HARQ ACK/NACK, etc. measured from one or more CCs to a BS through a predetermined CC. For example, the UE can aggregate ACK/NACK information received from a PCell DL CC and SCell(s) DL CC (through ACK/NACK multiplexing or ACK/NACK bundling, for example) and transmit the same using a PUCCH in a UL CC in the PCell.

Figure 5A:
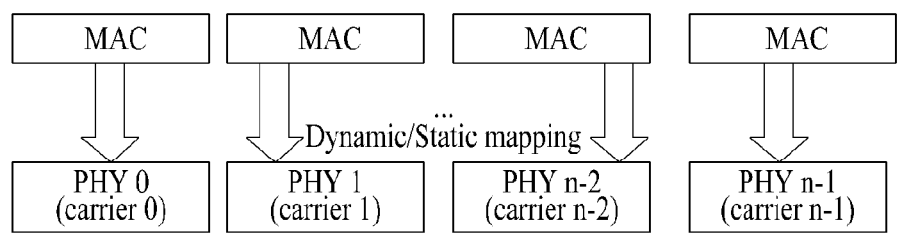
FIGS. 5A and 5B illustrate configurations of a physical layer (first layer, L1) and MAC layer (second layer, L2) of a multi-carrier supporting system.
Figure 5B:
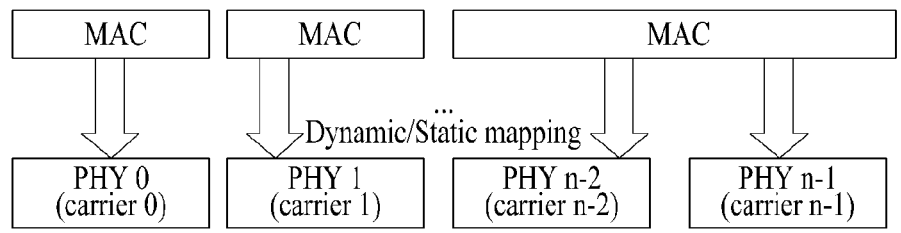

FIGS. 5A and 5B illustrate configurations of a physical layer (first layer, L1) and a medium access control (MAC) layer (second layer, L2) of system supporting multiple carriers.

One physical layer (PHY) supporting a single carrier is present in a BS of a conventional wireless communication system supporting a single carrier, and one MAC layer for controlling the PHY layer may be provided. In the PHY layer, baseband processing can be performed, for example. In the MAC layer, a transmitter can generate a MAC protocol data unit (PDU) and perform L1/L2 scheduler operation including an MAC/RLC sublayer. A MAC PDU packet block of the MAC layer is converted into a transport block through a logical transport layer and mapped to a physical layer input information block. In FIGS. 5A and 5B, the MAC layer is represented as L2 and includes MAC/RLC/PDCP sublayers. This can be applied to the entire description of the present invention.

A plurality of MAC-PHY layers may be provided in the multi-carrier supporting system. That is, a transmitter and a receiver of the multi-carrier supporting system may be configured in such a manner that MAC-PHY layers respectively correspond to n CCs, as shown in FIG. 5A. Since an independent PHY layer and an independent MAC layer are configured per CC, a PDSCH is generated per CC from a MAC PDU in the corresponding PHY layer.

Alternatively, one common MAC layer and a plurality of PHY layers may be configured in the system supporting multiple carriers. As shown in FIG. 5B, a transmitter and a receiver of the multi-carrier supporting system may be configured in such a manner that n PHY layers respectively corresponding to n CCs are provided and one common MAC layer controlling the n PHY layers is present. In this case, a MAC PDU from the common MAC layer can be divided into a plurality of transport blocks respectively corresponding to the plurality of CCs on a transport layer. Otherwise, when the MAC PDU is generated in the MAC layer or an RLC PDU is generated in an RLC layer, the MAC PDU or RLC PDU may be divided into the CCs. Accordingly, a PDSCH is generated per CC in a PHY layer.

FIG. 6 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

When the UE initially accesses the BS or has no radio resource for signal transmission, the UE may perform a random access procedure to access the BS in steps S103 to S106. For random access, the UE may transmit a preamble to the BS on a physical random access channel (PRACH) (S103) and receive a response message to the preamble on a PDCCH and a PDSCH corresponding to the PDCCH (S104). In the case of contention-based random access except for handover, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS through uplink or transmitted from the BS to the UE includes a DL/UL ACK/NACK signal, a channel quality indicator (CQI)/a precoding matrix index (PMI)/a rank indicator (RI), etc. In 3GPP LTE, the UE can transmit the control information such as CQI/PMI/RI through a PUSCH and/or a PUCCH.

Reference signals for use in mobile communication systems can be classified into two types: a reference signal for channel information acquisition and a reference signal for data demodulation. The former needs to be transmitted through a broad band and to be received and measured by even a UE that does not receive downlink data in a specific subframe since it is used for UEs to acquire channel information on downlink. In addition, the reference signal for channel measurement may be used for handover measurement. The latter is transmitted along with a corresponding resource by a BS when the BS transmits a downlink signal, and a UE can perform channel estimation and demodulate data by receiving this reference signal. The reference signal for data demodulation needs to be transmitted in a data transmission region.

Downlink reference signals of two types for unicast service are defined in 3GPP LTE Release 8. Such reference signals correspond to a common reference signal (CRS) used for channel state information acquisition and handover measurement and a dedicated reference signal (DRS) (corresponding to a UE-specific reference signal) used for data demodulation. The UE-specific reference signal is used only for data demodulation and the CRS is used for both channel information acquisition and data demodulation in LTE Release 8. The CRS is a cell-specific reference signal and a BS transmits the CRS per subframe over a broad band. Cell-specific CRSs are transmitted for up to four antenna ports according to the number of Tx antennas of the BS. For example, CRSs for antenna ports 0 and 1 are transmitted when the number of Tx antennas of the BS is 2 and CRSs for antenna ports 0, 1, 2 and 3 when the number of Tx antennas of the BS is 4. When the BS has 4 Tx antennas, a CRS pattern in one resource block (RB) is as shown in FIG. 4.

FIG. 7 illustrates CRS patterns used in 3GPP LTE.

Referring to FIG. 7(a), CRSs R0, R1, R2 and R3 for 4 antenna ports are allocated such that time-frequency resources thereof do not overlap in one RB. When CRSs are mapped to time-frequency resources in LTE, a reference signal for one antenna port is mapped to one resource element (RE) per 6 REs and transmitted in the frequency domain. Since one RB consists of 12 REs in the frequency domain, 2 REs are used per RB for one antenna port.

FIG. 7(b) illustrates a CRS pattern including a reference signal R0 for antenna port 0 in one RB.

In LTE-A, a BS needs to be designed to support a maximum of 8 Tx antennas for downlink transmission. Accordingly, reference signals for a maximum of 8 Tx antennas need to be supported. Since only downlink references for a maximum of 4 antenna ports are defined in LTE, reference signals for added antenna ports need to be additionally defined and designed when the BS has 4 to 8 downlink Tx antennas in an LTE-A system. Both the above-described channel measurement reference signal and data demodulation reference signal need to be employed as reference signals for a maximum of 8 Tx antenna ports.

One important consideration in design of an LTE-A system is backward compatibility. That is, LTE UEs need to operate in LTE-A systems and the LTE-A system needs to support the same. In reference signal transmission, reference signals for a maximum of 8 Tx antenna ports need to be additionally defined in a time-frequency region in which a CRS defined in LTE is transmitted per subframe in the entire bandwidth. In LTE-A, however, when a reference signal pattern for a maximum of 8 transmit antennas is added per subframe to the entire bandwidth as in LTE, reference signal transmission overhead excessively increases.

Accordingly, reference signals newly designed in LTE-A are categorized into a channel state information reference signal (CSI-RS) (or channel state indication-RS) for channel measurement for selecting a modulation and coding scheme (MCS) and a precoding matrix index (PMI) and a demodulation RS (DM RS) for demodulation of data transmitted through 8 transmit antennas.

The CSI-RS is designed for the purpose of channel measurement, whereas the CRS is used for handover measurement and data demodulation. The CSI-RS may also be used for handover measurement. The CSI-RS need not be transmitted per subframe since the CSI-RS is used to obtain channel state information, differently from the CRS. Accordingly, a BS intermittently transmits the CSI-RS in the time domain to reduce CSI-RS transmission overhead and transmits a dedicated DM RS to a UE scheduled in a corresponding time-frequency region for data demodulation. That is, a DM RS of a specific UE is transmitted only in a region in which the UE is scheduled, that is, a time-frequency region in which data can be received.

A BS can transmit CSI-RSs for all antenna ports in LTE-A systems. However, since reference signal transmission overhead excessively increases when the BS transmits CSI-RSs for a maximum of 8 Tx antenna ports per subframe, the BS intermittently transmits the CSI-RSs in the time domain rather than transmitting the same per subframe to reduce CSI-RS transmission overhead. That is, the BS can periodically transmit the CSI-RSs in a period corresponding to an integer multiple of one subframe or in a specific transmission pattern. Here, the BS can configure a CSI-RS transmission period or pattern and signal the same to UEs.

To measure a CSI-RS for each antenna port of a cell to which a UE belongs, the UE needs to know information about the time-frequency position of the CSI-RS, CSI-RS sequence, CSI-RS frequency shift, etc. Since the CSI-RS is transmitted to acquire downlink channel information, the CSI-RS needs to be transmitted through the entire bandwidth. The UE feeds back channel information such as CQI, PMI, rank, etc. of each band to a BS using the received CSI-RS and the BS performs scheduling using the channel information fed back thereto. However, transmission of a CSI-RS for an LTE-A UE to an LTE UE may cause overhead because the LTE UE is not aware of the presence of the CSI-RS and the BS punctures REs corresponding to the CSI-RS and transmits the same to the LTE UE when the CSI-RS is transmitted to the LTE UE in a scheduled resource region.

Figure 8A:
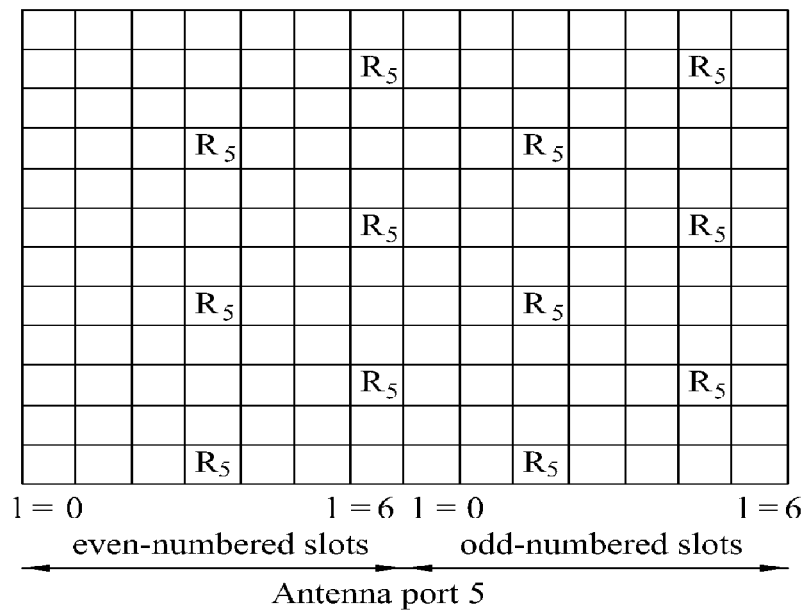
FIGS. 8A and 8B illustrate exemplary time-frequency positions at which a CSI-RS is transmitted in 3GPP-LTE and LTE-A.
Figure 8B:
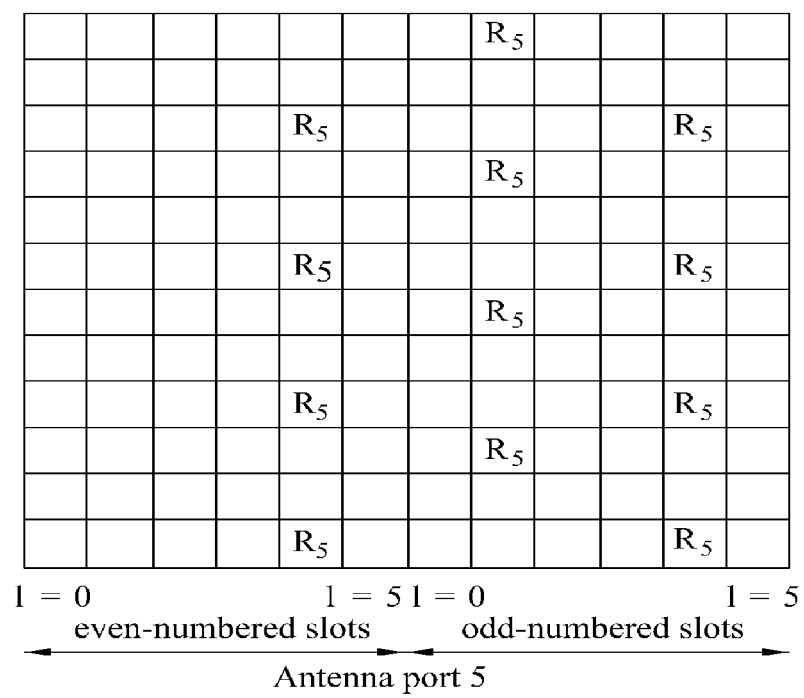

FIGS. 8A and 8B illustrate exemplary time-frequency positions in which a CSI-RS is transmitted in 3GPP-LTE and LTE-A which are mobile communication systems.

In LTE-A, the CSI-RS may be transmitted through one, two, four or eight antenna ports. Here, antenna ports used to transmit the CSI-RS correspond to p=15, p=15, 16, p=15, 16, 17, 18 or p=15, . . . , 22.

UE-specific reference signals (e.g. demodulation reference signal (DMRS)) support PDSCH transmission and are transmitted through antenna ports p=5, p='7, p=5, p=8 or p=7, 8, . . . , v+6. Here, v denotes the number of layers used for PDSCH transmission and the UE-specific reference signals are present only when PDSCH transmission is related to corresponding antenna ports and are effective for PDSCH demodulation. The UE-specific reference signals are transmitted only through resource blocks to which a corresponding PDSCH is mapped. A UE-specific reference signal other than a UE-specific reference signal defined in Clause 6.1 of 3GPP LTE 36.211, which is transmitted using resource elements having the same index pair (k,l) irrespective of antenna port p, is not transmitted using the resource element (k,l) through a physical signal or one of physical channels.

A UE-specific reference signal sequence $r_{n_s}(m)$ for antenna port 5 can be defined by Equation 1.

$$r_{n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12N_{RB}^{PDSCH} - 1$$
[Equation 1]

Here, $N_{RB}^{PDSCH}$ denotes the bandwidth in resource blocks for corresponding PDSCH transmission.

Referring to Equation 1, the UE-specific reference signal sequence $r_{n_s}(m)$ for antenna port 5 has a value in the range of −1 to 1 according to the difference between c(2m) or c(2m+1) and 1. In addition, a QPSK normalization value according to an average power value can be obtained by $$\frac{1}{\sqrt{2}}.$$

In Equation 1, c(i) is a pseudo-random sequence corresponding to a PN sequence and can be defined by a length-13 Gold sequence. Equation 2 represents an exemplary Gold sequence c(n).

$$c_{init} = (\lfloor n_s/2 \rfloor + 1) \cdot (2N_{ID}^{cell} + 1) \cdot 2^{16} + n_{RNTI}$$
[Equation 2]

Here, $n_{RNTI}$ denotes a UE-specific ID.

A reference signal for other antenna ports p=7, 8, . . . , v+6 may be defined by Equation 3.

$$r(m) = \frac{1}{\sqrt{2}}(1 - 2 \cdot c(2m)) + j\frac{1}{\sqrt{2}}(1 - 2 \cdot c(2m+1)),$$
$$m = \begin{cases} 0, 1, \ldots, 12N_{RB}^{max \cdot DL} - 1 & \text{normal cyclic prefix} \\ 0, 1, \ldots, 16N_{RB}^{max \cdot DL} - 1 & \text{extended cyclic prefix} \end{cases}$$
[Equation 3]

In Equation 3, c(i) is a pseudo-random sequence corresponding to a PN sequence and can be defined by a length-13 Gold sequence. Equation 4 represents an exemplary Gold sequence c(i).

$$c_{init} = (\lfloor n_s/2 \rfloor + 1) \cdot (2N_{ID}^{cell} + 1) \cdot 2^{16} + n_{SCID}$$
[Equation 4]

Here, $c_{init}$ denotes an initial sequence, $n_s$ represents a slot number in one radio frame, $N_{ID}^{cell}$ is a cell ID and $n_{SCID}$ is given as a scrambling identification field according to Table 7.

When DCI format 2B or 2C related to PDSCH transmission is not present for antenna port 7 or 8, the UE assumes $n_{SCID}$ as 0. The UE assumes $n_{SCID}$ as 0 for antenna ports 9 to 14.

TABLE 7

| Scrambling identity field in DCI format 2B or 2C [3] | $n_{SCID}$ |
|---|---|
| 0 | 0 |
| 1 | 1 |

A description will be given of UE-specific reference signal mapping patterns with reference to the attached drawings. In a resource grid (or RB) shown in the following figures, the horizontal axis represents time and l represents a slot based symbol index. The slot based symbol index is numbered 0, 1, 2, . . . , from the left in a slot. The vertical axis in the resource grid corresponds to frequency and represents subcarriers. A subcarrier index may be numbered 0, 1, 2, . . . , 11 from the top.

FIGS. 8A and 8B illustrate UE-specific reference signal mapping patterns in RB for antenna port 5 when a normal cyclic prefix (CP) and an extended CP are applied.

In FIGS. 8A and 8B, REs mapped to $R_5$ correspond to REs to which a UE-specific reference signal for antenna port 5 is mapped. As shown in FIG. 8A, when the normal CP is applied, the UE-specific reference signal for antenna port 5 may be mapped to l=3, 6 in an even-numbered slot (e.g. slot 0) and an odd-numbered slot (e.g. slot 1) and transmitted. In the corresponding RB, the UE-specific reference signal may be mapped to the fourth, eighth and twelfth subcarriers (e.g. subcarriers corresponding to subcarrier indices 3, 7 and 11) from the top in the case of l=3 and mapped to the second, sixth and tenth subcarriers (e.g. subcarriers corresponding to subcarrier indices 1, 5 and 9) from the top in the case of l=6 in the frequency domain.

When the extended CP is applied as shown in FIG. 8B, the UE-specific reference signal for antenna port 5 may be mapped to l=4 in an even-numbered slot (e.g. slot 0) and to l=1,4 in an odd-numbered slot (e.g. slot 1) and transmitted. The UE-specific reference signal for antenna port 5 may be mapped to the third, sixth, ninth and twelfth subcarriers from the top when l=4 in the even-numbered slot. The UE-specific reference signal may be mapped to the first, fourth, seventh and tenth subcarriers from the top when l=1 in the odd-numbered slot, mapped to the third, sixth, ninth and twelfth subcarriers from the top when l=4 in the odd-numbered slot and transmitted.

Figure 9:
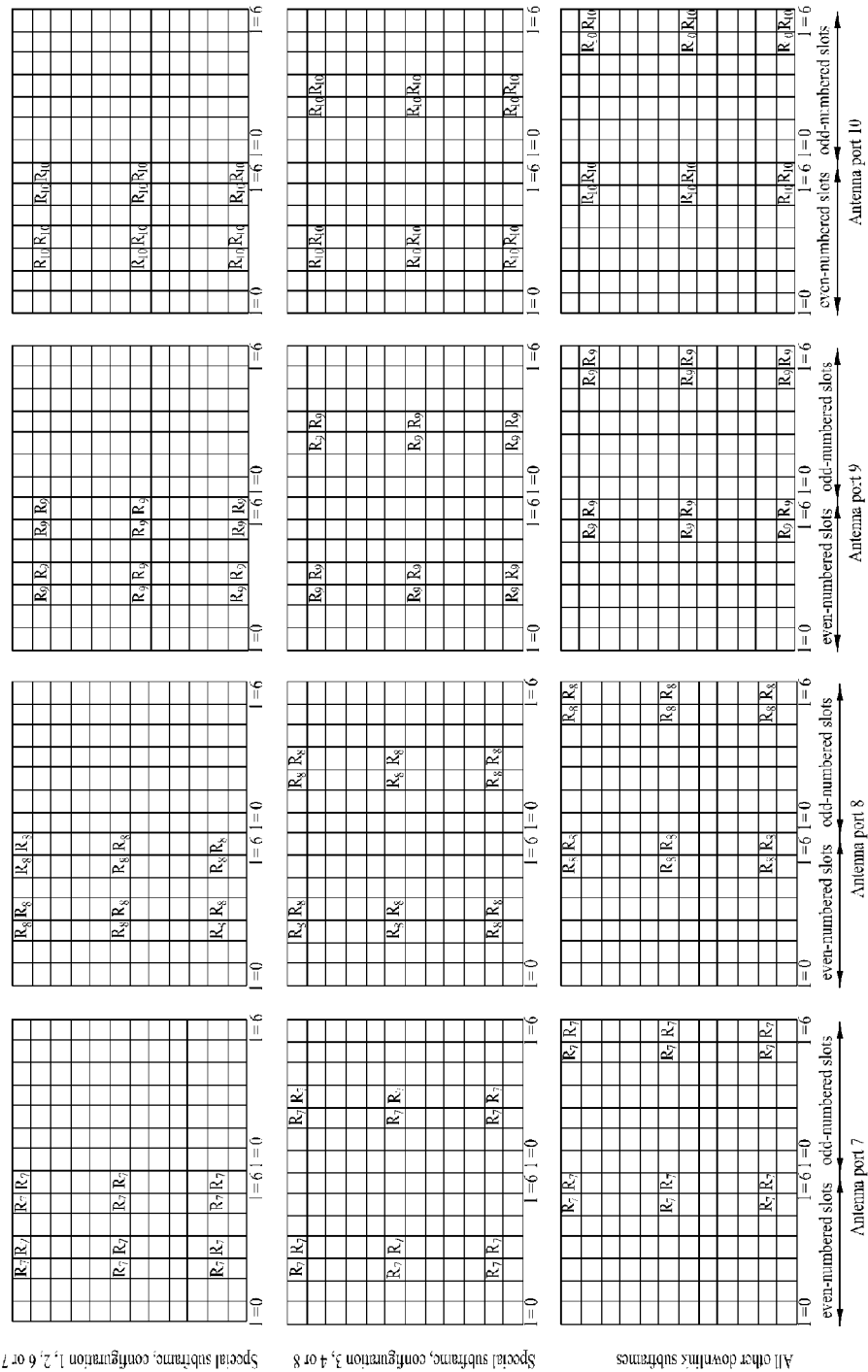
FIG. 9 illustrates UE-specific reference signal mapping patterns when a normal CP is applied to antenna ports 7, 8, 9 and 10.

FIG. 9 illustrates UE-specific reference signal mapping patterns when the normal CP is applied to antenna ports 7, 8, 9 and 10.

In FIG. 9, REs denoted by $R_7$, $R_8$, $R_9$ and $R_{10}$ correspond to REs to which UE-specific reference signals for antenna ports 7, 8, 9 and 10 are respectively mapped. Upper part of FIG. 9 shows UE-specific reference signal mapping patterns for antenna ports 7, 8, 9 and 10 corresponding to special subframe configuration 1, 2, 6 or 7. Middle part of FIG. 9 shows UE-specific reference signal mapping patterns for antenna ports 7, 8, 9 and 10 corresponding to special subframe configuration 3, 4 or 8 and lower part of FIG. 9 shows UE-specific reference signal mapping patterns for antenna ports 7, 8, 9 and 10 in the case of all downlink subframes other than the special subframe. The UE-specific reference signal mapping patterns shown in the top, middle and bottom of FIG. 9 are arranged such that they do not overlap.

Figure 10:
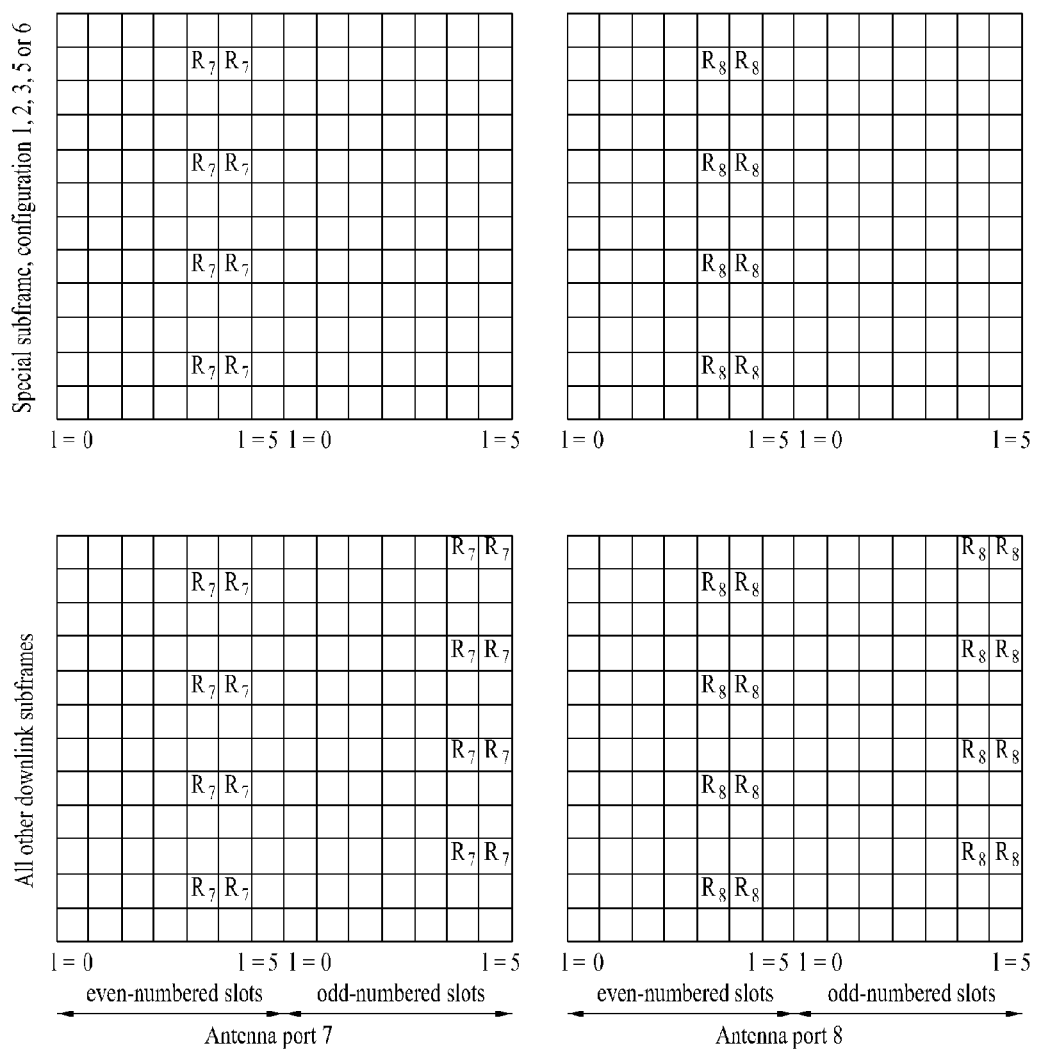
FIG. 10 illustrates UE-specific reference signal mapping patterns when an extended CP is applied to antenna ports 7 and 8.
Figure 11A:
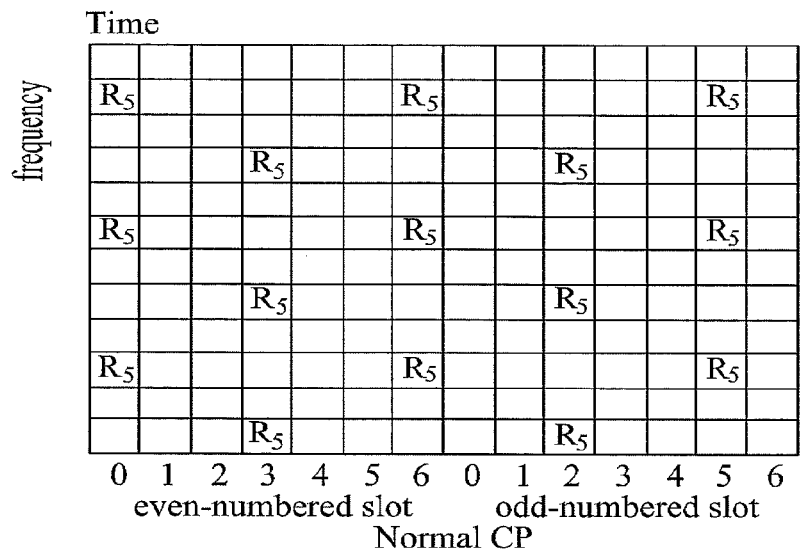
FIGS. 11A to 11M illustrate UE-specific reference signal mapping patterns for antenna port 5 when normal CP is applied according to embodiments of the present invention.
Figure 11B:
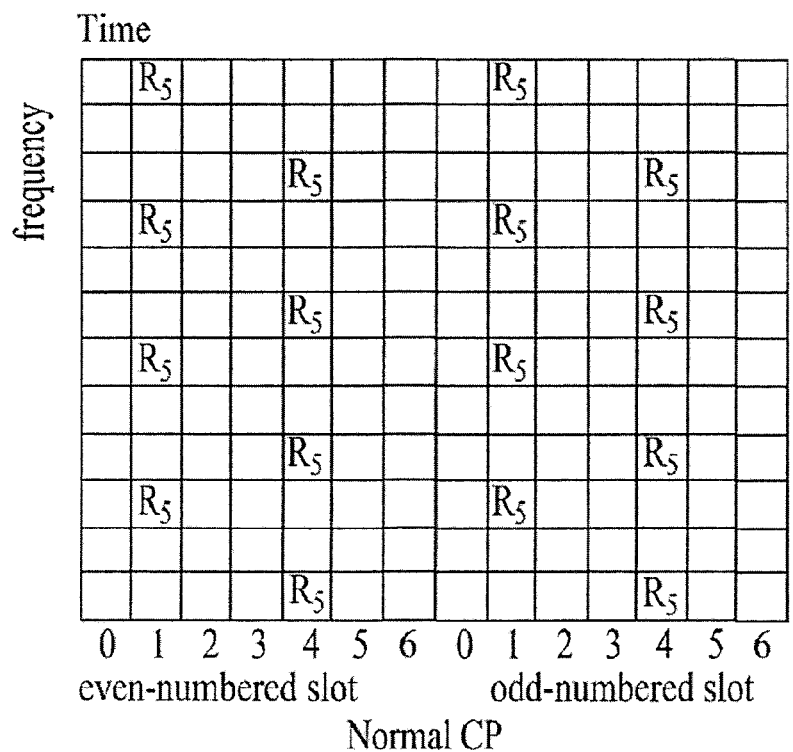
Figure 11C:
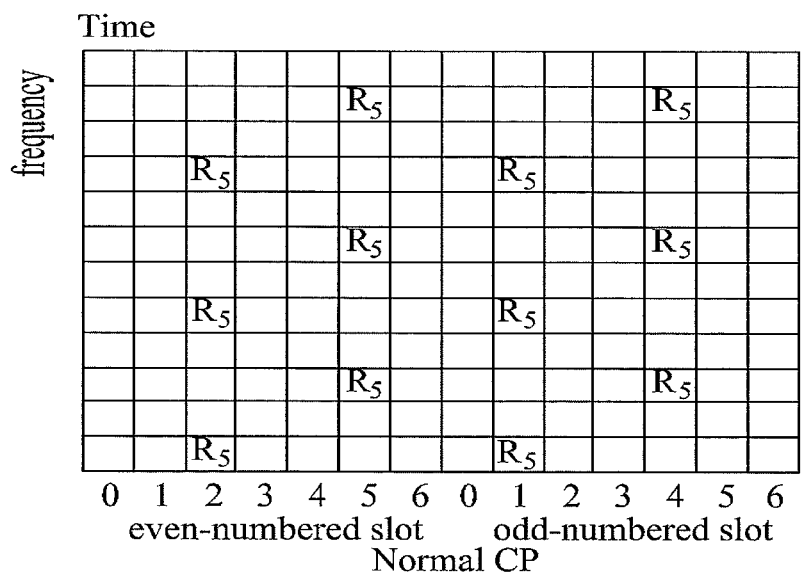
Figure 11D:
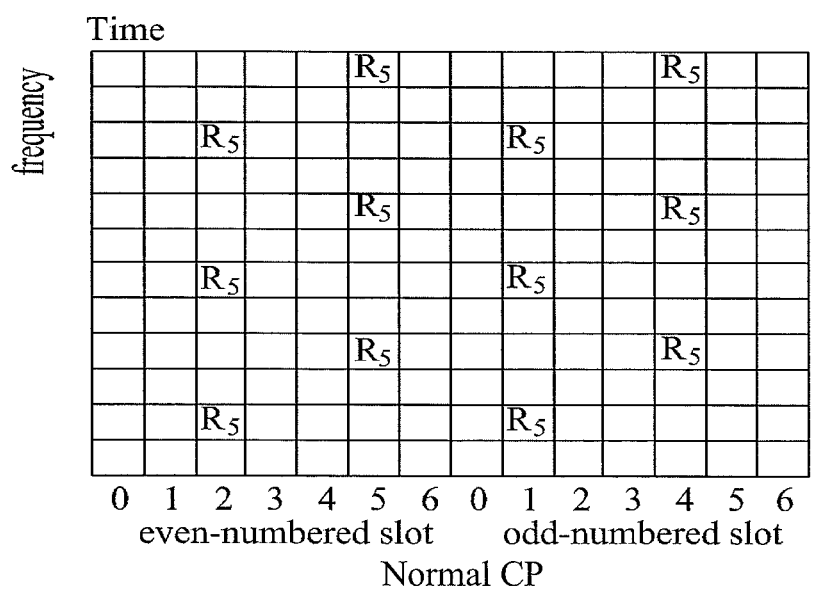
Figure 11E:
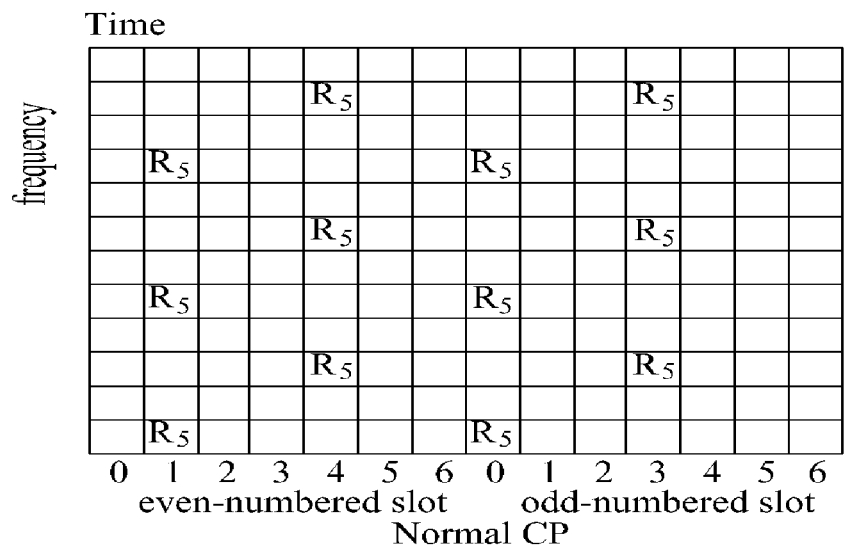
Figure 11F:
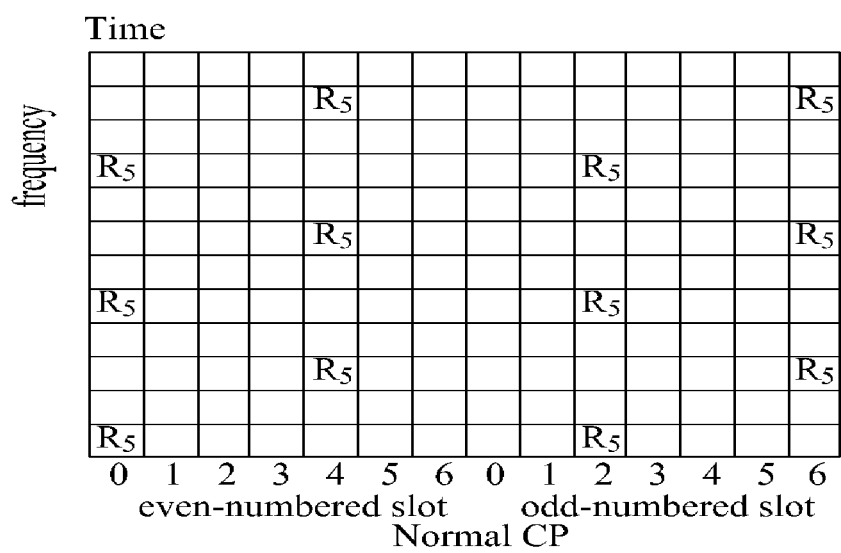
Figure 11G:
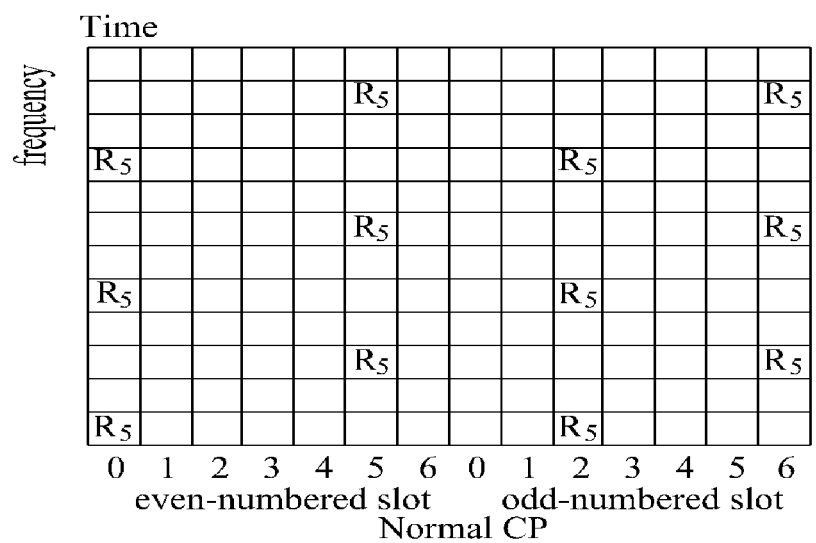
Figure 11H:
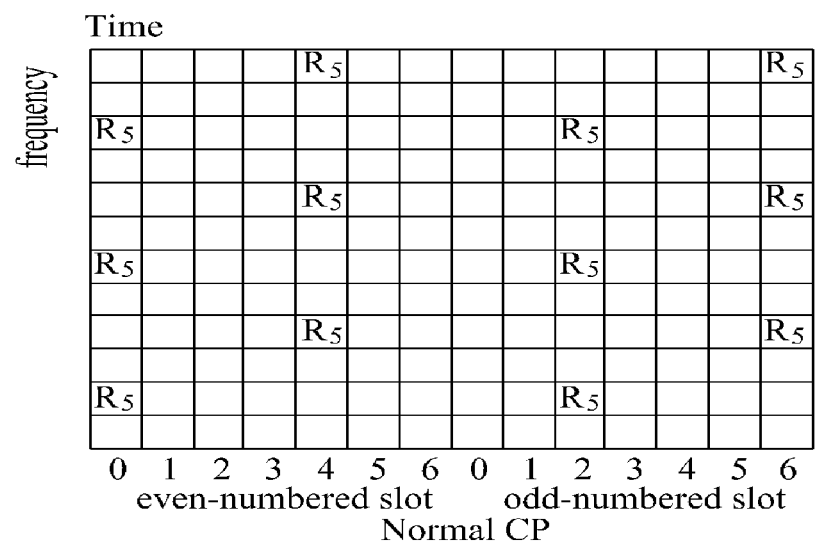
Figure 11I:
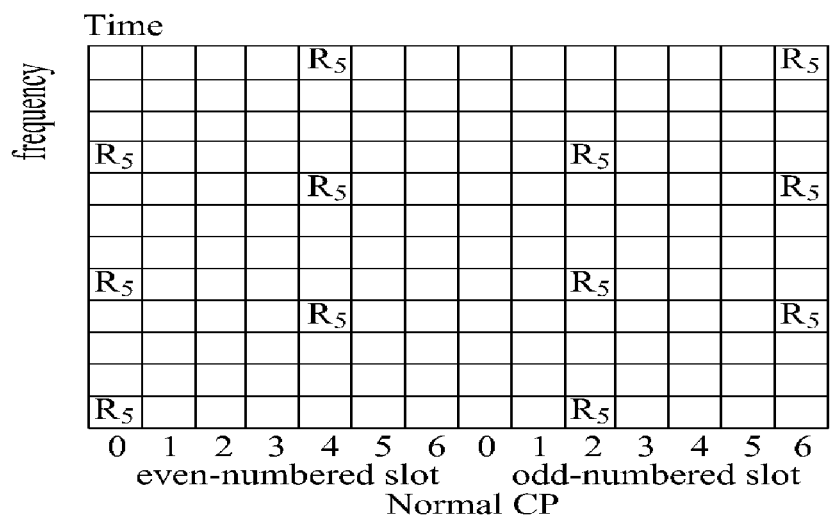
Figure 11J:
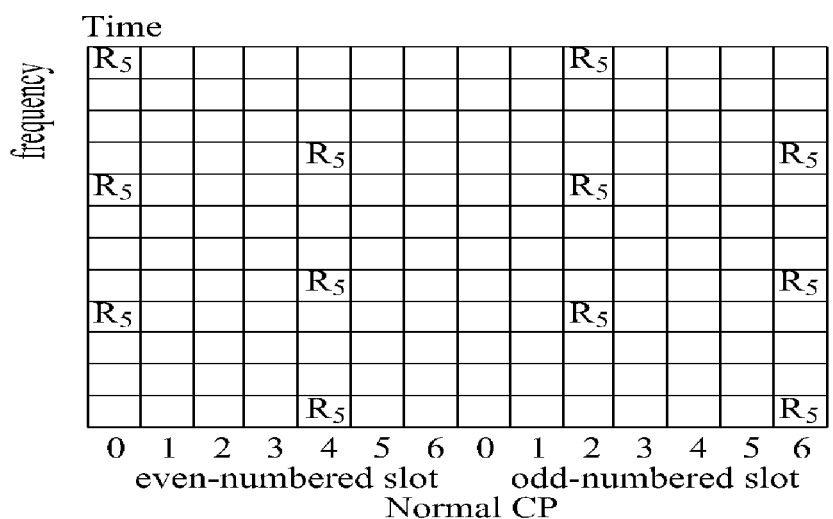
Figure 11K:
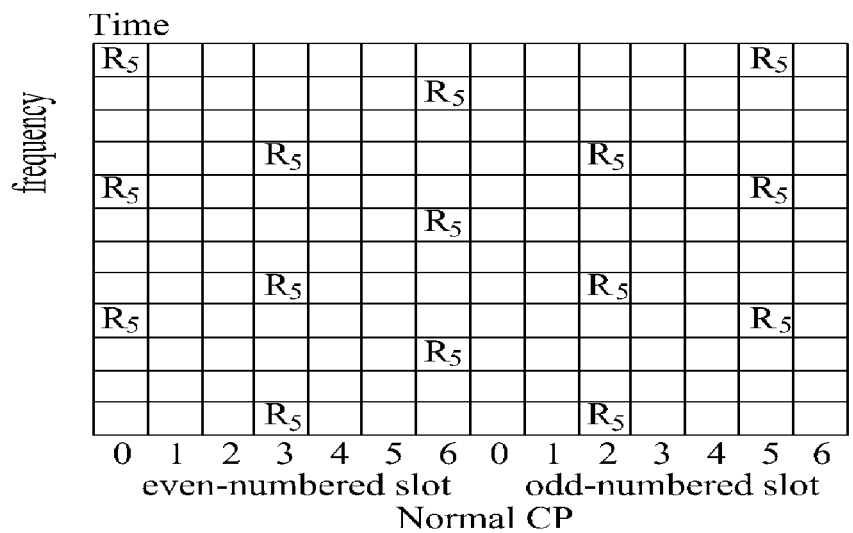
Figure 11L:
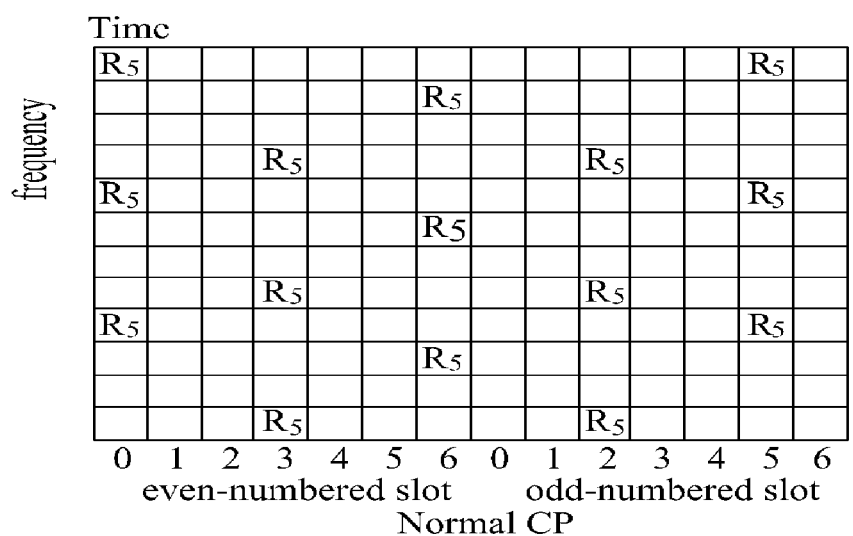
Figure 11M:
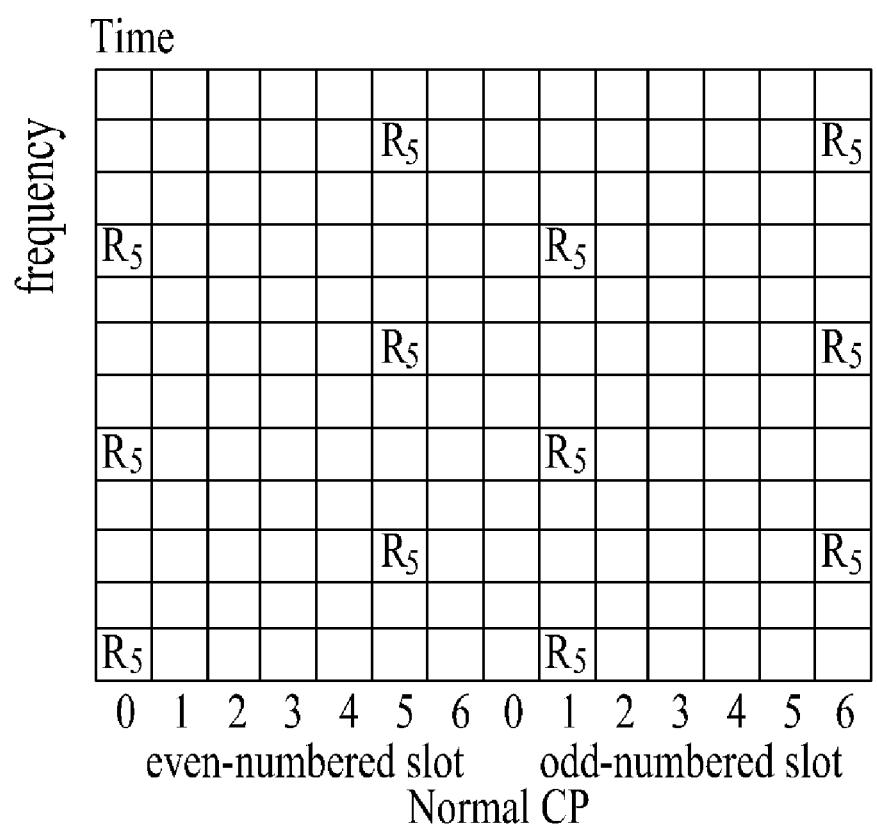
Figure 12A:
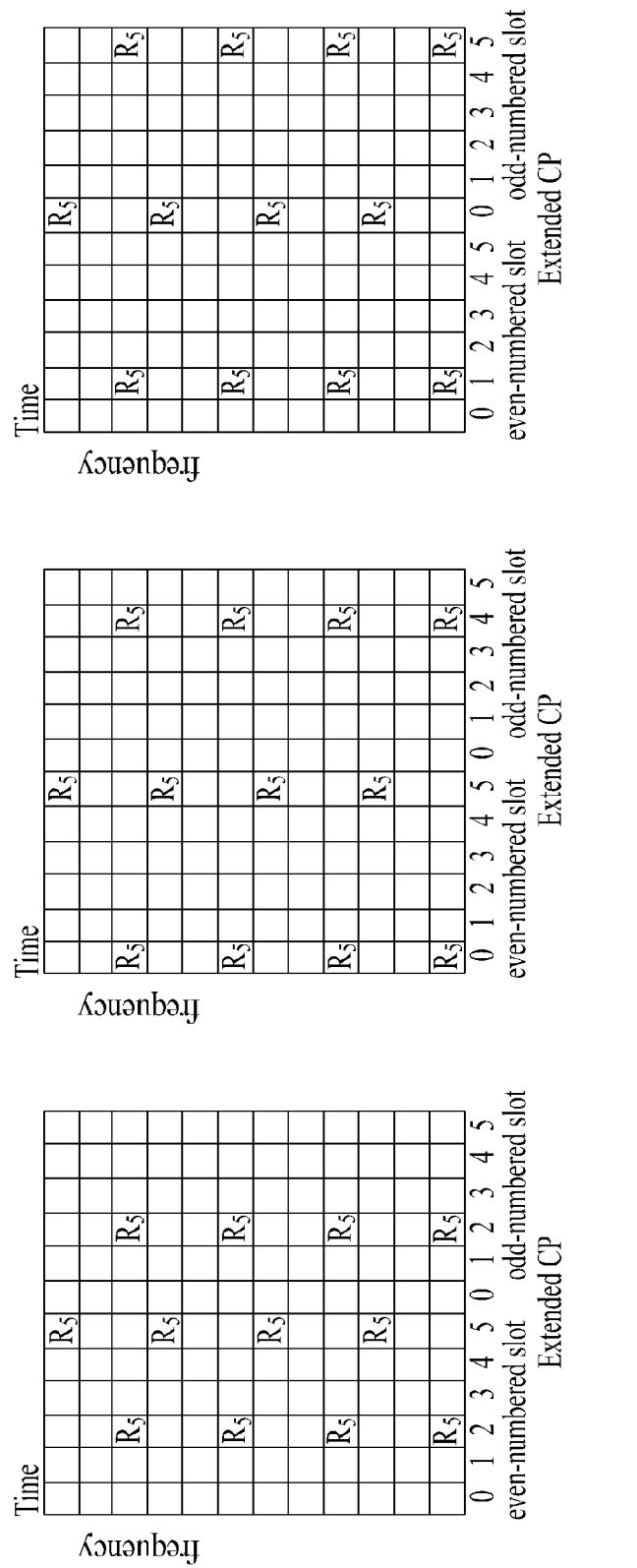
FIGS. 12A to 12K illustrate UE-specific reference signal mapping patterns for antenna port 5 when extended CP is applied according to embodiments of the present invention.
Figure 12B:
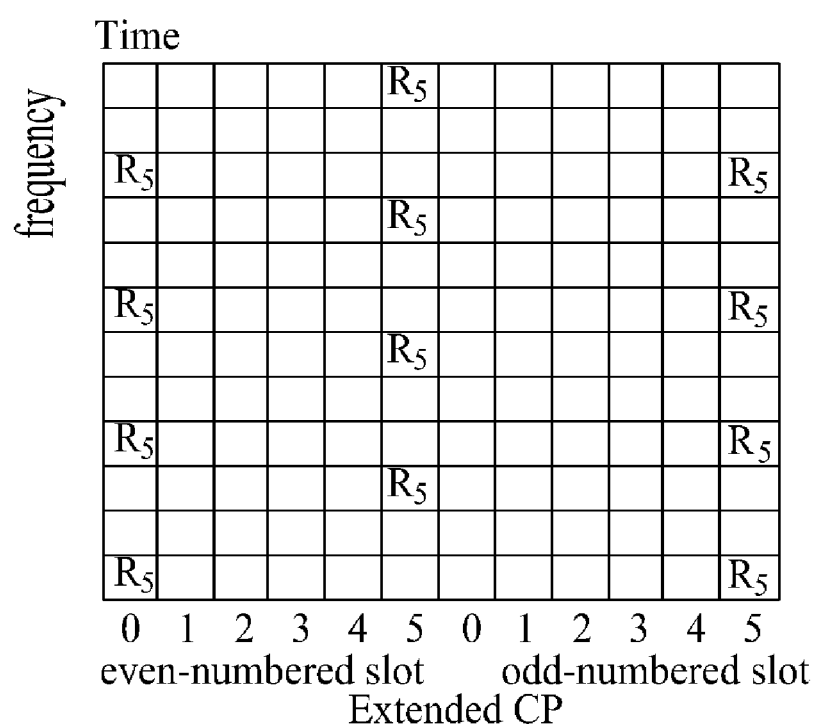
Figure 12C:
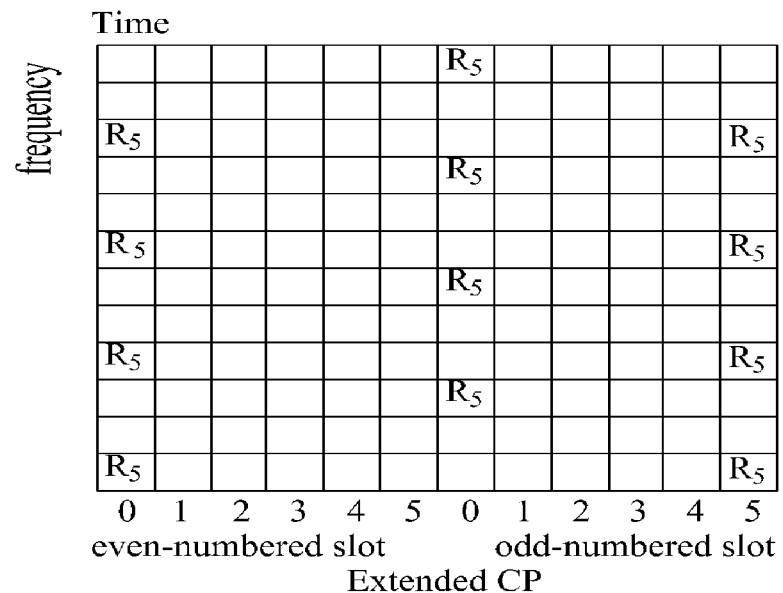
Figure 12D:
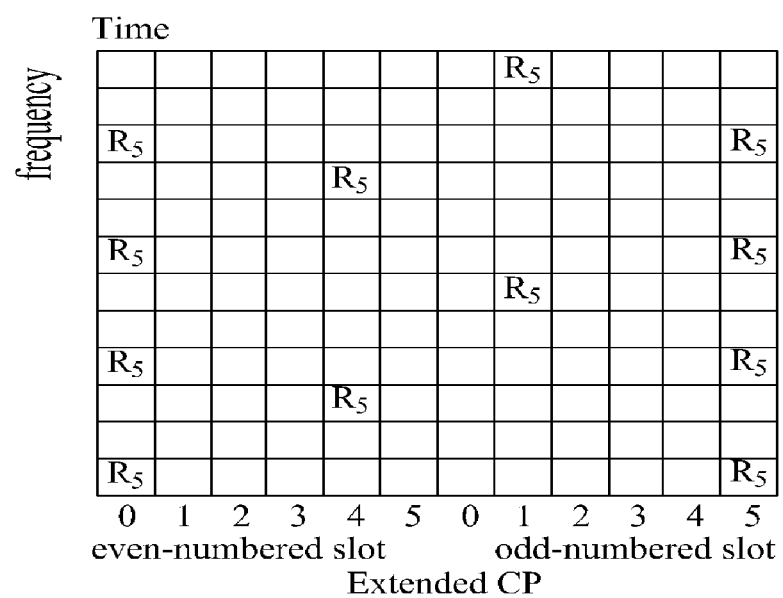
Figure 12E:
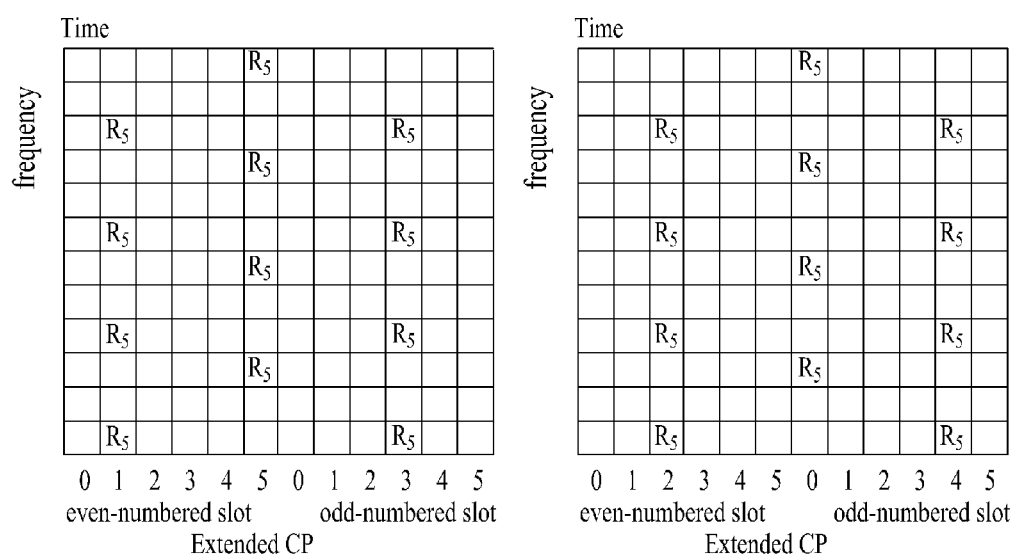
Figure 12F:
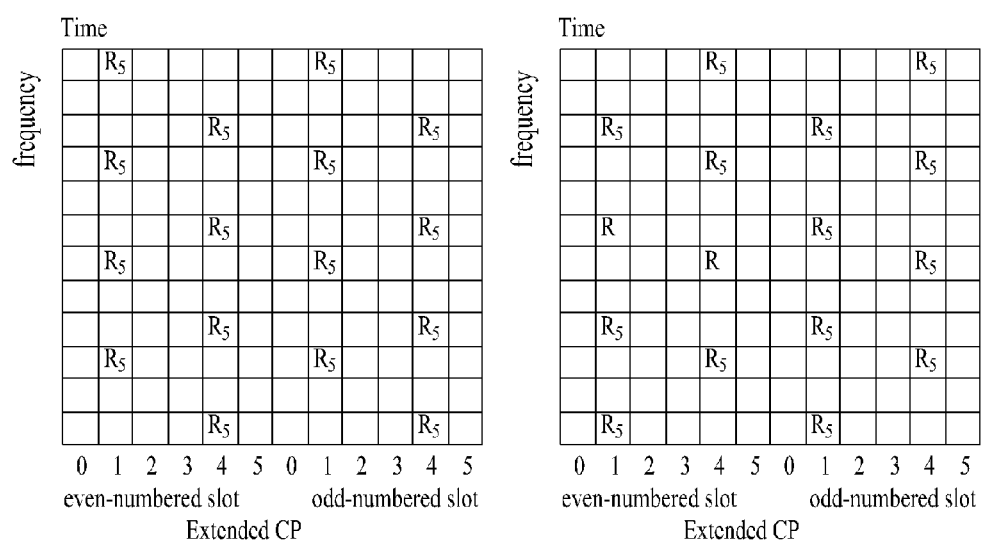
Figure 12G:
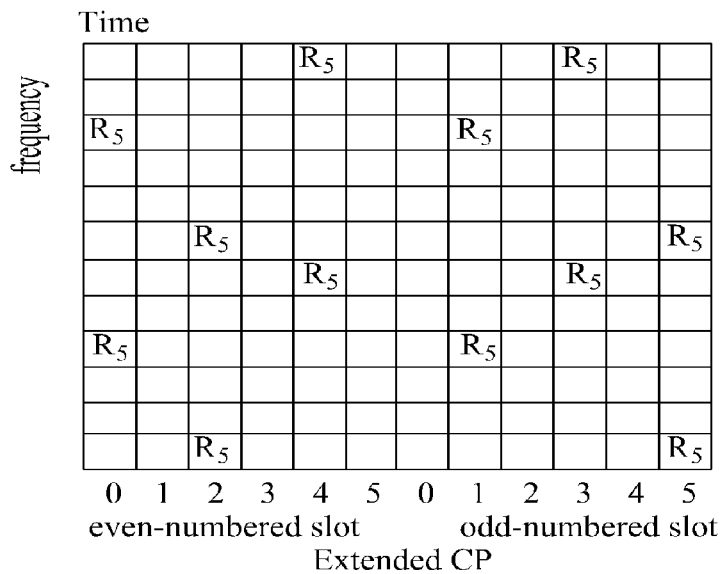
Figure 12H:
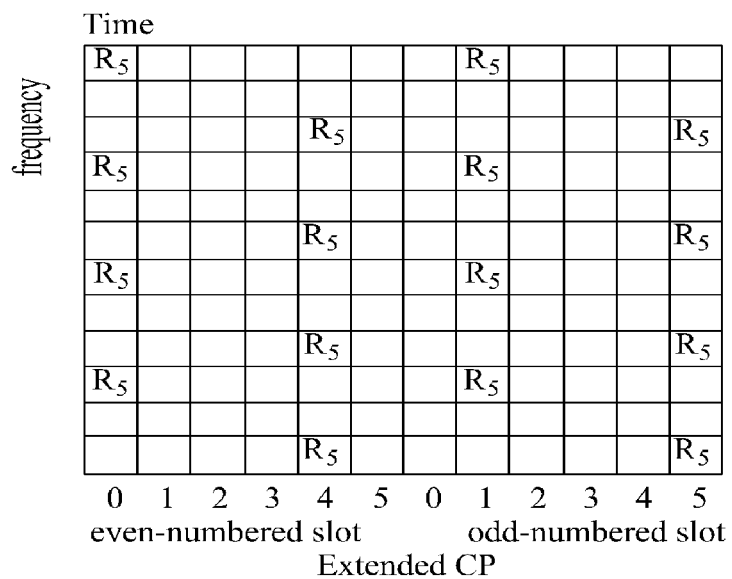
Figure 12I:
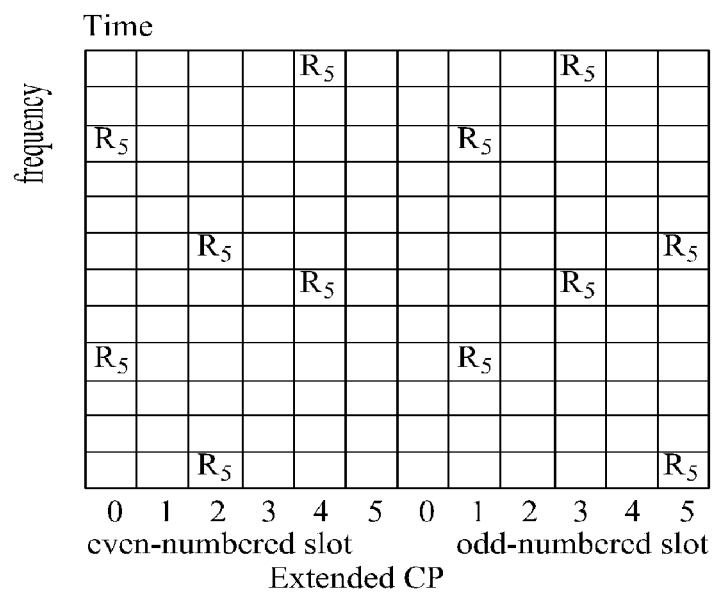
Figure 12J:
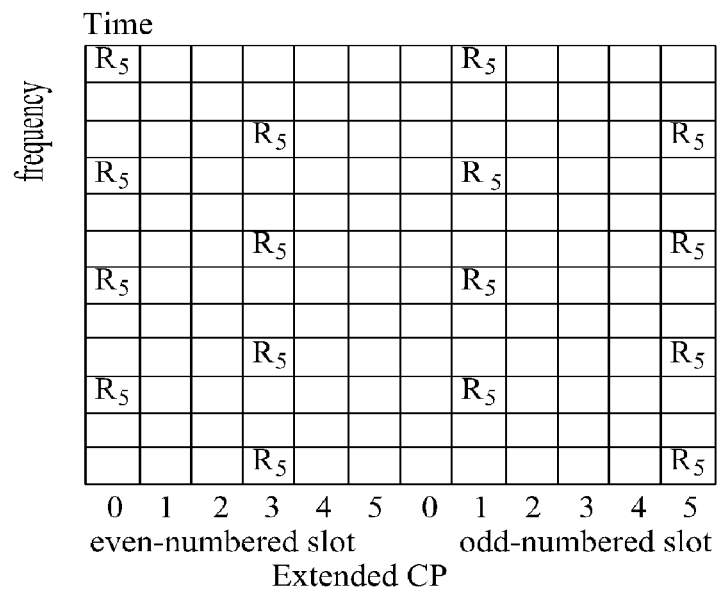
Figure 12K:
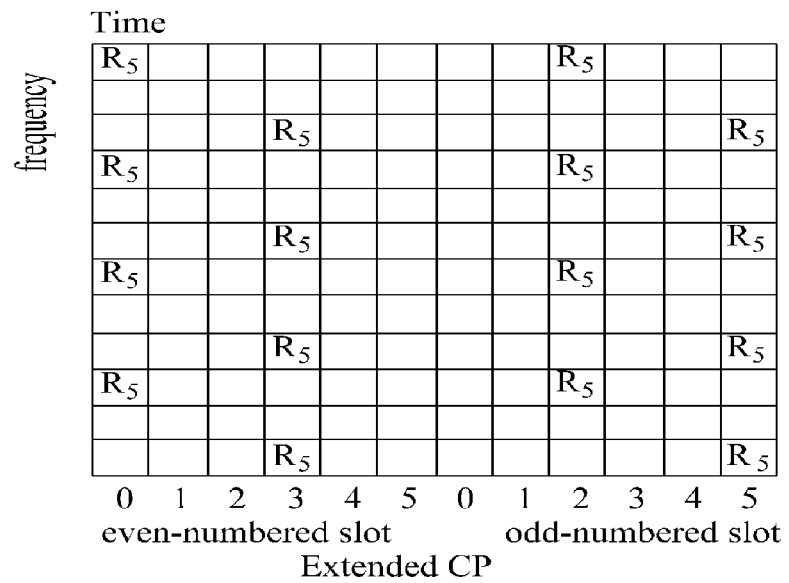
Figure 13A:
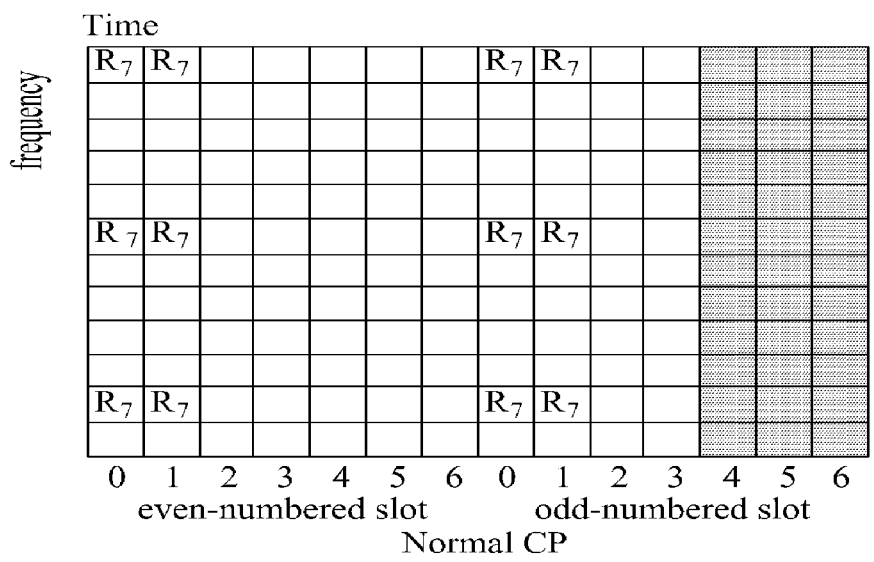
FIGS. 13A to 13D illustrate UE-specific reference signal mapping patterns for antenna port 7 in the case of special subframe configuration 3, 4 or 8 to which the normal CP is applied.
Figure 13B:
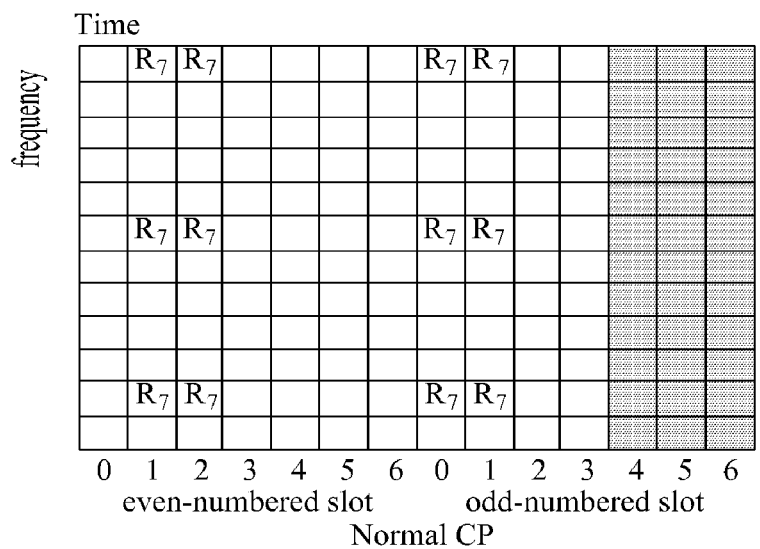
Figure 13C:
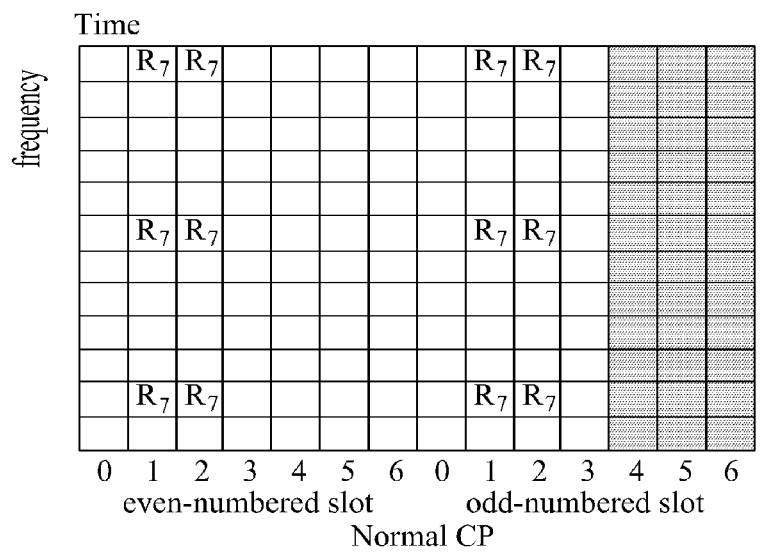
Figure 13D:
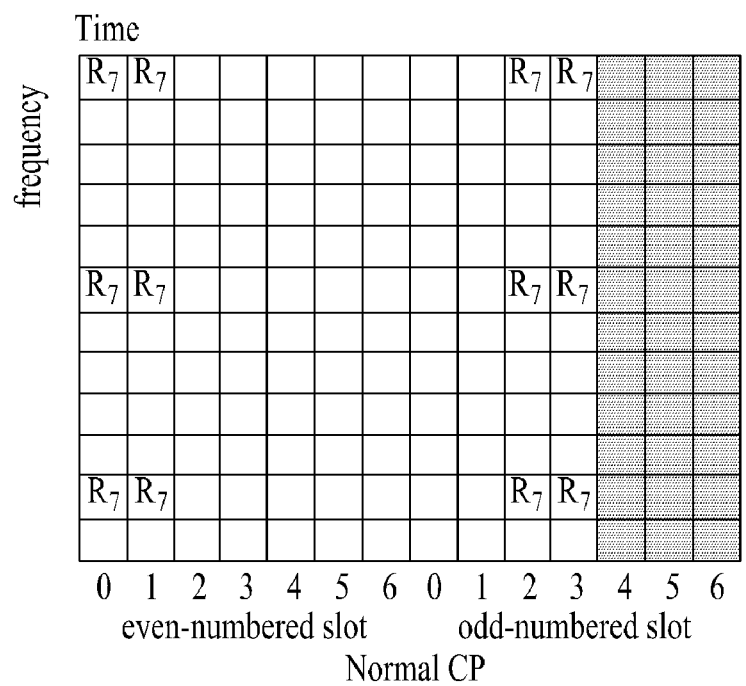
Figure 14A:
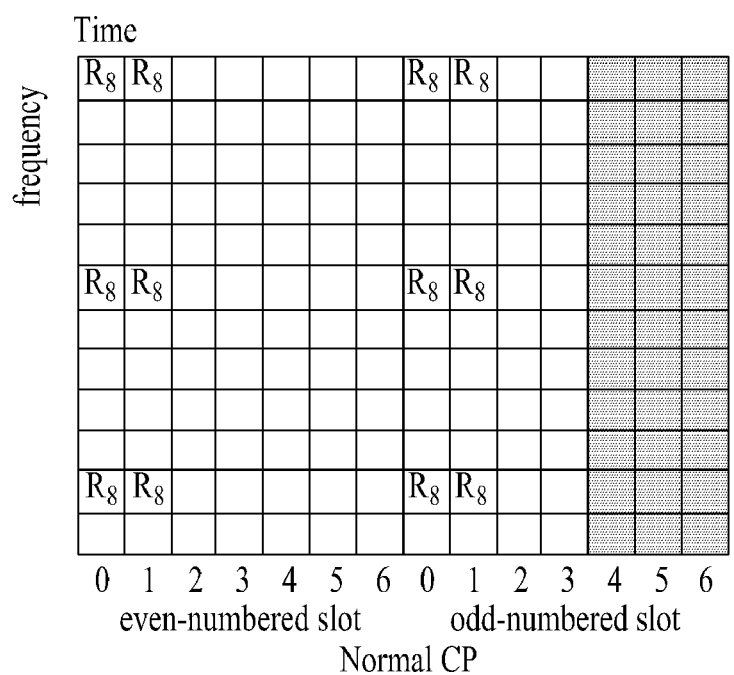
FIGS. 14A to 14D illustrate UE-specific reference signal mapping patterns for antenna port 8 in the case of special subframe configuration 3, 4 or 8 to which the normal CP is applied.
Figure 14B:
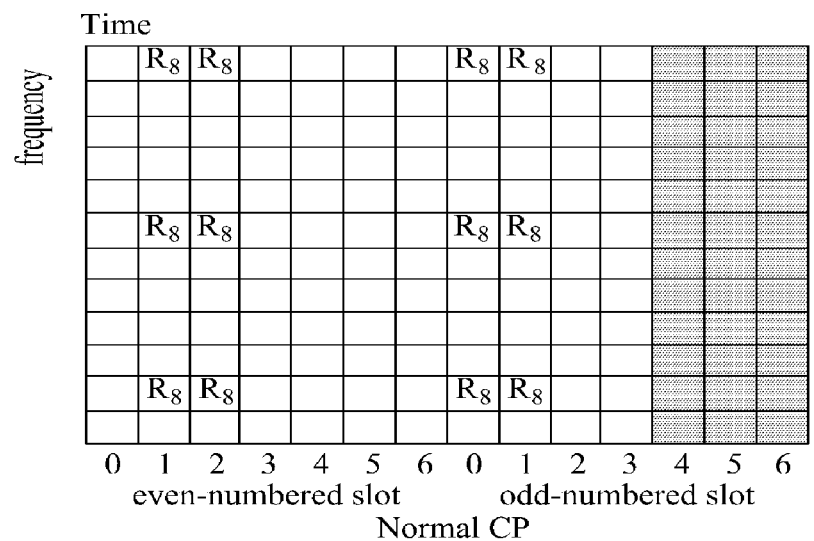
Figure 14C:
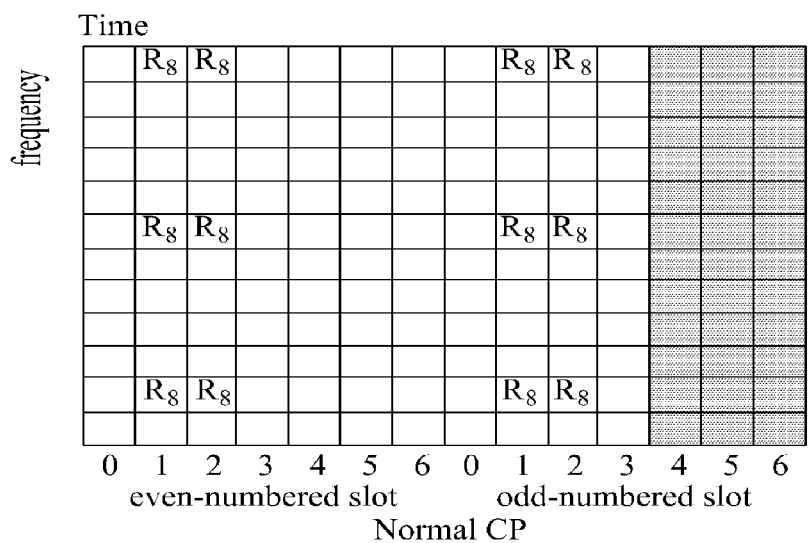
Figure 14D:
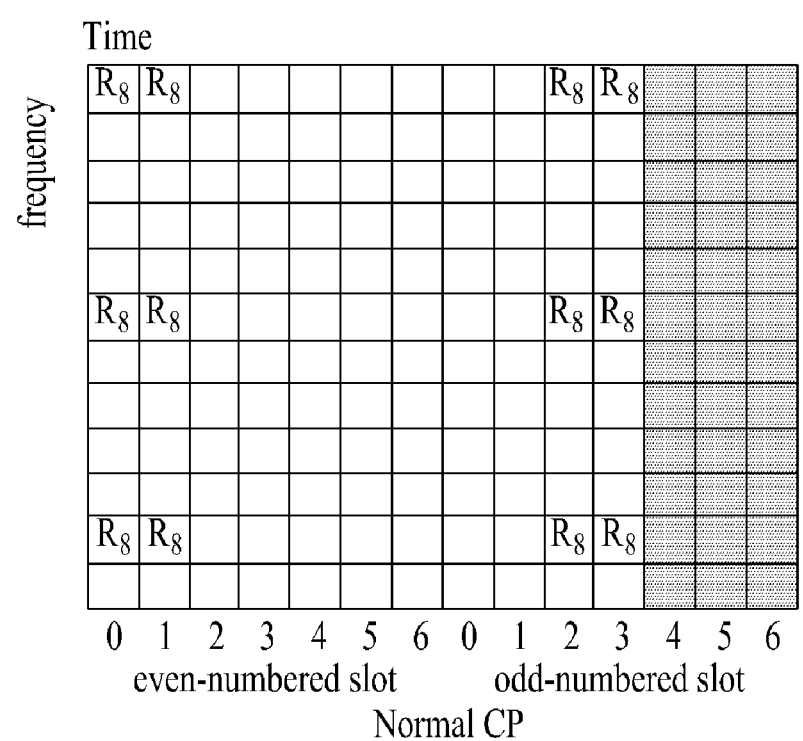
Figure 15A:
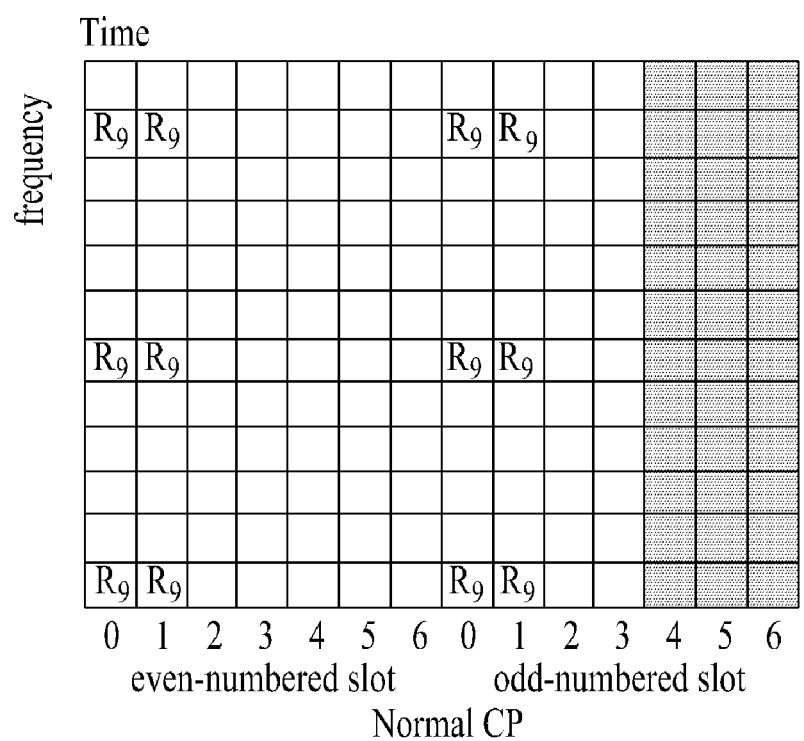
FIGS. 15A to 15D illustrate UE-specific reference signal mapping patterns for antenna port 9 in the case of special subframe configuration 3, 4 or 8 to which the normal CP is applied.
Figure 15B:
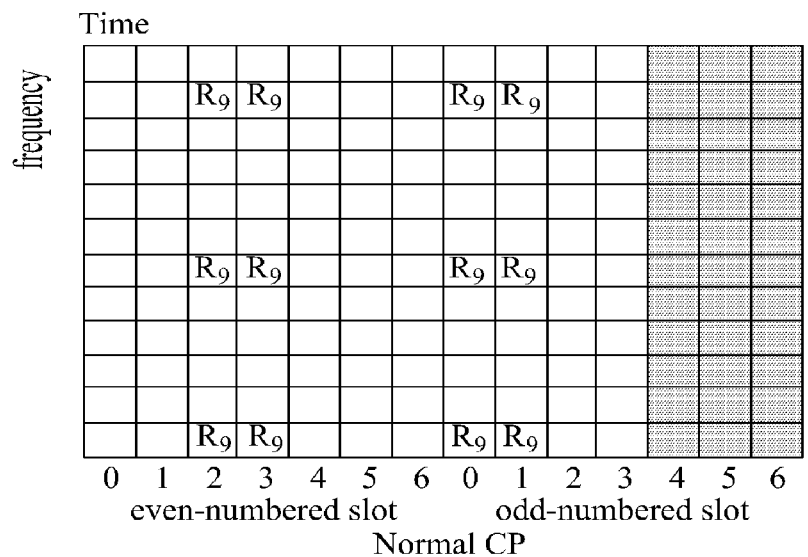
Figure 15C:
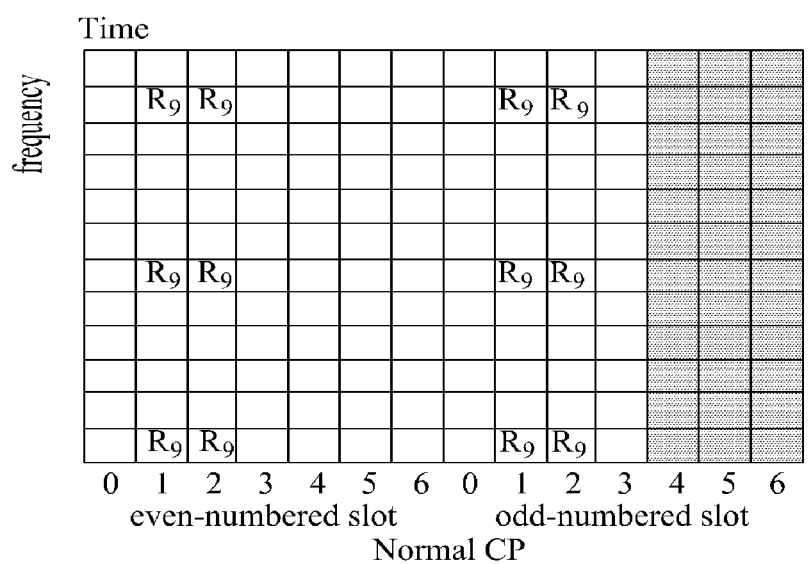
Figure 15D:
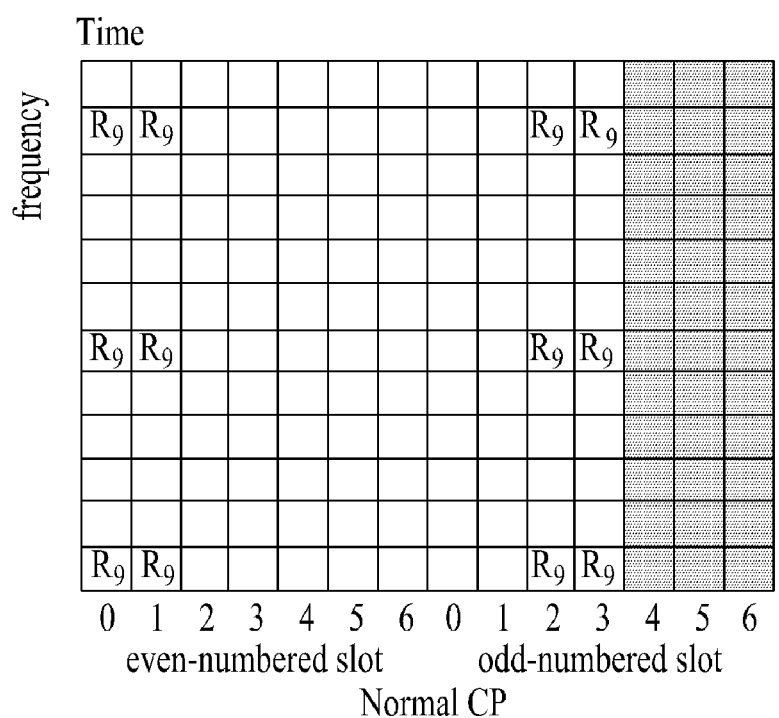
Figure 16A:
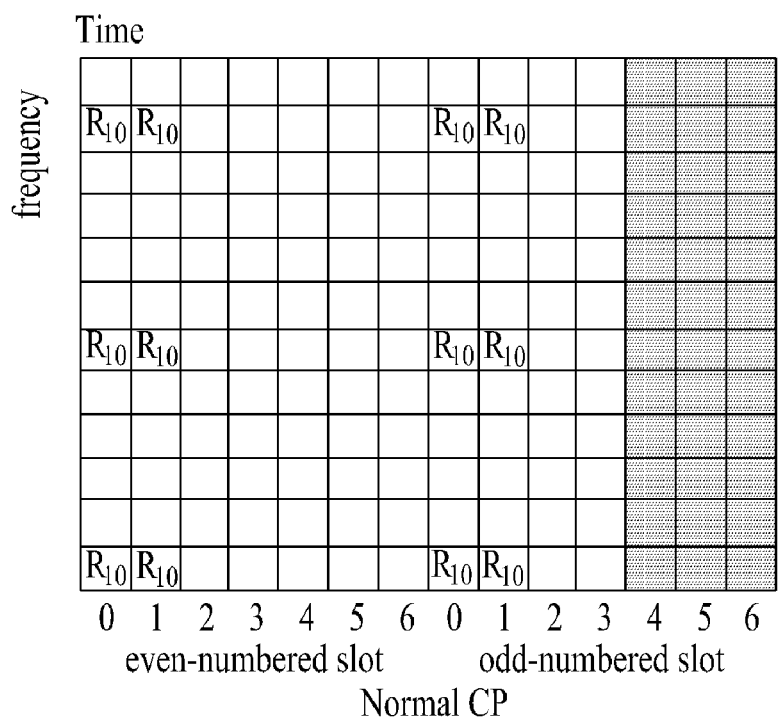
FIGS. 16A to 16D illustrate UE-specific reference signal mapping patterns for antenna port 10 in the case of special subframe configuration 3, 4 or 8 to which the normal CP is applied.
Figure 16B:
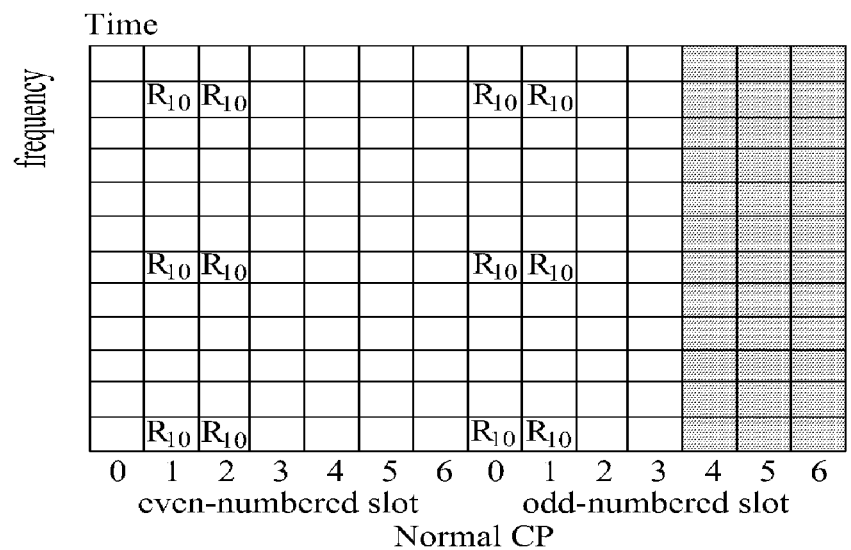
Figure 16C:
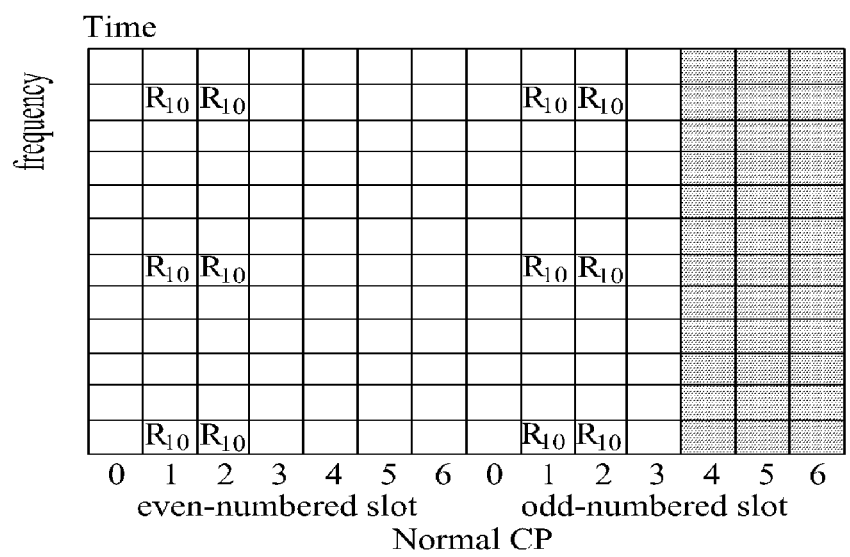
Figure 16D:
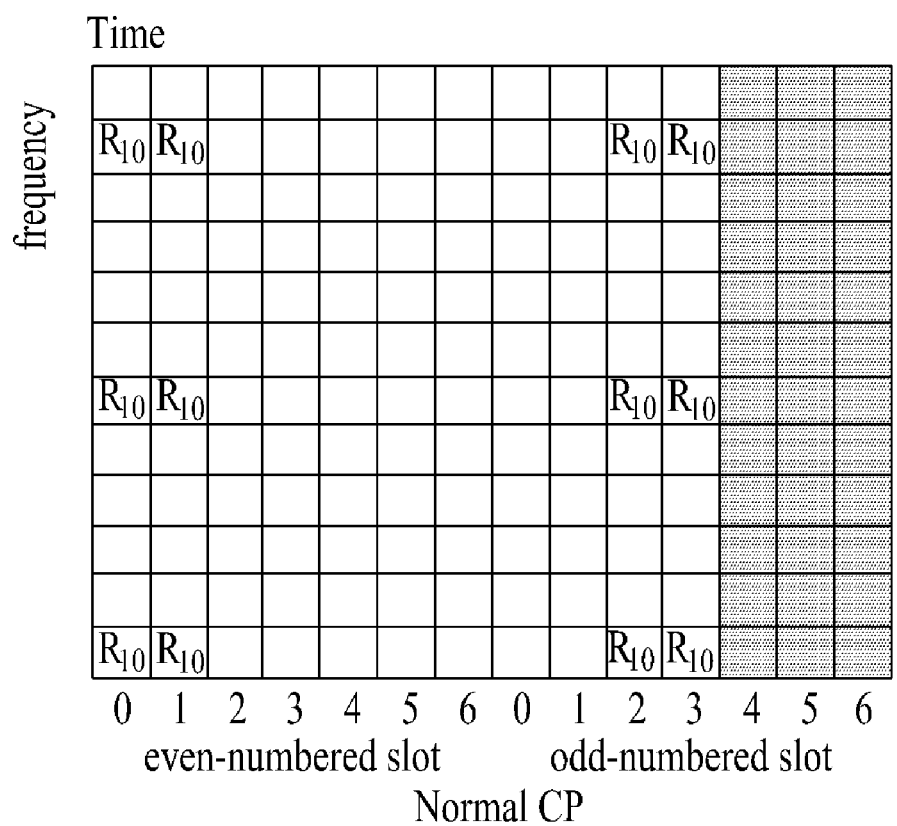
Figure 17A:
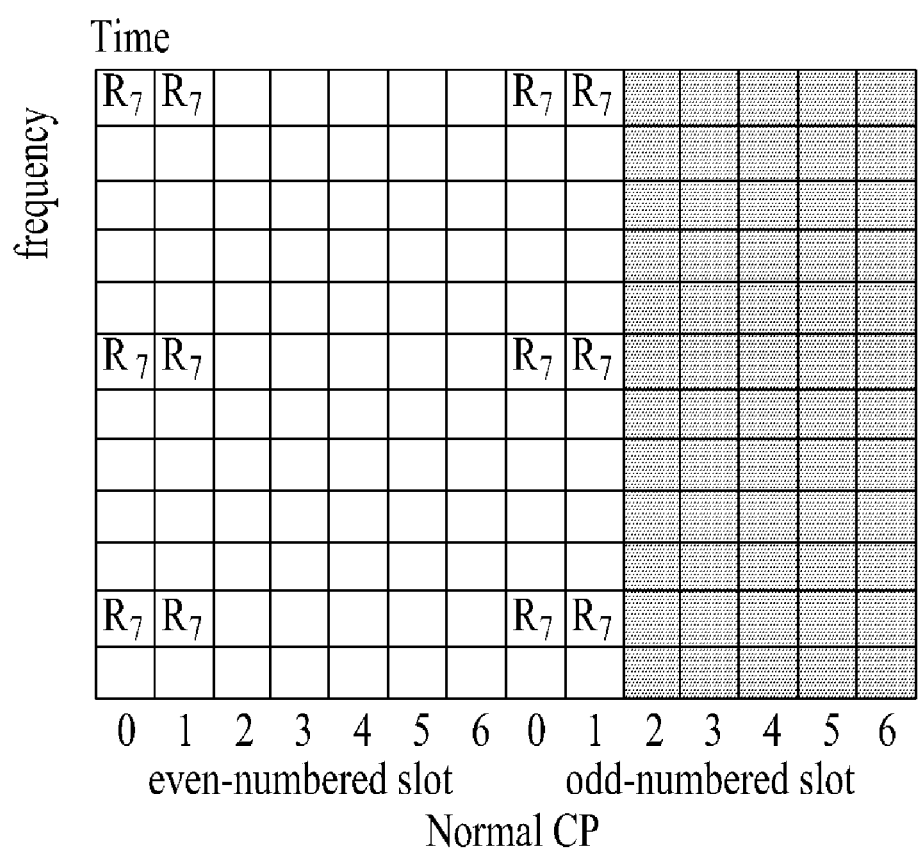
FIGS. 17A to 17D illustrate UE-specific reference signal mapping patterns for antenna port 7 in the case of special subframe configuration 1, 2, 6 or 7 to which the normal CP is applied.
Figure 17B:
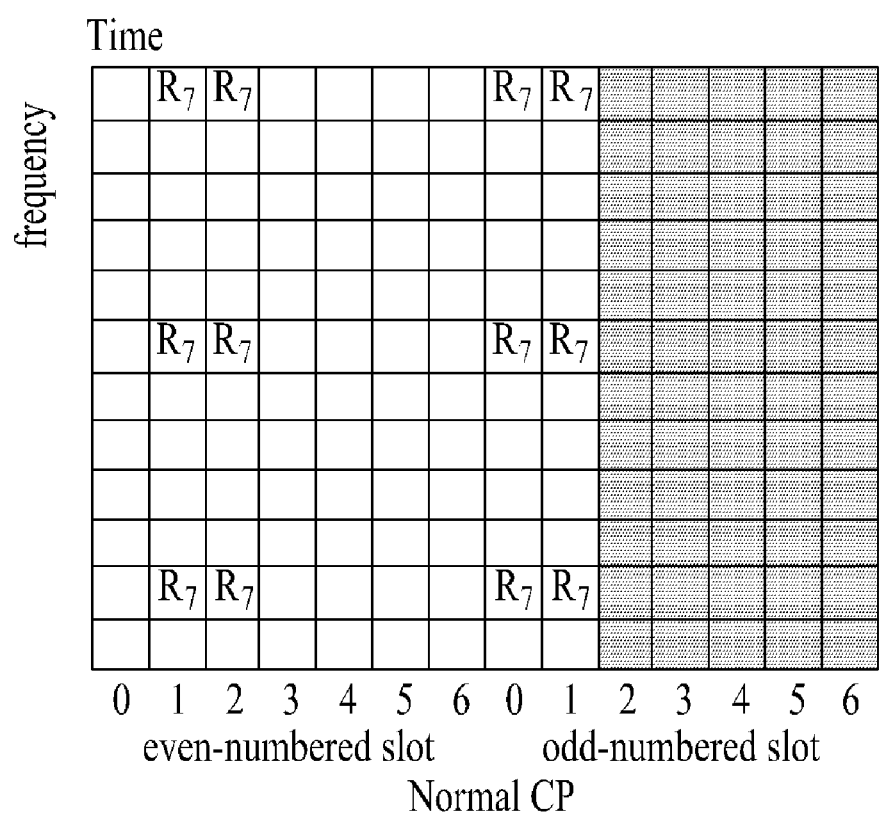
Figure 17C:
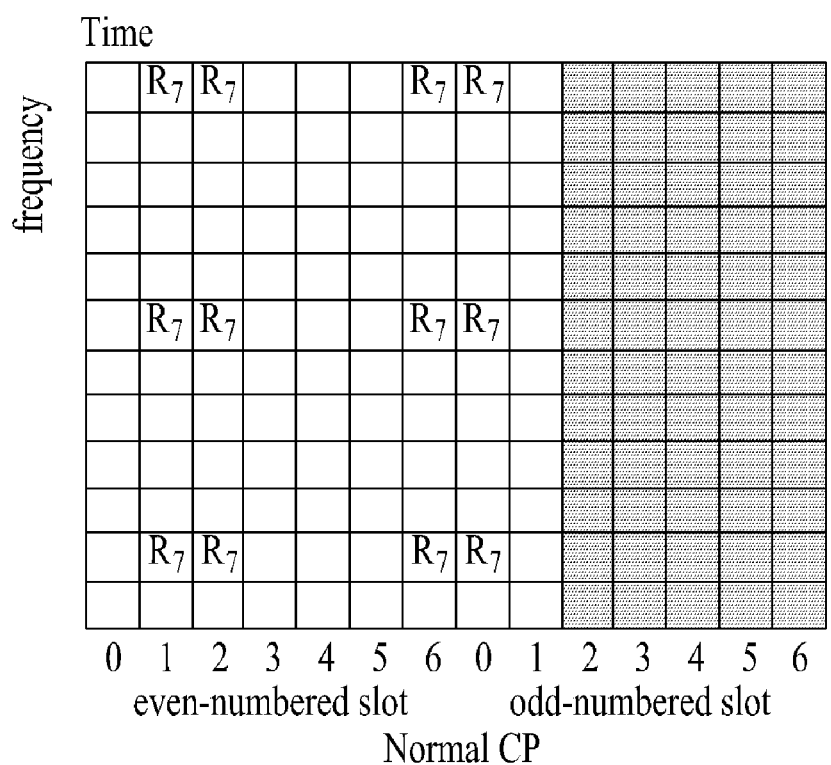
Figure 17D:
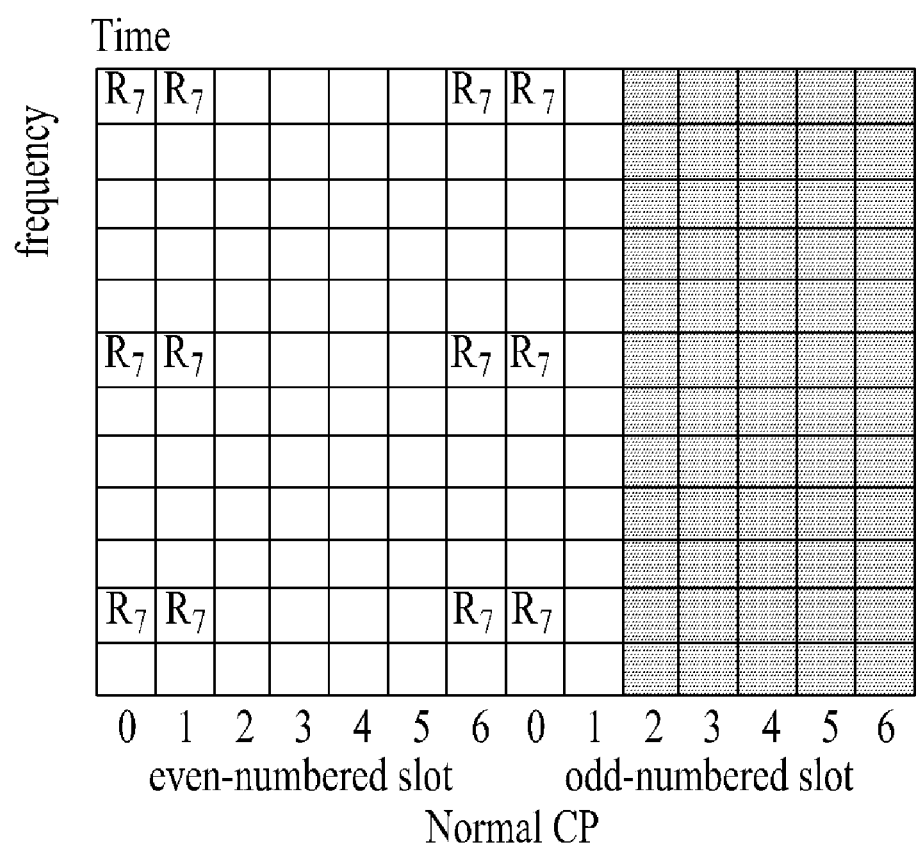
Figure 18A:
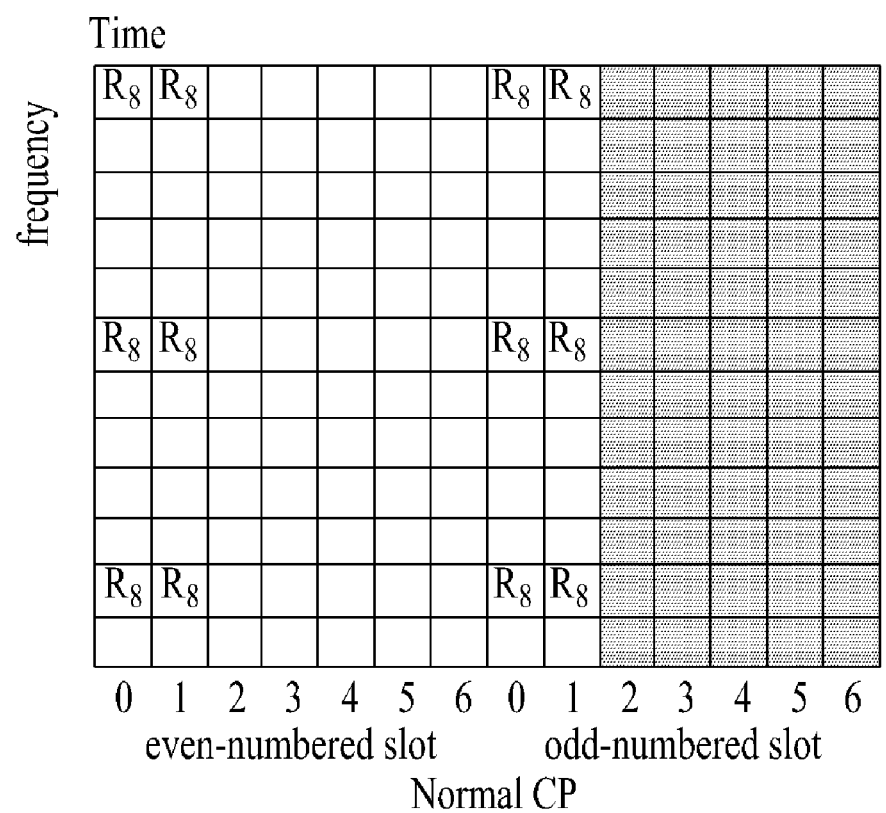
FIGS. 18A to 18D illustrate UE-specific reference signal mapping patterns for antenna port 8 in the case of special subframe configuration 1, 2, 6 or 7 to which the normal CP is applied.
Figure 18B:
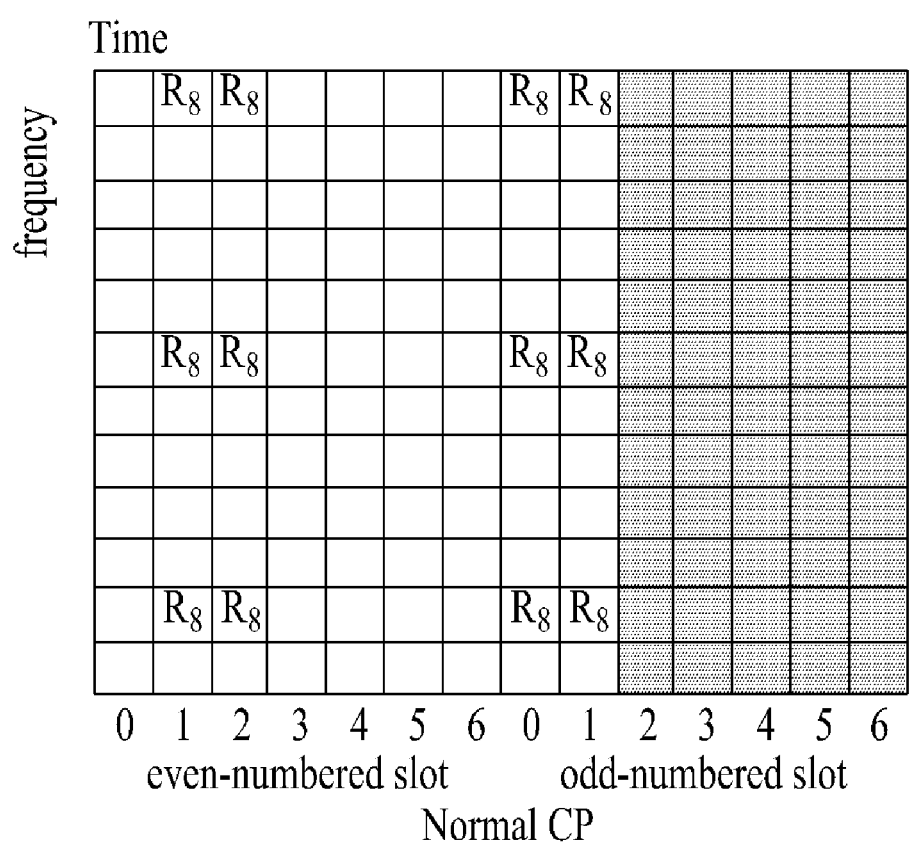
Figure 18C:
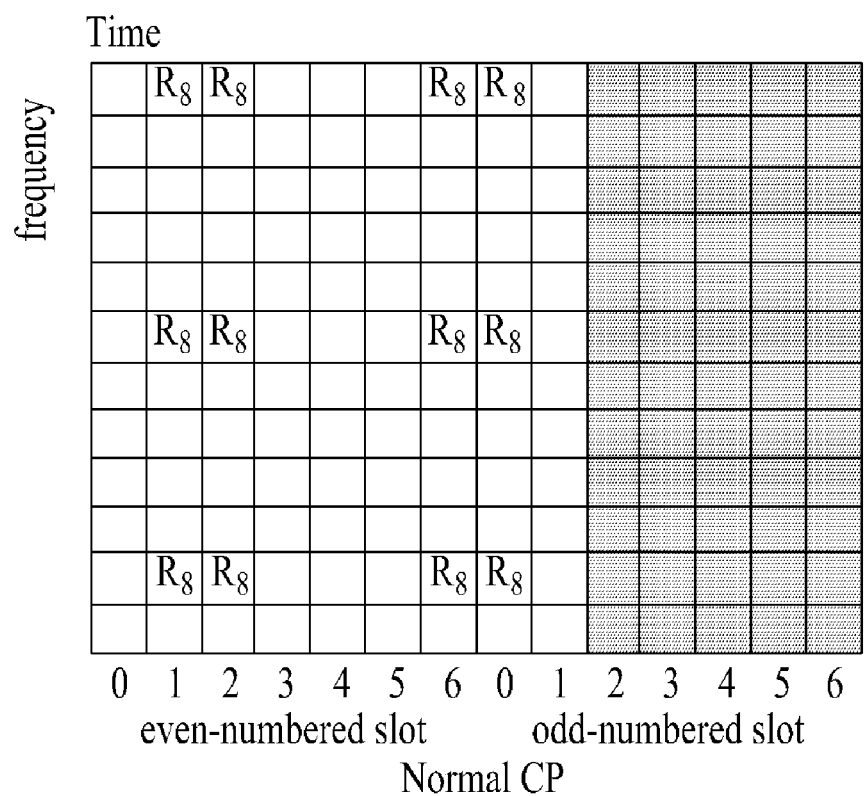
Figure 18D:
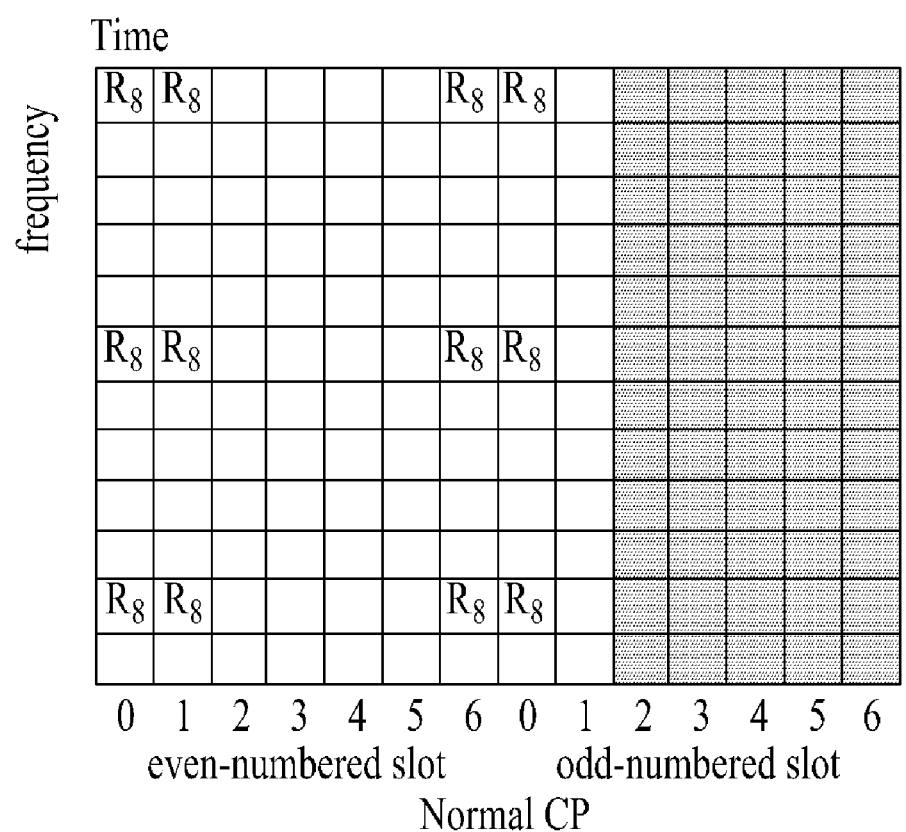
Figure 19A:
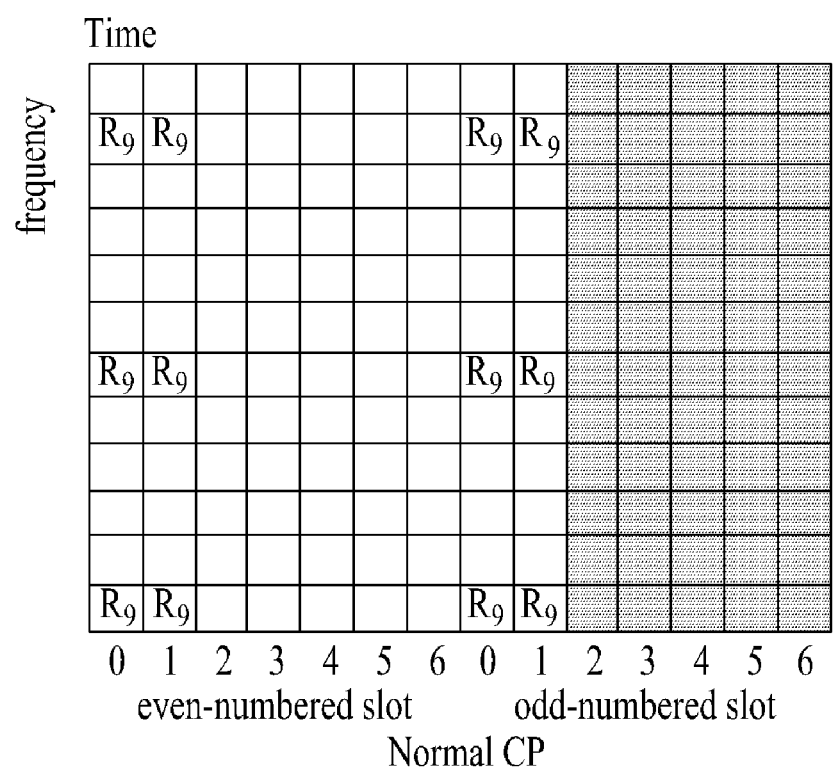
FIGS. 19A to 19D illustrate UE-specific reference signal mapping patterns for antenna port 9 in the case of special subframe configuration 1, 2, 6 or 7 to which the normal CP is applied.
Figure 19B:
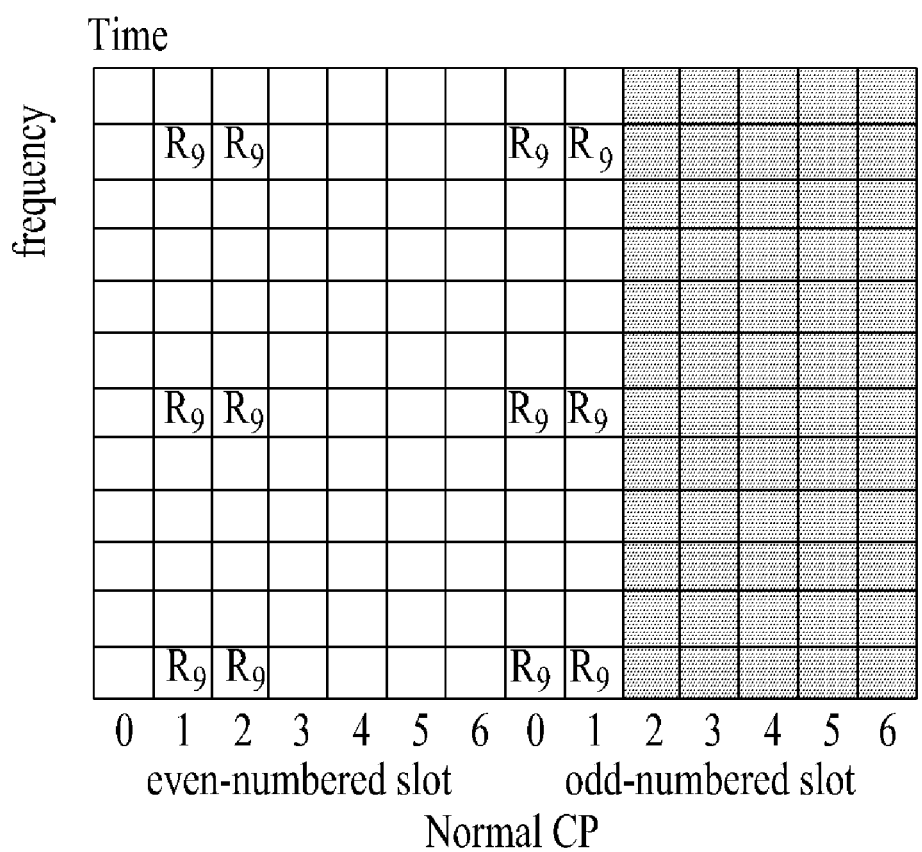
Figure 19C:
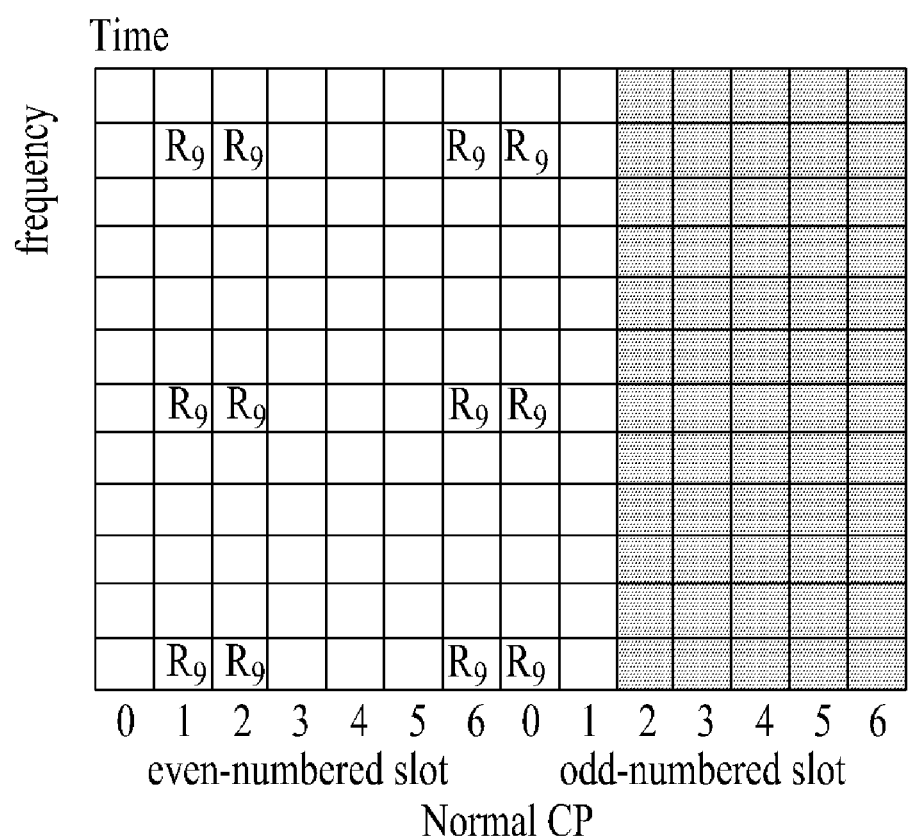
Figure 19D:
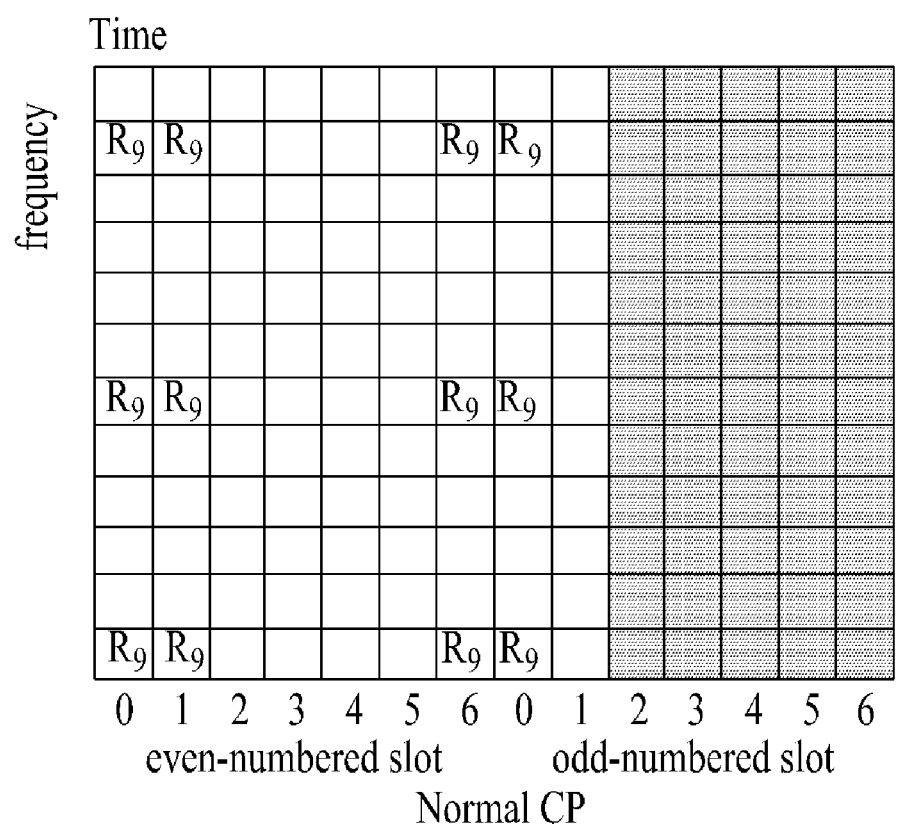
Figure 20A:
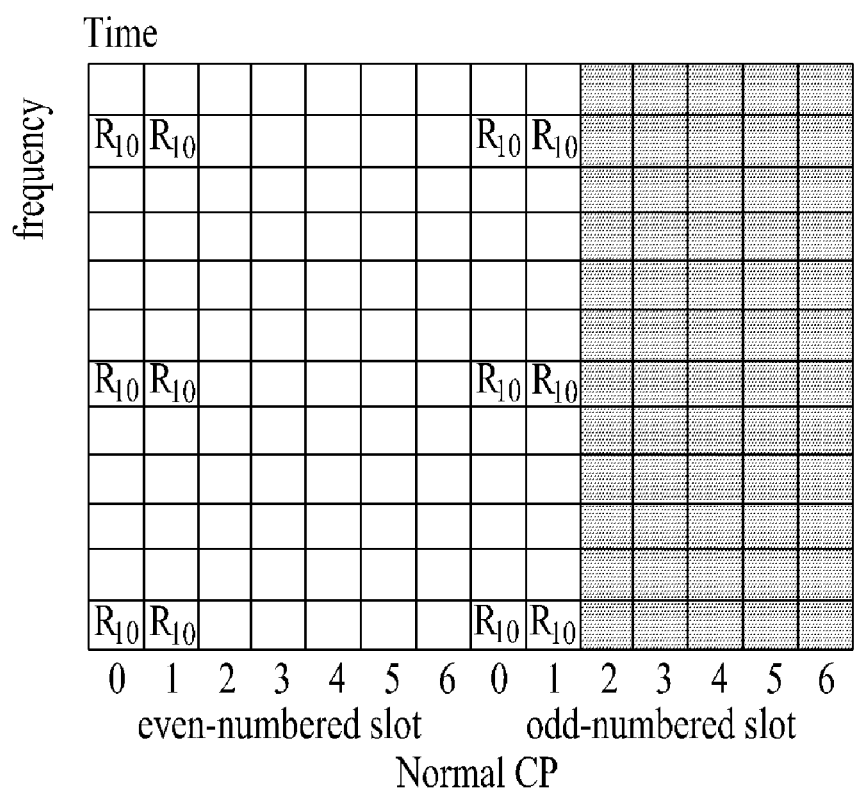
FIGS. 20A to 20D illustrate UE-specific reference signal mapping patterns for antenna port 10 in the case of special subframe configuration 1, 2, 6 or 7 to which the normal CP is applied.
Figure 20B:
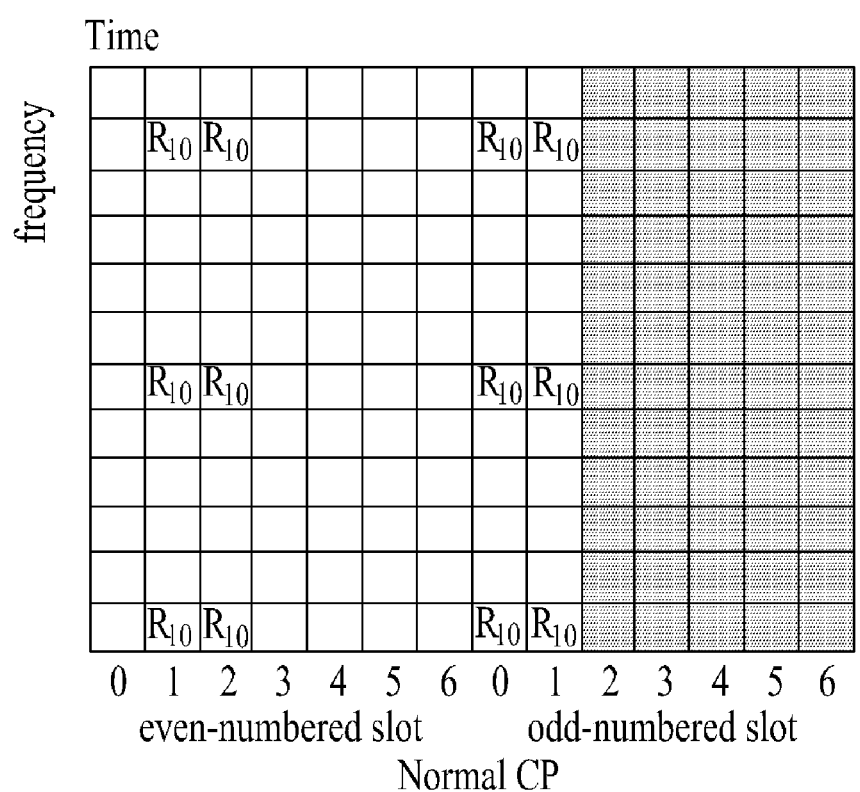
Figure 20C:
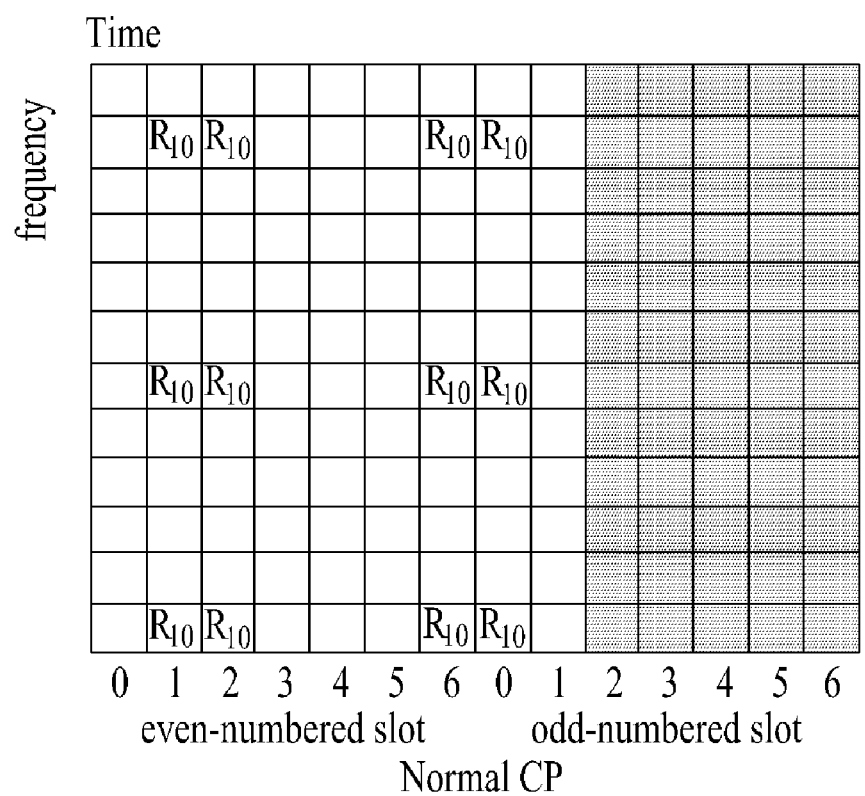
Figure 20D:
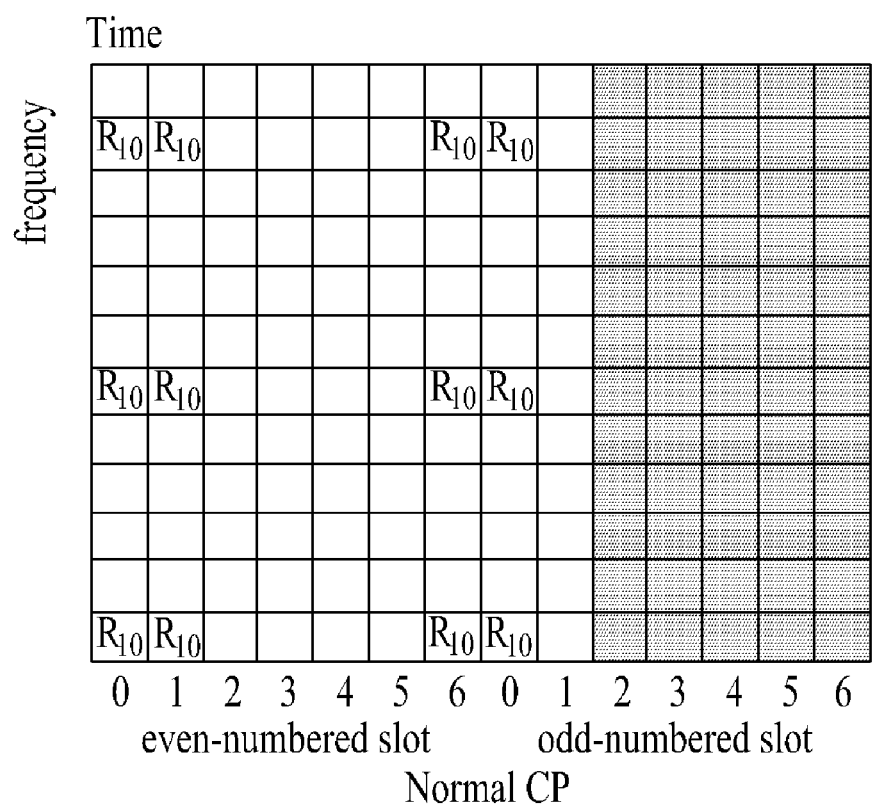
Figure 21A:
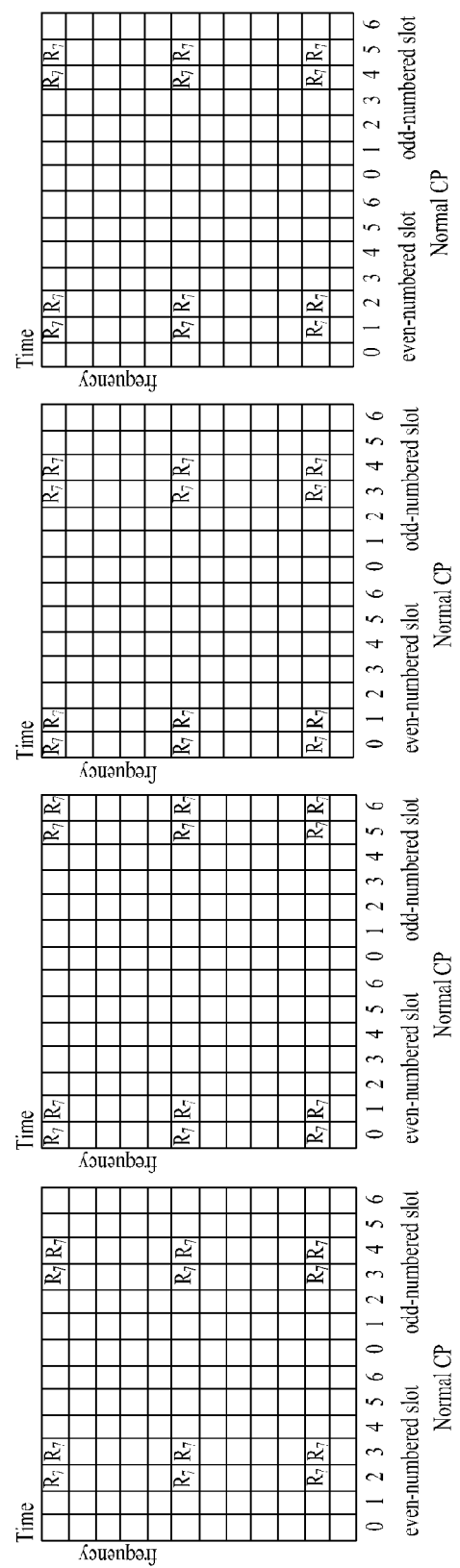
FIGS. 21A to 21E illustrate UE-specific reference signal mapping patterns for antenna port 7 in the case of downlink subframes other than a special subframe, to which the normal CP is applied.
Figure 21B:
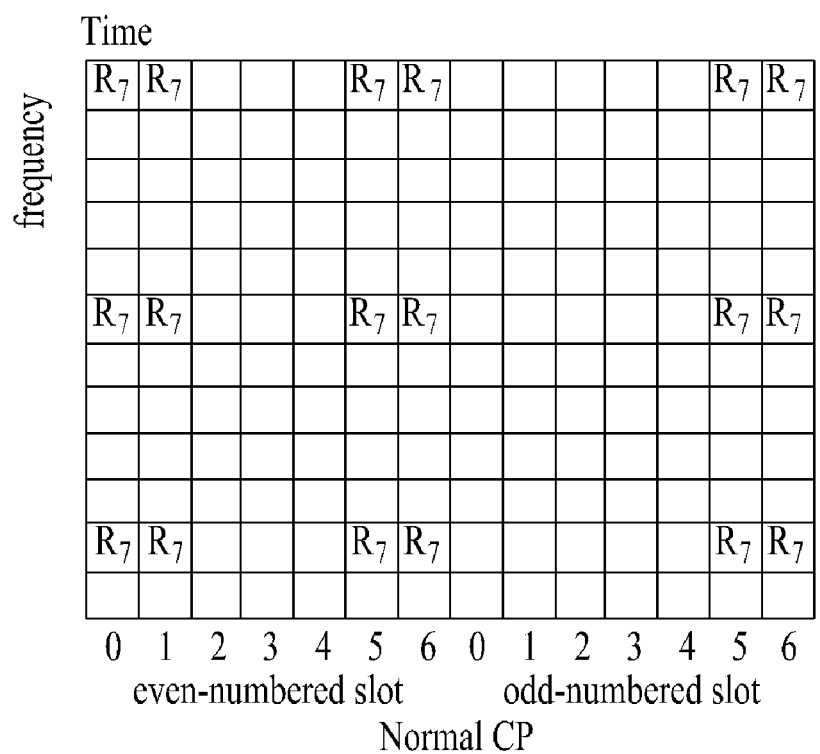
Figure 21C:
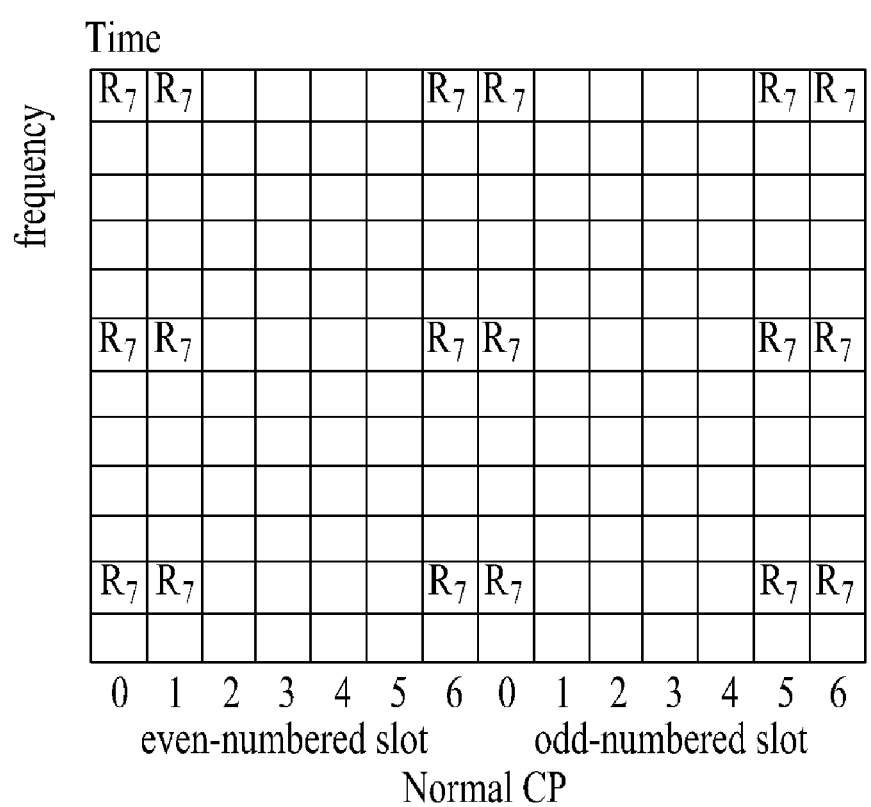
Figure 21D:
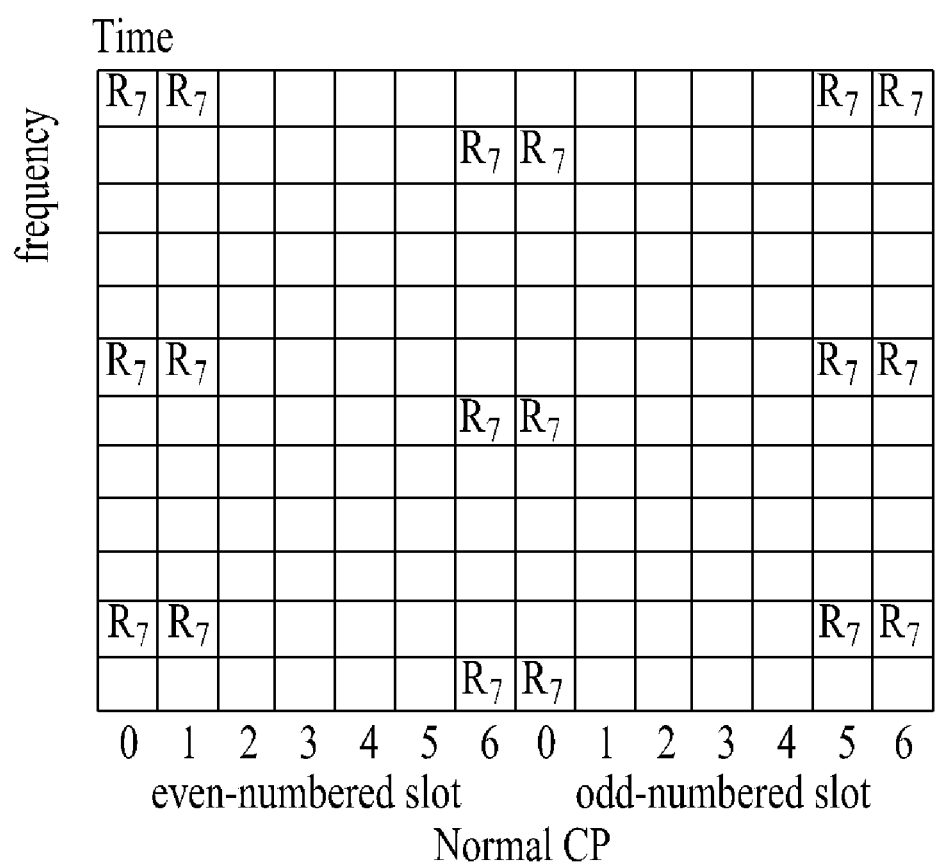
Figure 21E:
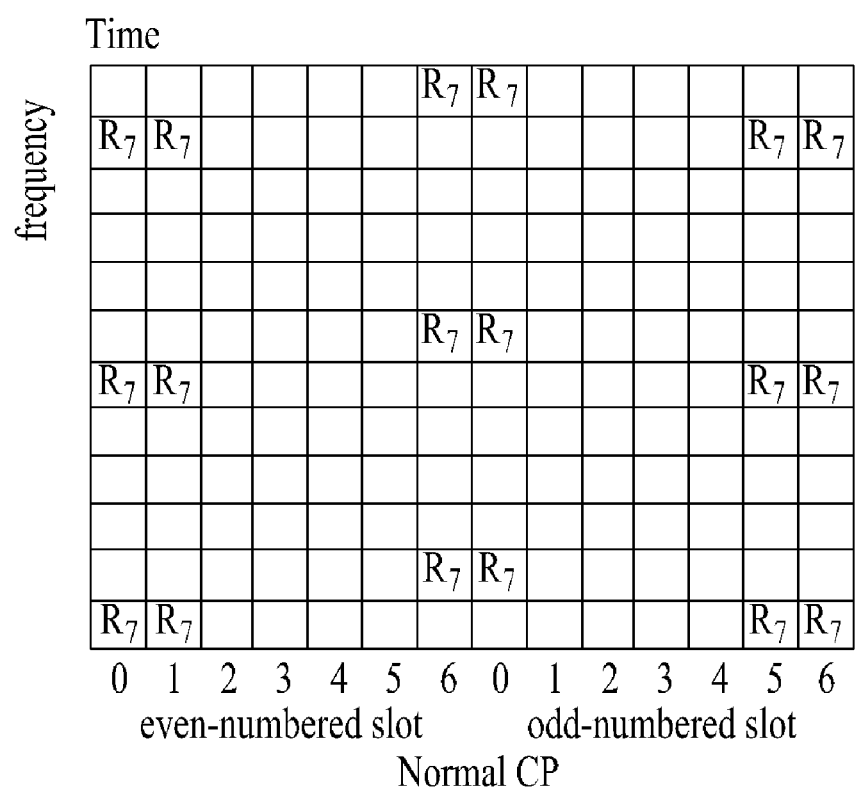
Figure 22A:
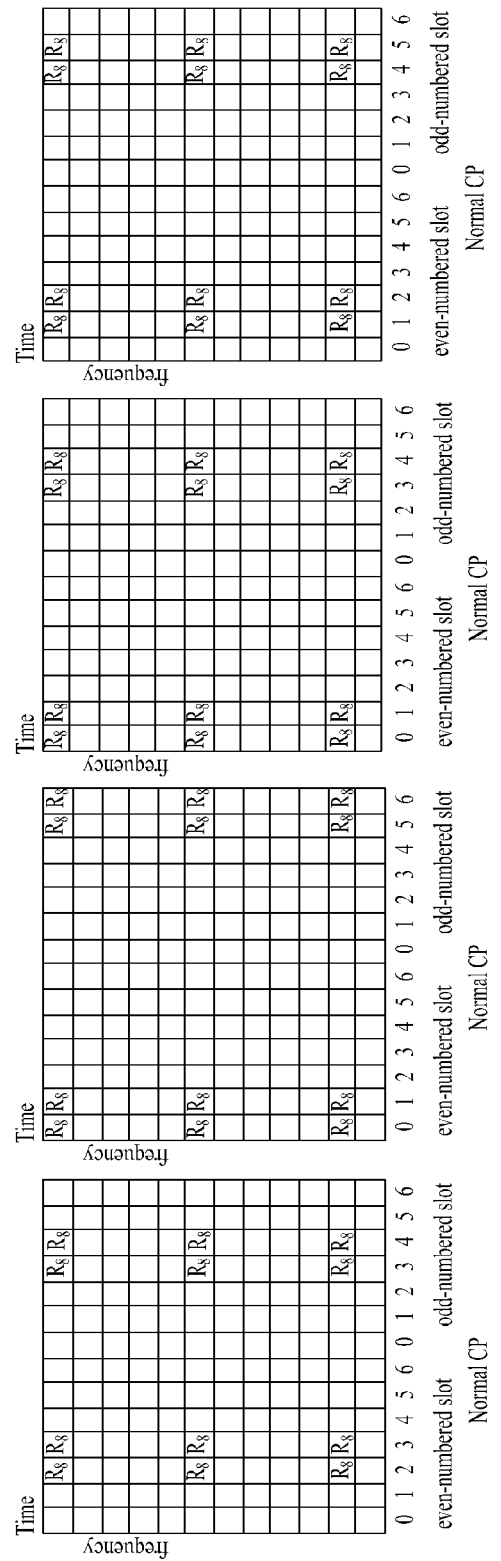
FIGS. 22A to 22E illustrate UE-specific reference signal mapping patterns for antenna port 8 in the case of downlink subframes other than the special subframe, to which the normal CP is applied.
Figure 22B:
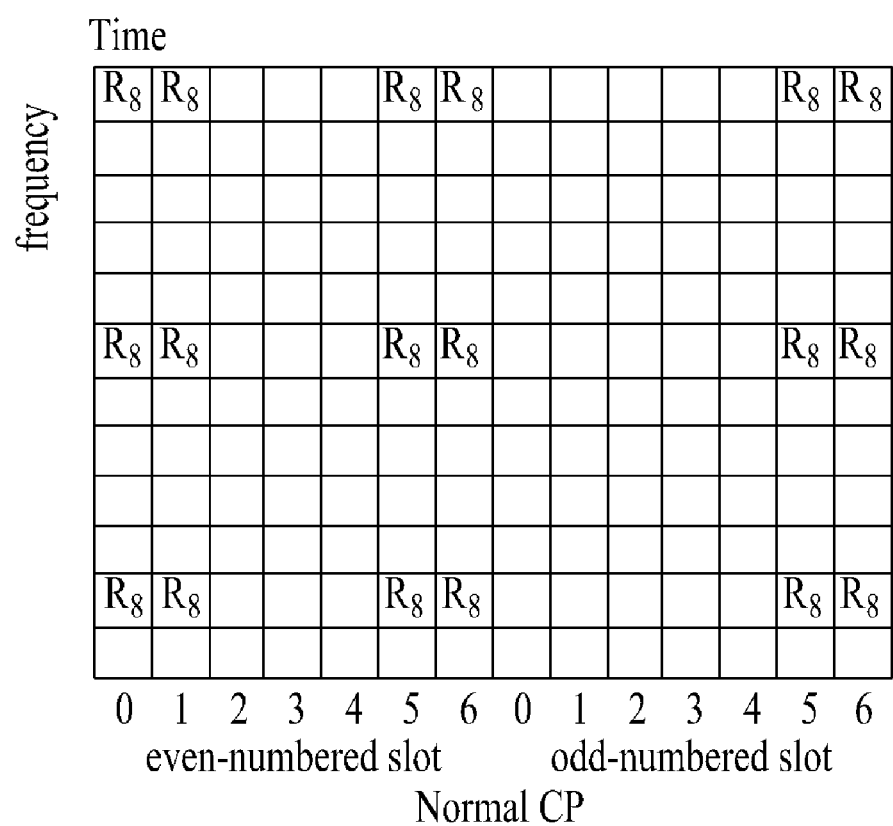
Figure 22C:
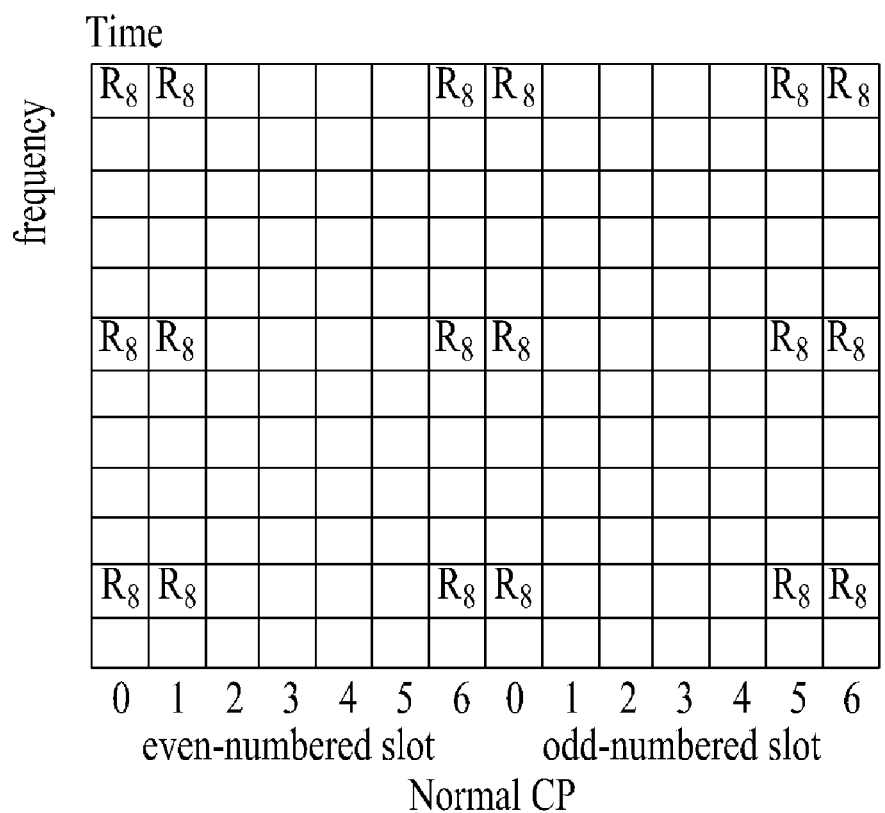
Figure 22D:
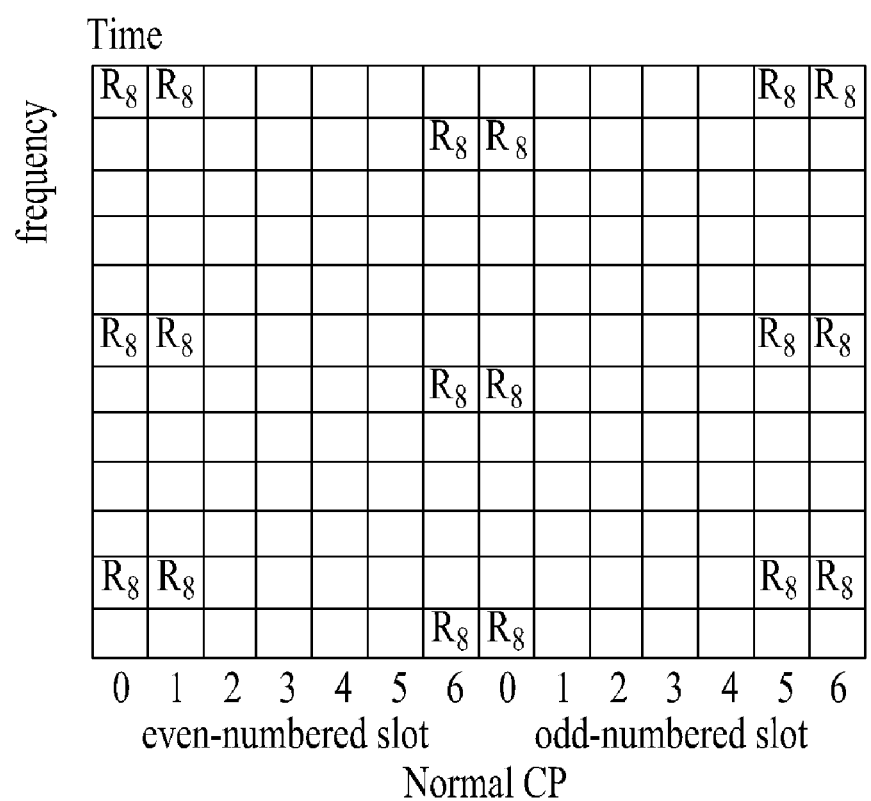
Figure 22E:
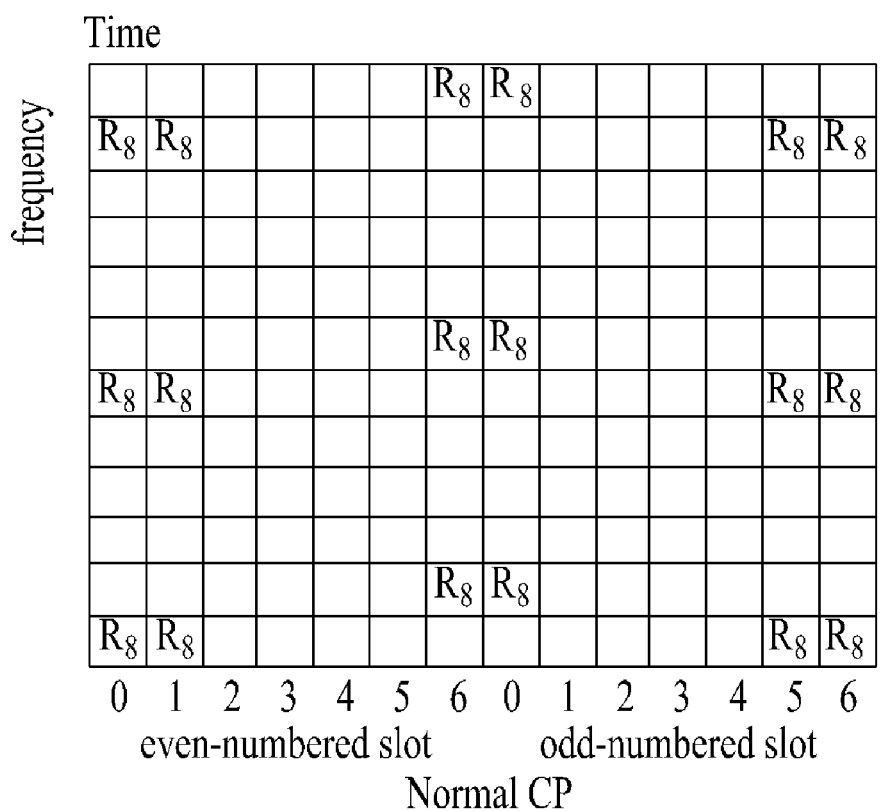
Figure 23A:
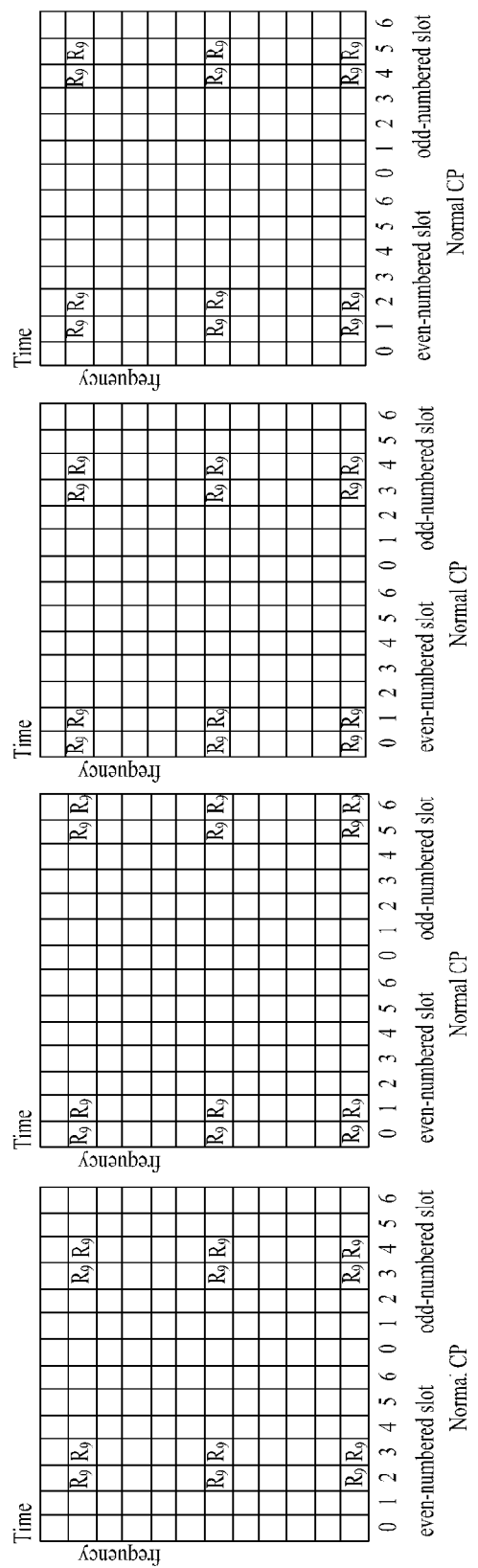
FIGS. 23A to 23E illustrate UE-specific reference signal mapping patterns for antenna port 9 in the case of downlink subframes other than the special subframe, to which the normal CP is applied.
Figure 23B:
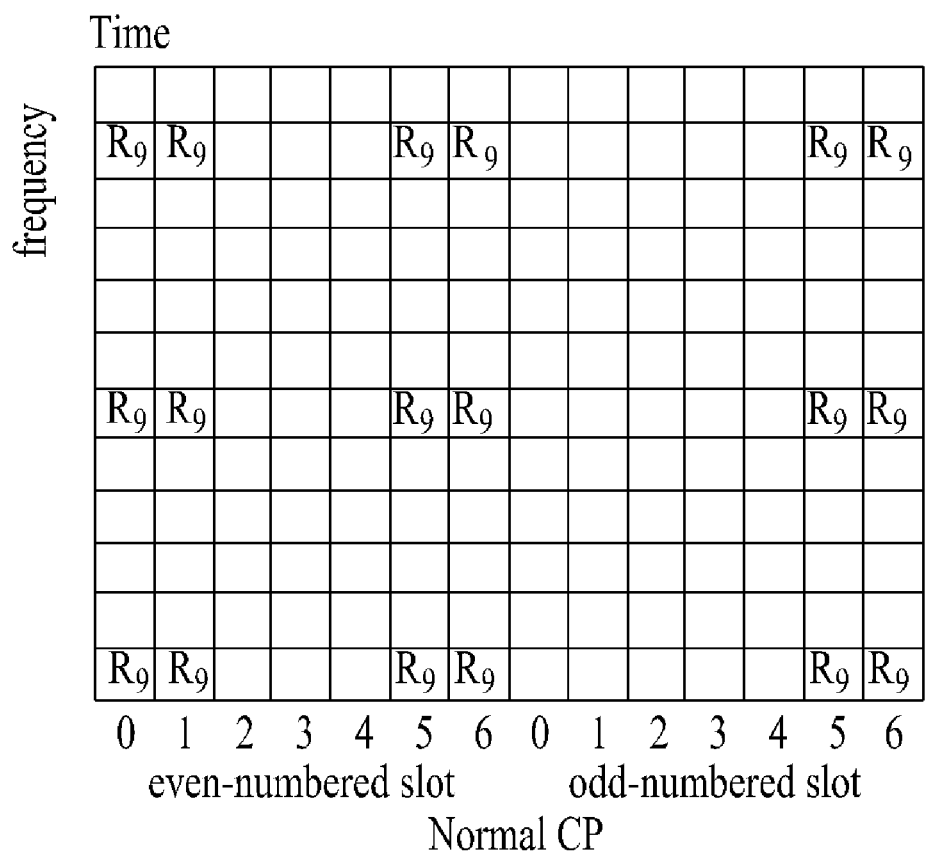
Figure 23C:
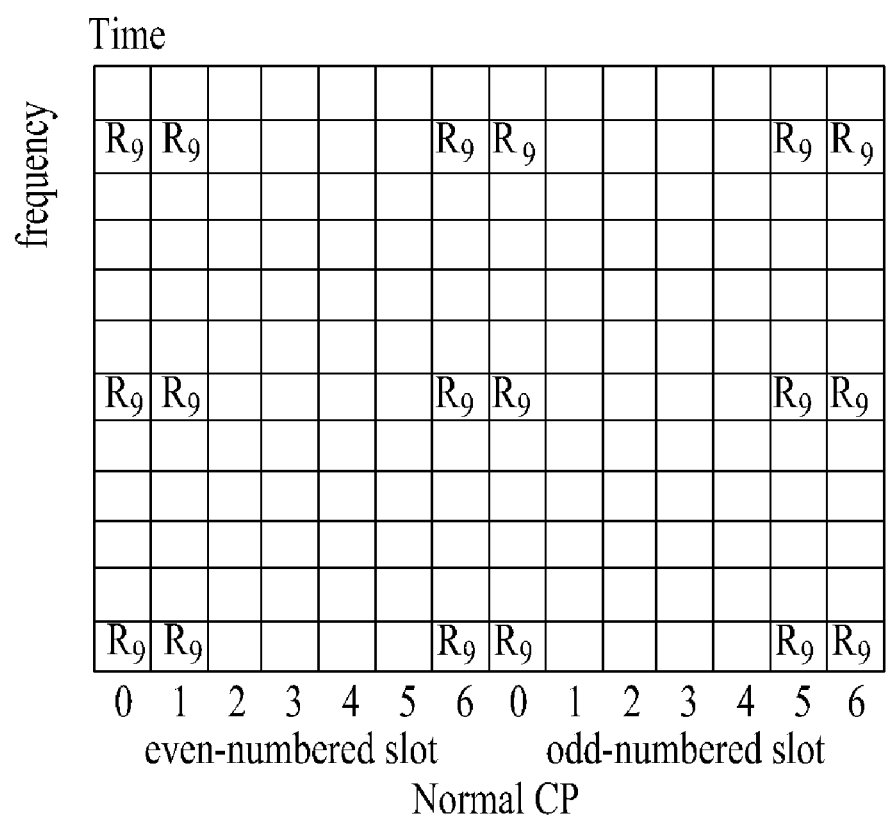
Figure 23D:
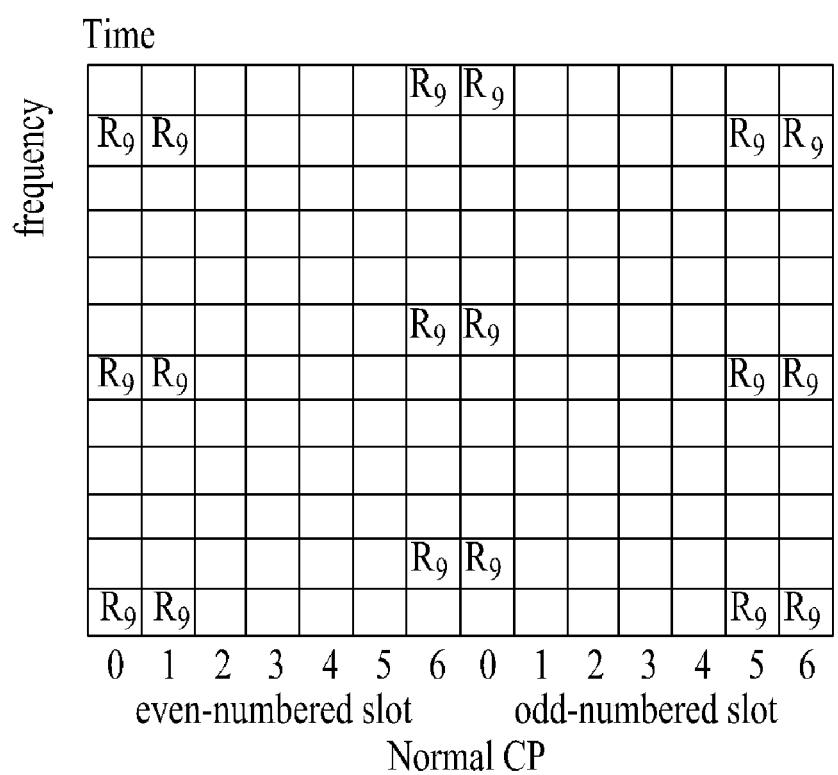
Figure 23E:
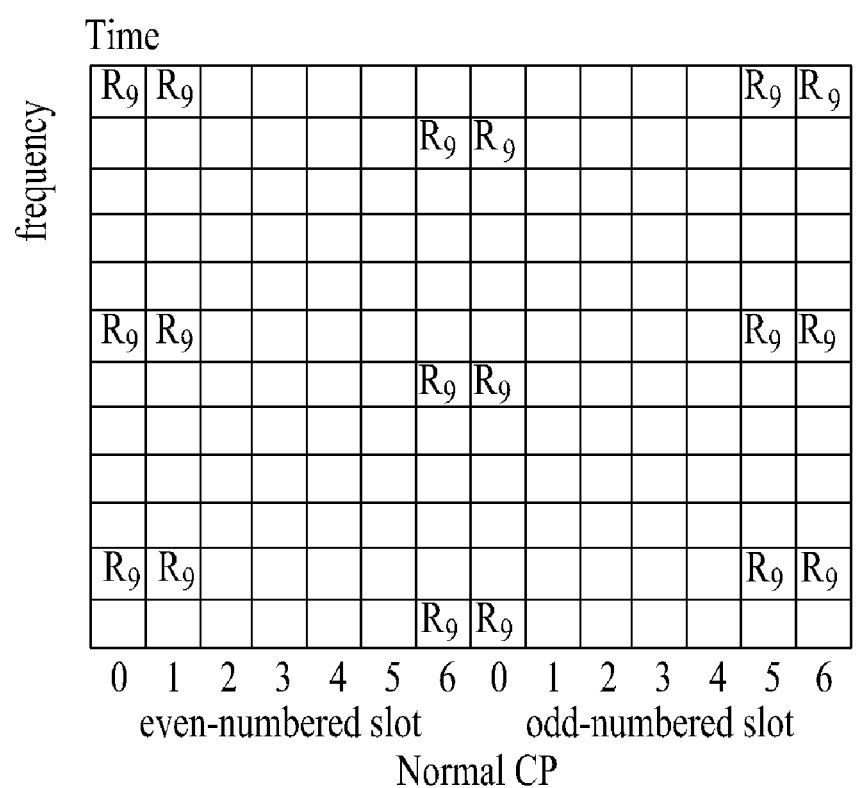
Figure 24A:
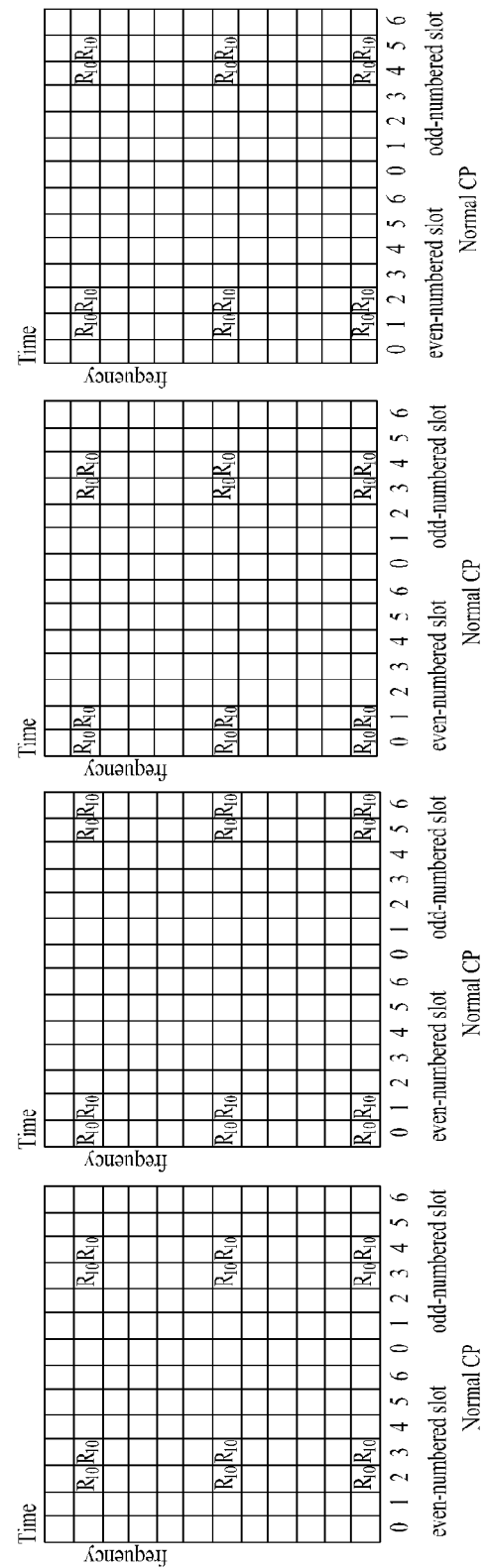
FIGS. 24A to 24E illustrate UE-specific reference signal mapping patterns for antenna port 10 in the case of downlink subframes other than the special subframe, to which the normal CP is applied.
Figure 24B:
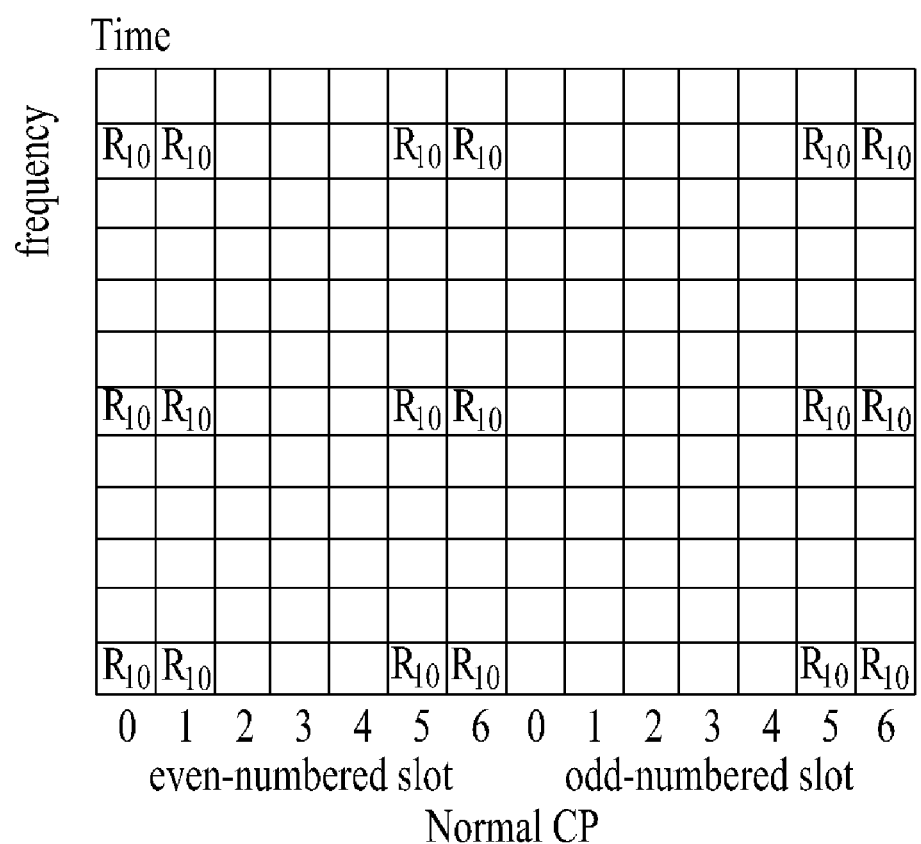
Figure 24C:
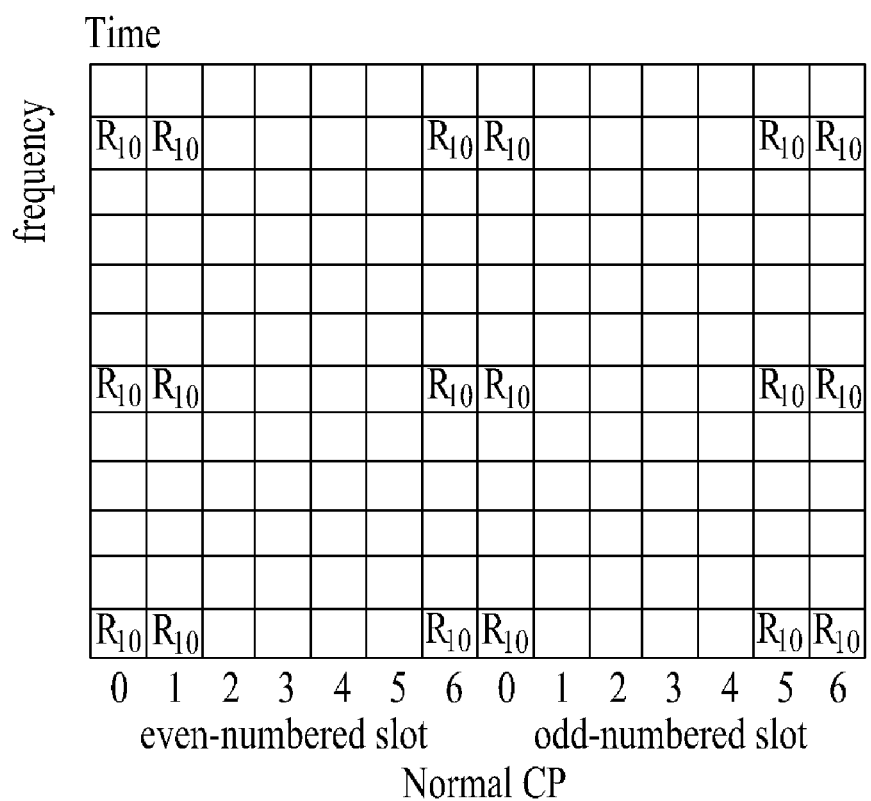
Figure 24D:
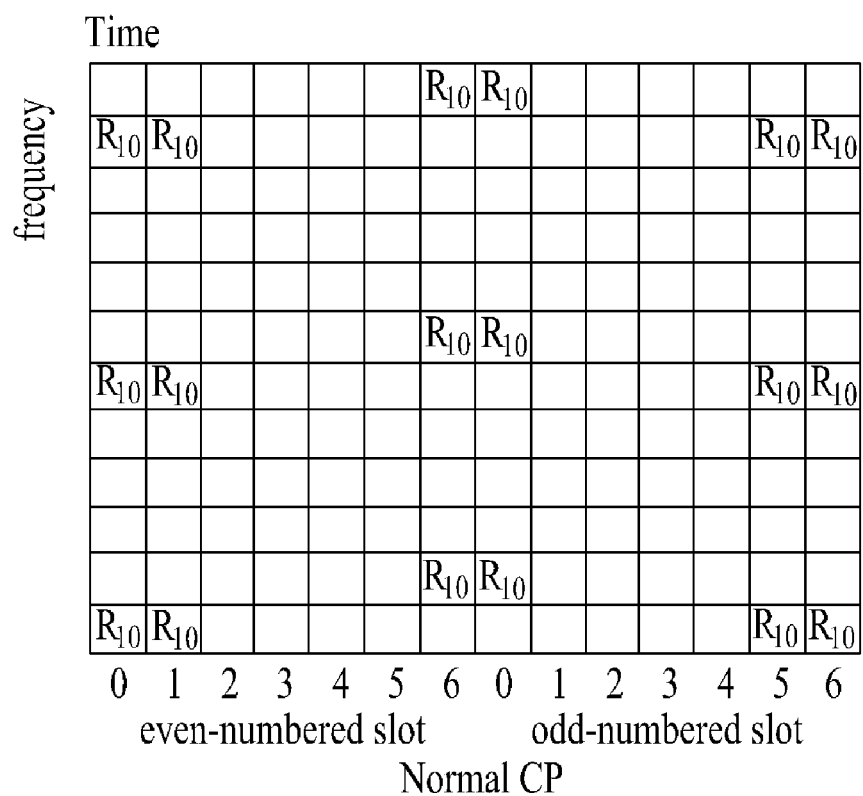
Figure 24E:
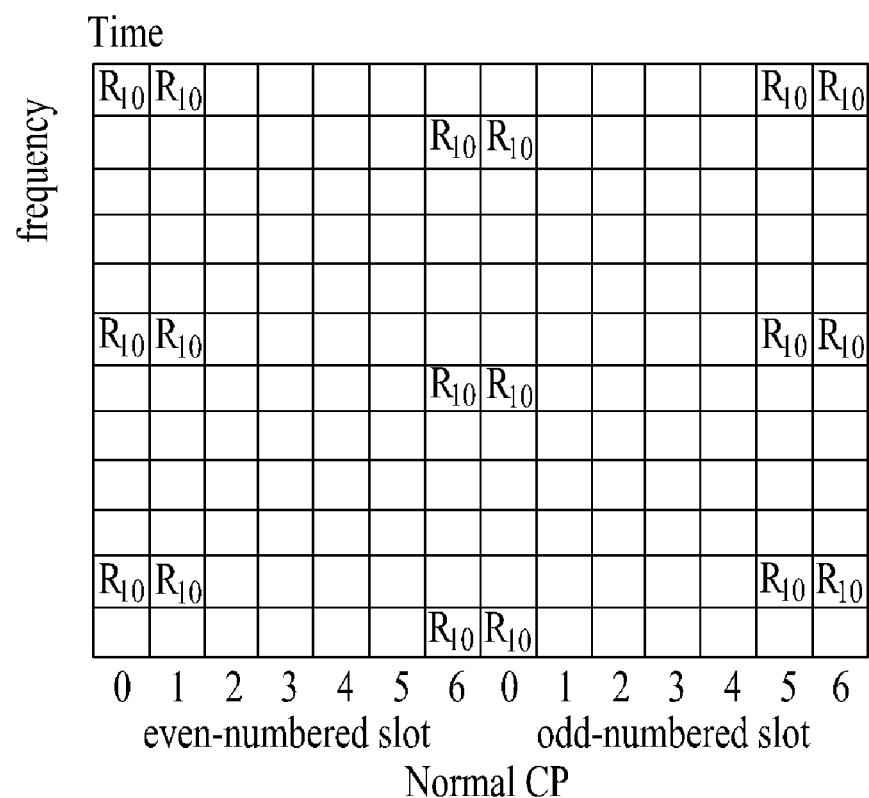
Figure 25A:
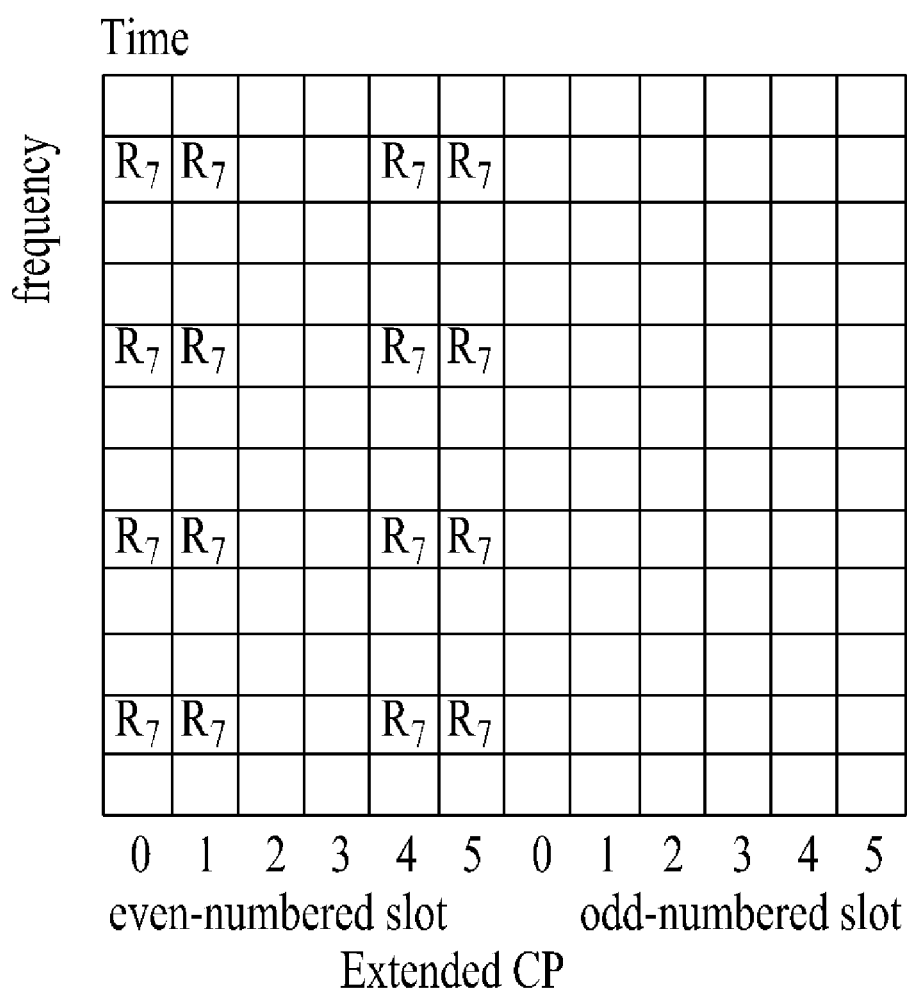
FIGS. 25A to 25G illustrate UE-specific reference signal mapping patterns for antenna port 7 in the case of special subframe configuration 1, 2, 3, 5 or 6 to which the extended CP is applied.
Figure 25B:
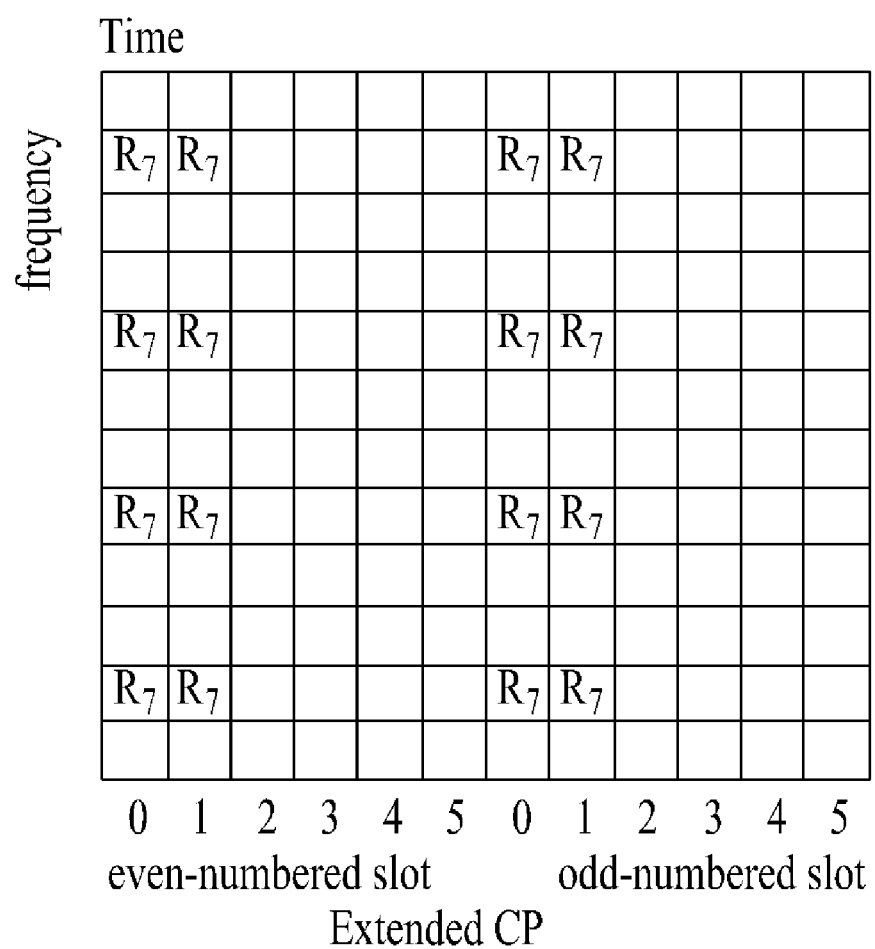
Figure 25C:
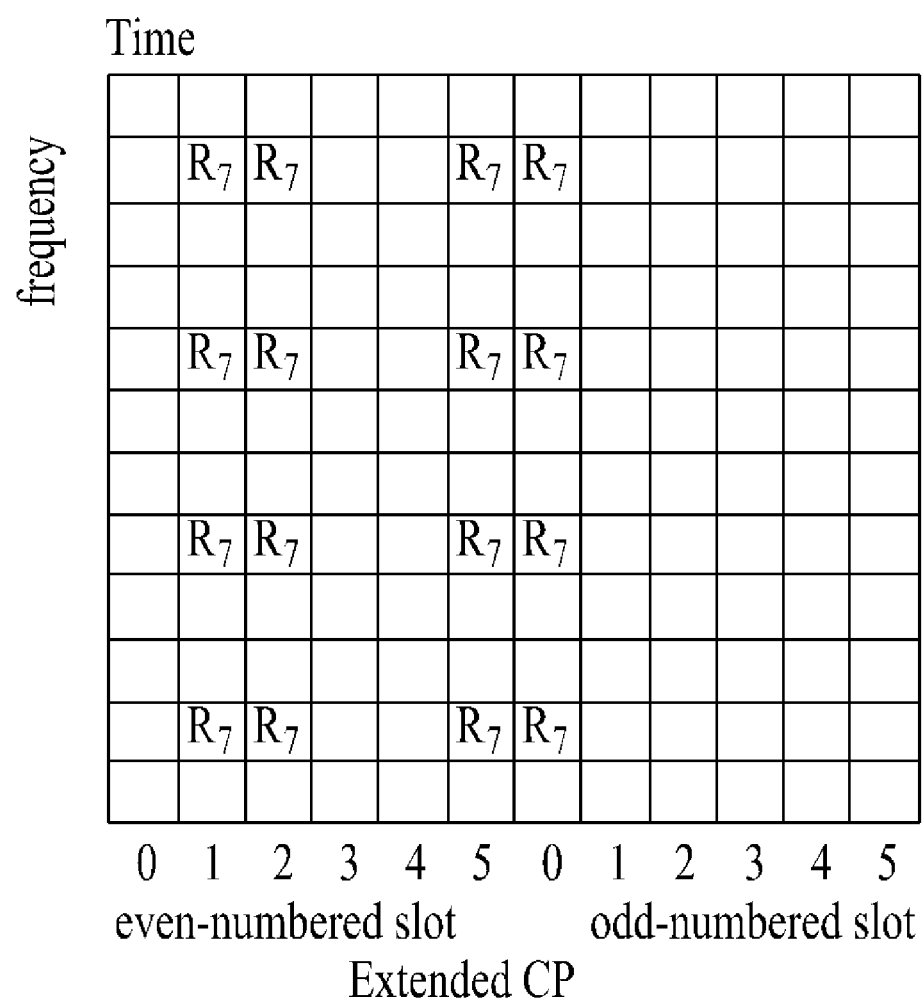
Figure 25D:
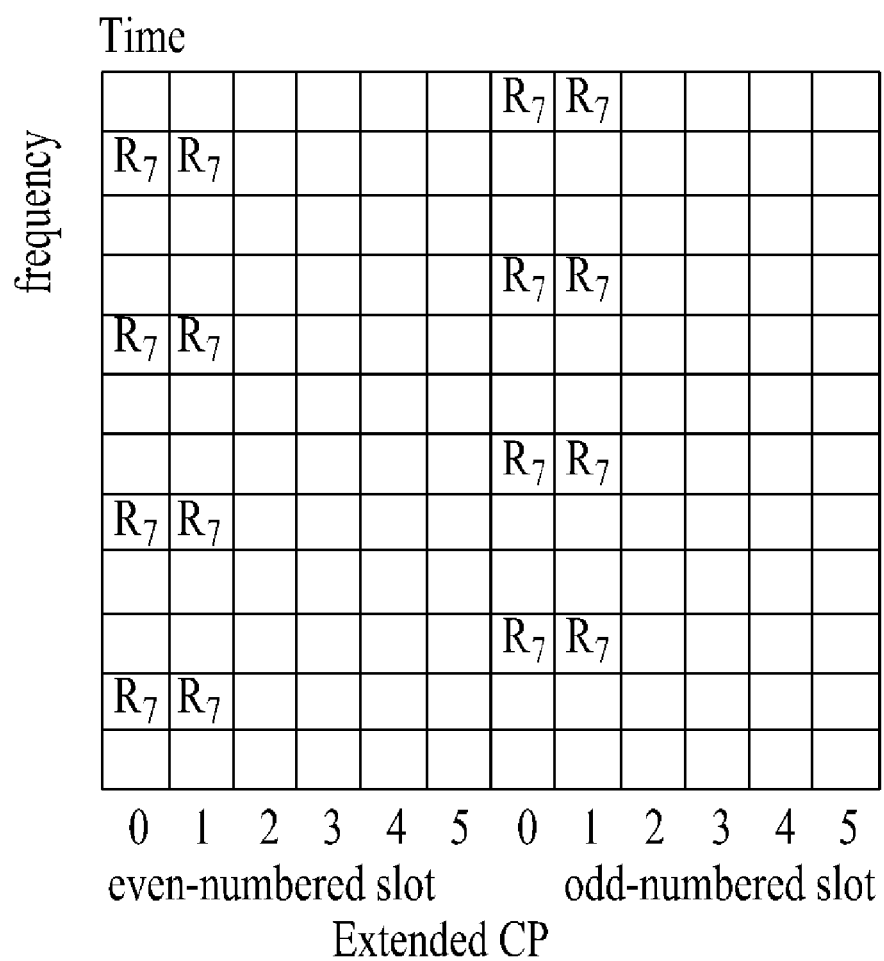
Figure 25E:
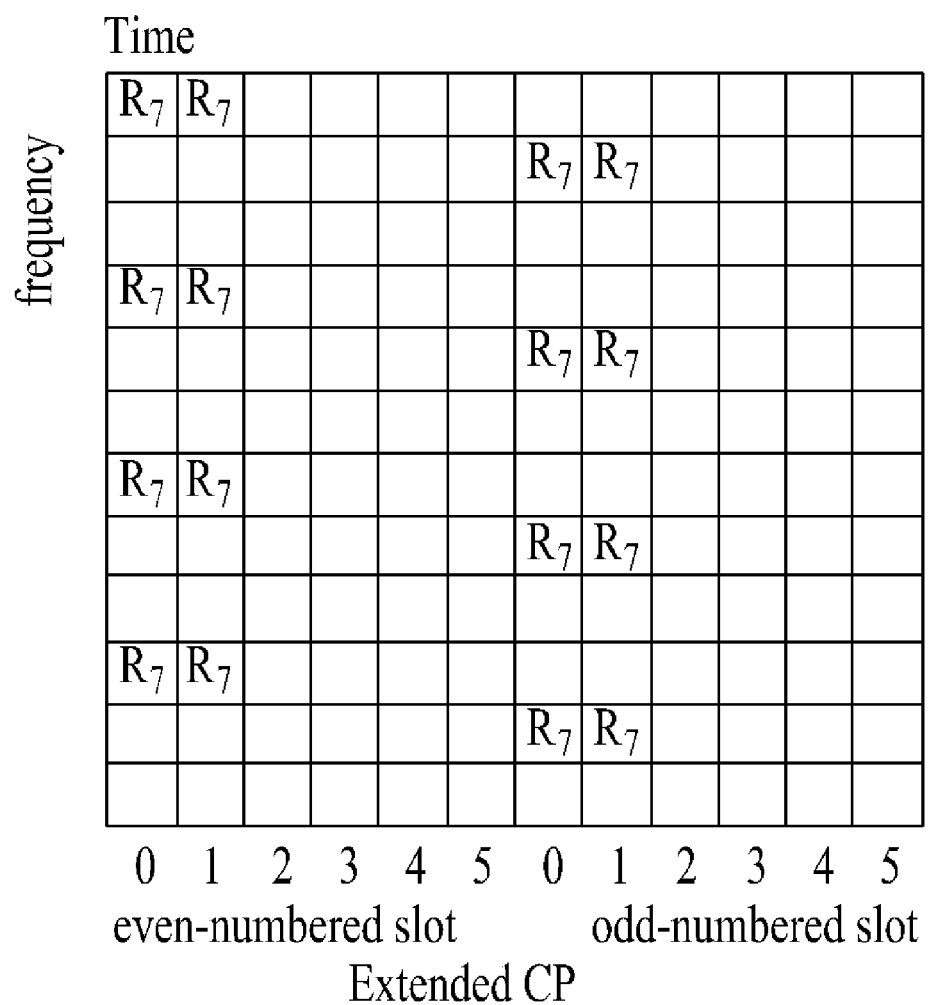
Figure 25F:
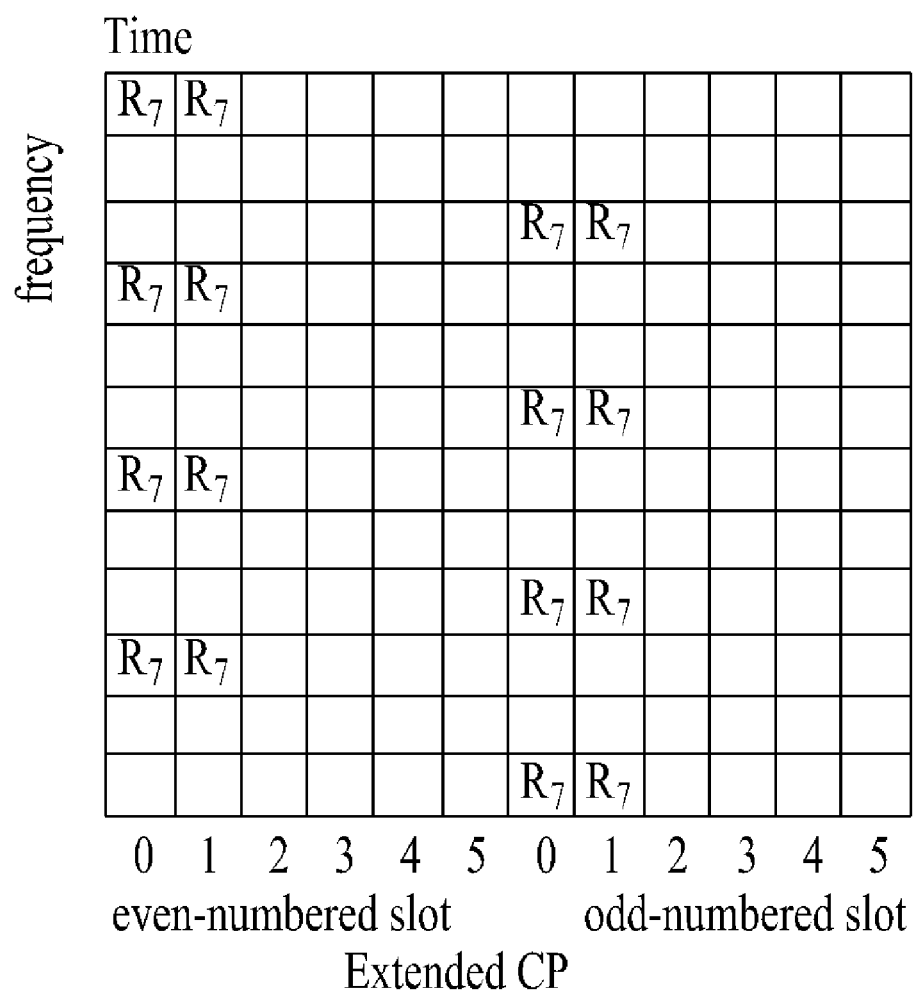
Figure 25G:
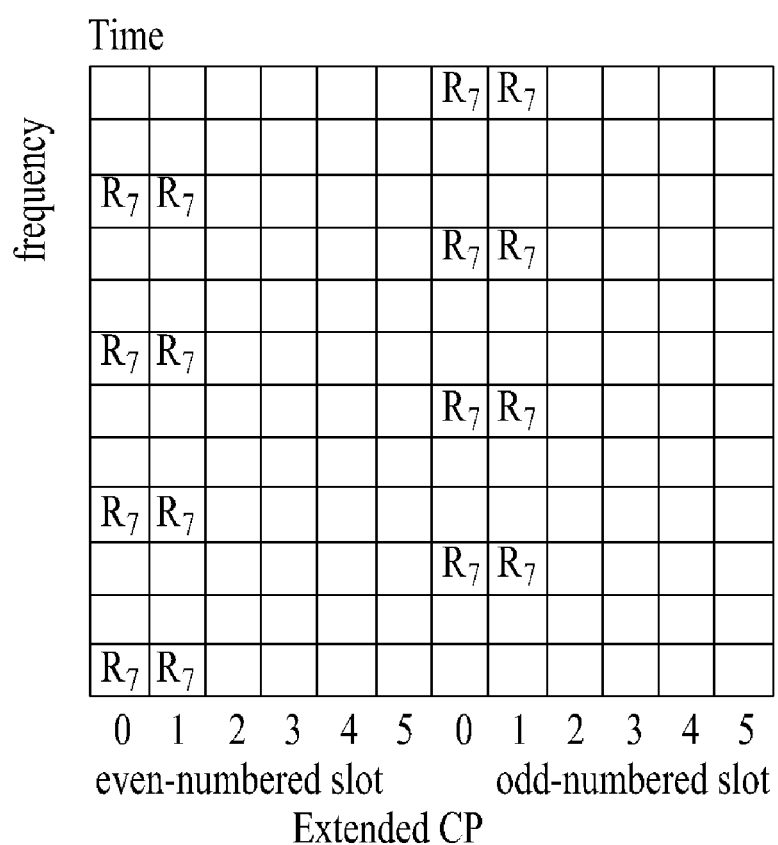

FIG. 10 illustrates UE-specific reference signal mapping patterns when the extended CP is applied to antenna ports 7 and 8.

In FIG. 10, REs denoted by $R_7$ and $R_8$ correspond to REs to which UE-specific reference signals for antenna ports 7 and 8 are respectively mapped. Upper part of FIG. 10 shows UE-specific reference signal mapping patterns for antenna ports 7 and 8 corresponding to special subframe configuration 1, 2, 3, 5 or 6 and the lower part of FIG. 10 shows UE-specific reference signal mapping patterns for antenna ports 7 and 8 in the case of all downlink subframes other than the special subframe.

In 3GPP LTE, the first OFDM symbol of a subframe carries downlink control information (e.g. PDCCH) and a UE-specific reference signal is designed based on this fact. However, when data instead of the downlink control information is loaded in the first OFDM symbol, data processing performance is deteriorated. To solve this problem, a new UE-specific reference signal pattern is needed.

The present invention proposes UE-specific reference mapping patterns for a case in which data instead of a downlink control channel is loaded at the start of a subframe. These mapping patterns may be designed having existing reference signal overhead maintained or increased.

In the following figures, UE-specific reference signal mapping patterns are designed in RB in the time and frequency domains and may be extended to the entire system bandwidth. Furthermore, while a UE-specific reference signal mapping pattern is designed per antenna port, the present invention is not limited thereto and antenna port mapping may be reset as necessary. In addition, UE-specific reference signal patterns shown in the following figures may be used without an antenna port.

The sequences represented by the above-described equations 1 to 4 may be used as a sequence loaded on a UE-specific reference signal or may be extended and used as the sequence. Otherwise, a new sequence generation equation may be designed and used.

FIGS. 11A to 11M illustrate UE-specific reference signal mapping patterns for antenna port 5 when normal CP is applied according to embodiments of the present invention.

In FIGS. 11A to 11M, REs denoted by R5 correspond to REs to which a UE-specific reference signal for antenna port 5 is mapped. In the case of normal CP, the UE-specific reference signal can be mapped to REs corresponding to two or three symbol indices per slot and mapped to REs corresponding to three subcarrier indices in the frequency domain.

FIGS. 12A to 12K illustrate UE-specific reference signal mapping patterns for antenna port 5 when extended CP is applied according to embodiments of the present invention.

As shown in FIGS. 12A to 12K, in the case of extended CP, the UE-specific reference signal can be mapped to REs corresponding to three or four symbol indices within two slots and mapped to REs corresponding to two or four subcarrier indices in the frequency domain.

A description will be given of UE-specific reference signal mapping patterns applicable to special subframe configurations.

In the following figures, numbers 0, 1, 2, 3, 4, 5 and 6 indicated on the horizontal axis corresponding to the time domain are OFDM symbol indices. While subcarrier indices are not shown on the vertical axis corresponding to the frequency domain, the subcarrier indices may be indicated as k=0, 1, 2, . . . , 11 from the top. In an RB shown in the following figures, one grid point corresponds to an RE and may be represented by a subcarrier index and a symbol index (k,l).

FIGS. 13A to 13D illustrate UE-specific reference signal mapping patterns for antenna port 7 in the case of special subframe configuration 3, 4 or 8 to which the normal CP is applied.

In FIG. 13, REs denoted by $R_7$ correspond to REs to which a UE-specific reference signal for antenna port 7 is mapped. The UE-specific reference signal may be mapped to REs corresponding to two symbol indices per slot in the time domain and mapped to REs corresponding to three subcarrier indices in the frequency domain.

FIGS. 14A to 14D illustrate UE-specific reference signal mapping patterns for antenna port 8 in the case of special subframe configuration 3, 4 or 8 to which the normal CP is applied.

In FIG. 14, REs denoted by $R_8$ correspond to REs to which a UE-specific reference signal for antenna port 8 is mapped. The UE-specific reference signal may be mapped to REs corresponding to two symbol indices per slot in the time domain and mapped to REs corresponding to three subcarrier indices in the frequency domain.

FIGS. 15A to 15D illustrate UE-specific reference signal mapping patterns for antenna port 9 in the case of special subframe configuration 3, 4 or 8 to which the normal CP is applied.

In FIG. 15, REs denoted by $R_9$ correspond to REs to which a UE-specific reference signal for antenna port 9 is mapped. The UE-specific reference signal may be mapped to REs corresponding to two symbol indices per slot in the time domain and mapped to REs corresponding to three subcarrier indices in the frequency domain.

FIGS. 16A to 16D illustrate UE-specific reference signal mapping patterns for antenna port 10 in the case of special subframe configuration 3, 4 or 8 to which the normal CP is applied.

In FIG. 16, REs denoted by $R_{10}$ correspond to REs to which a UE-specific reference signal for antenna port 10 is mapped. The UE-specific reference signal may be mapped to REs corresponding to two symbol indices per slot in the time domain and mapped to REs corresponding to three subcarrier indices in the frequency domain.

FIGS. 17A to 17D illustrate UE-specific reference signal mapping patterns for antenna port 7 in the case of special subframe configuration 1, 2, 6 or 7 when the normal CP is applied.

In FIG. 17, REs denoted by $R_7$ correspond to REs to which a UE-specific reference signal for antenna port 7 is mapped. The UE-specific reference signal may be mapped to REs corresponding to two symbol indices per slot in the time domain and mapped to REs corresponding to three subcarrier indices in the frequency domain.

FIGS. 18A to 18D illustrate UE-specific reference signal mapping patterns for antenna port 8 in the case of special subframe configuration 1, 2, 6 or 7 to which the normal CP is applied.

In FIG. 18, REs denoted by $R_8$ correspond to REs to which a UE-specific reference signal for antenna port 7 is mapped. The UE-specific reference signal may be mapped to REs corresponding to two symbol indices per slot in the time domain and mapped to REs corresponding to three subcarrier indices in the frequency domain.

FIGS. 19A to 19D illustrate UE-specific reference signal mapping patterns for antenna port 9 in the case of special subframe configuration 1, 2, 6 or 7 to which the normal CP is applied.

In FIG. 19, REs denoted by $R_9$ correspond to REs to which a UE-specific reference signal for antenna port 9 is mapped. The UE-specific reference signal may be mapped to REs corresponding to two symbol indices per slot in the time domain and mapped to REs corresponding to three subcarrier indices in the frequency domain.

FIGS. 20A to 20D illustrate UE-specific reference signal mapping patterns for antenna port 10 in the case of special subframe configuration 1, 2, 6 or 7 to which the normal CP is applied.

In FIG. 20, REs denoted by $R_{10}$ correspond to REs to which a UE-specific reference signal for antenna port 9 is mapped. The UE-specific reference signal may be mapped to REs corresponding to two symbol indices per slot in the time domain and mapped to REs corresponding to three subcarrier indices in the frequency domain.

The UE-specific reference signal mapping patterns when the normal CP and extended CP are applied per special subframe configuration index have been described. FIG. 21 illustrates UE-specific reference mapping patterns for antenna port 7 in the case of all downlink subframes other than a special subframe when the normal CP is applied.

FIGS. 21A to 21E illustrate UE-specific reference signal mapping patterns for antenna port 7 in the case of all downlink subframes other than the special subframe, to which the normal CP is applied.

In FIG. 21, REs denoted by $R_7$ correspond to REs to which a UE-specific reference signal for antenna port 7 is mapped. In four patterns shown in FIG. 21A, the UE-specific reference signal may be mapped to REs corresponding to two symbol indices per slot in the time domain and mapped to REs corresponding to three subcarrier indices in the frequency domain. In patterns of FIGS. 21B to 21E, the UE-specific reference signal may be mapped to REs corresponding to three symbol indices per slot in the time domain and mapped to REs corresponding to three subcarrier indices in the frequency domain.

FIGS. 22A to 22E illustrate UE-specific reference signal mapping patterns for antenna port 8 in the case of all downlink subframes other than the special subframe, to which the normal CP is applied.

In FIG. 22, REs denoted by $R_8$ correspond to REs to which a UE-specific reference signal for antenna port 8 is mapped. In four patterns shown in FIG. 22A, the UE-specific reference signal may be mapped to REs corresponding to two symbol indices per slot in the time domain and mapped to REs corresponding to three subcarrier indices in the frequency domain. In patterns of FIGS. 22B to 22E, the UE-specific reference signal may be mapped to REs corresponding to three symbol indices per slot in the time domain and mapped to REs corresponding to three subcarrier indices in the frequency domain.

FIGS. 23A to 23E illustrate UE-specific reference signal mapping patterns for antenna port 9 in the case of all downlink subframes other than the special subframe, to which the normal CP is applied.

In FIG. 23, REs denoted by $R_9$ correspond to REs to which a UE-specific reference signal for antenna port 9 is mapped. In four patterns shown in FIG. 23A, the UE-specific reference signal may be mapped to REs corresponding to two symbol indices per slot in the time domain and mapped to REs corresponding to three subcarrier indices in the frequency domain. In patterns of FIGS. 23B to 23E, the UE-specific reference signal may be mapped to REs corresponding to three symbol indices per slot in the time domain and mapped to REs corresponding to three subcarrier indices in the frequency domain.

FIGS. 24A to 24E illustrate UE-specific reference signal mapping patterns for antenna port 10 in the case of all downlink subframes other than the special subframe, to which the normal CP is applied.

In FIG. 24, REs denoted by $R_{10}$ correspond to REs to which a UE-specific reference signal for antenna port 10 is mapped. In four patterns shown in FIG. 24A, the UE-specific reference signal may be mapped to REs corresponding to two symbol indices per slot in the time domain and mapped to REs corresponding to three subcarrier indices in the frequency domain. In patterns of FIGS. 24B to 24E, the UE-specific reference signal may be mapped to REs corresponding to three symbol indices per slot in the time domain and mapped to REs corresponding to three subcarrier indices in the frequency domain.

FIGS. 25A to 25G illustrate UE-specific reference signal mapping patterns for antenna port 7 in the case of special subframe configuration 1, 2, 3, 5 or 6 to which the extended CP is applied.

In FIG. 25, REs denoted by $R_7$ correspond to REs to which a UE-specific reference signal for antenna port 7 is mapped. As shown in FIG. 25A, the UE-specific reference signal may be mapped only in an even-numbered slot. That is, the UE-specific reference signal may be mapped to REs corresponding to four symbol indices only in the even-numbered slot and mapped to REs corresponding to four subcarrier indices in the frequency domain.

In FIGS. 25B to 25G, the UE-specific reference signal may be mapped to REs corresponding to two symbol indices per slot in the time domain and mapped to REs corresponding to four subcarrier indices in the frequency domain.

FIGS. 26A to 26G illustrate UE-specific reference signal mapping patterns for antenna port 8 in the case of special subframe configuration 1, 2, 3, 5 or 6 to which the extended CP is applied.

In FIG. 26, REs denoted by $R_8$ correspond to REs to which a UE-specific reference signal for antenna port 8 is mapped. As shown in FIG. 26A, the UE-specific reference signal may be mapped only in an even-numbered slot. That is, the UE-specific reference signal may be mapped to REs corresponding to four symbol indices only in the even-numbered slot and mapped to REs corresponding to four subcarrier indices in the frequency domain.

Figure 26A:
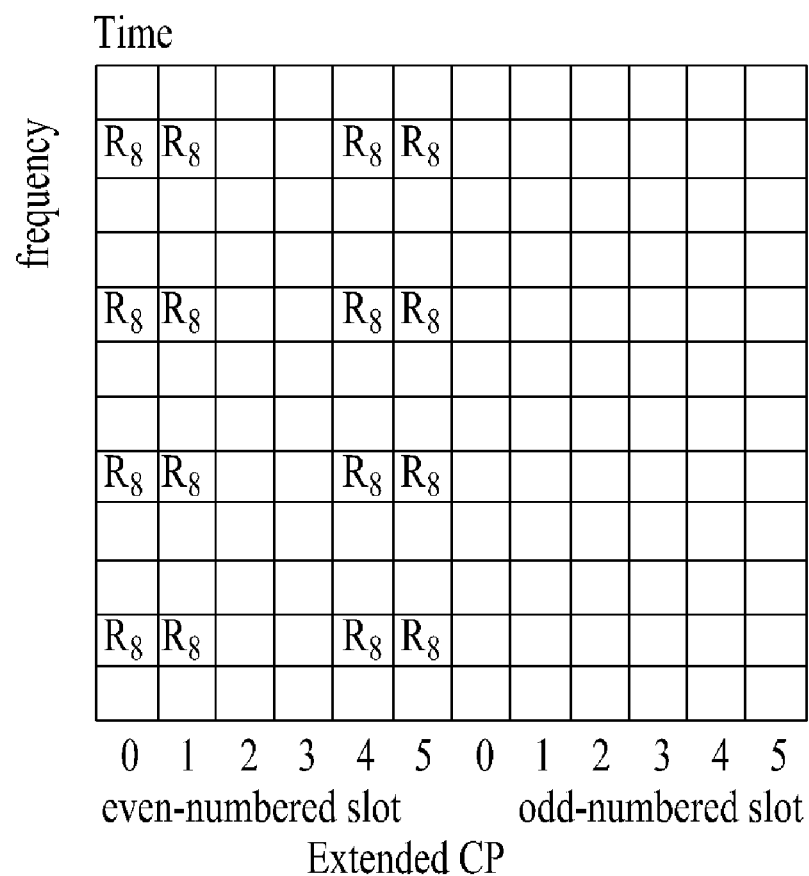
FIGS. 26A to 26G illustrate UE-specific reference signal mapping patterns for antenna port 8 in the case of special subframe configuration 1, 2, 3, 5 or 6 to which the extended CP is applied.
Figure 26B:
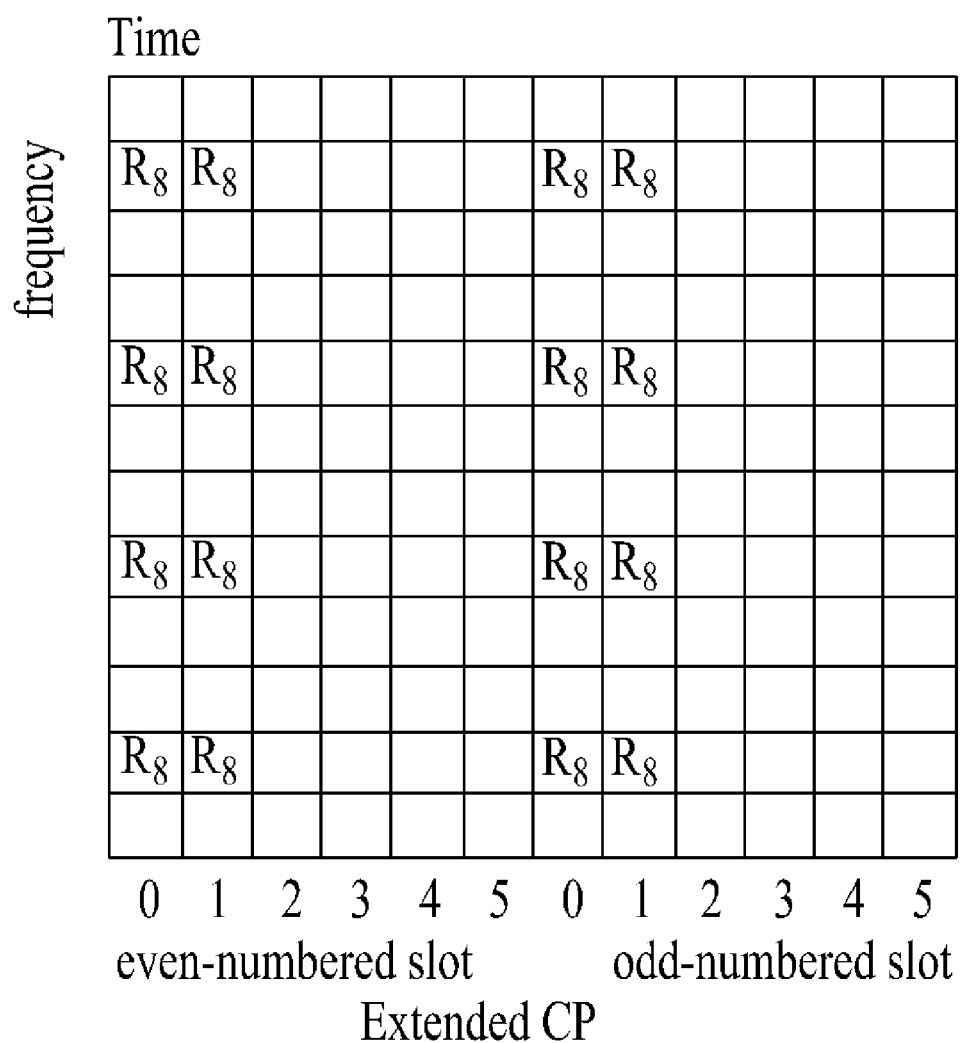
Figure 26C:
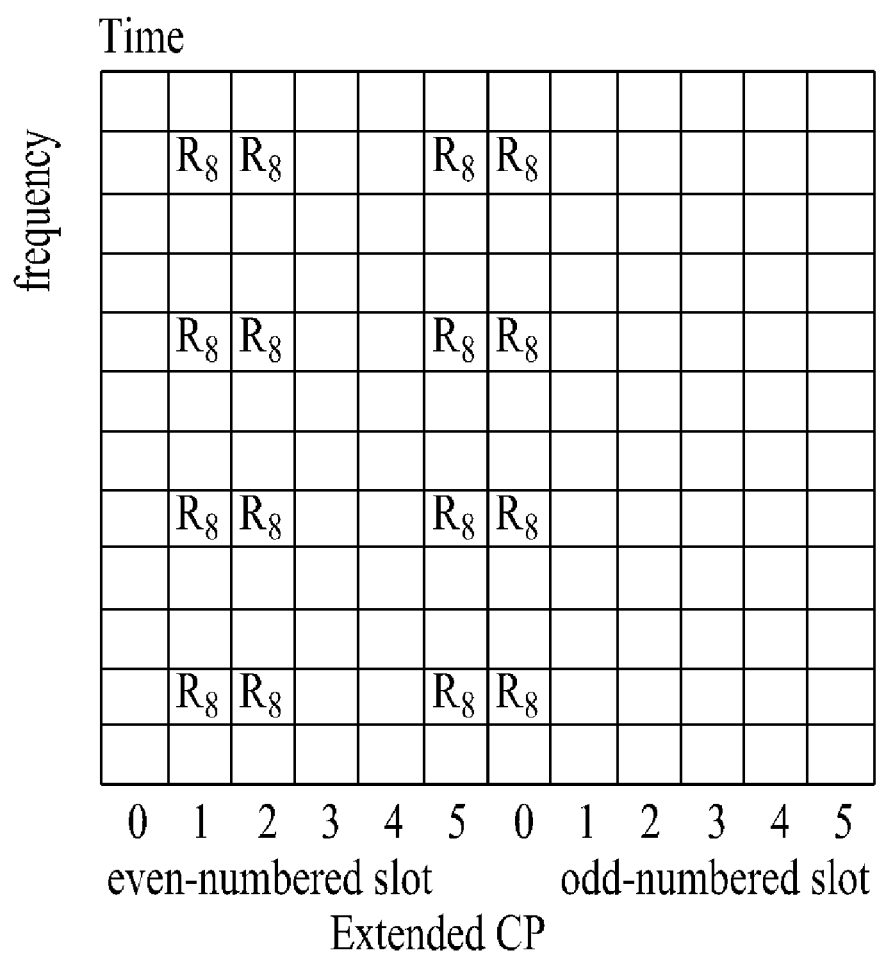
Figure 26D:
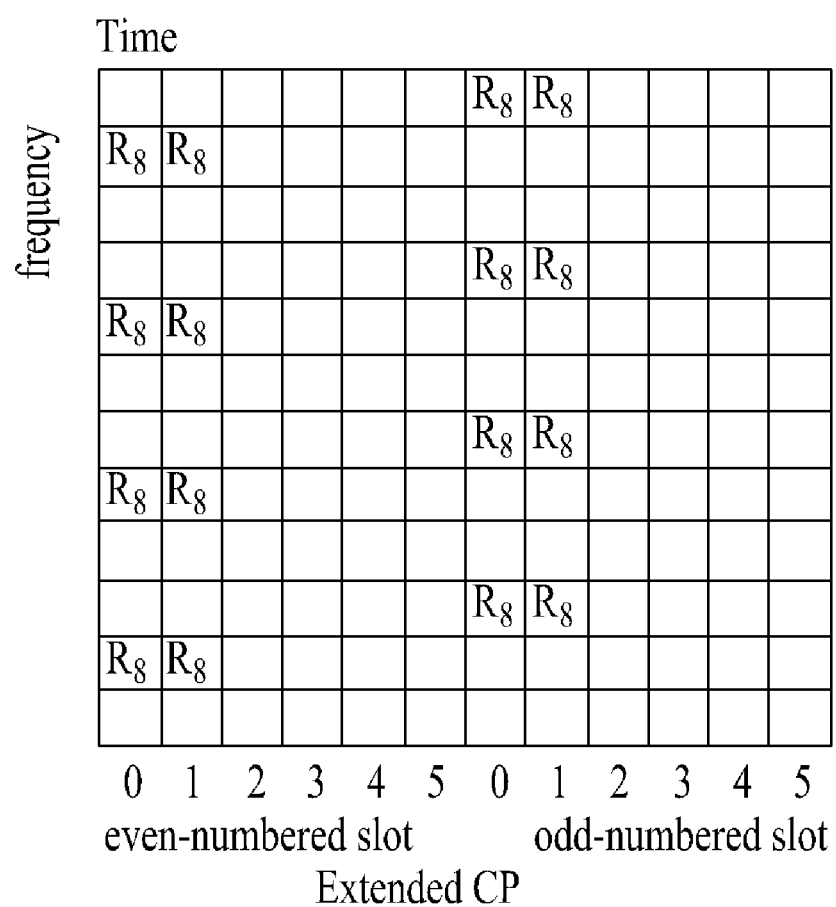
Figure 26E:
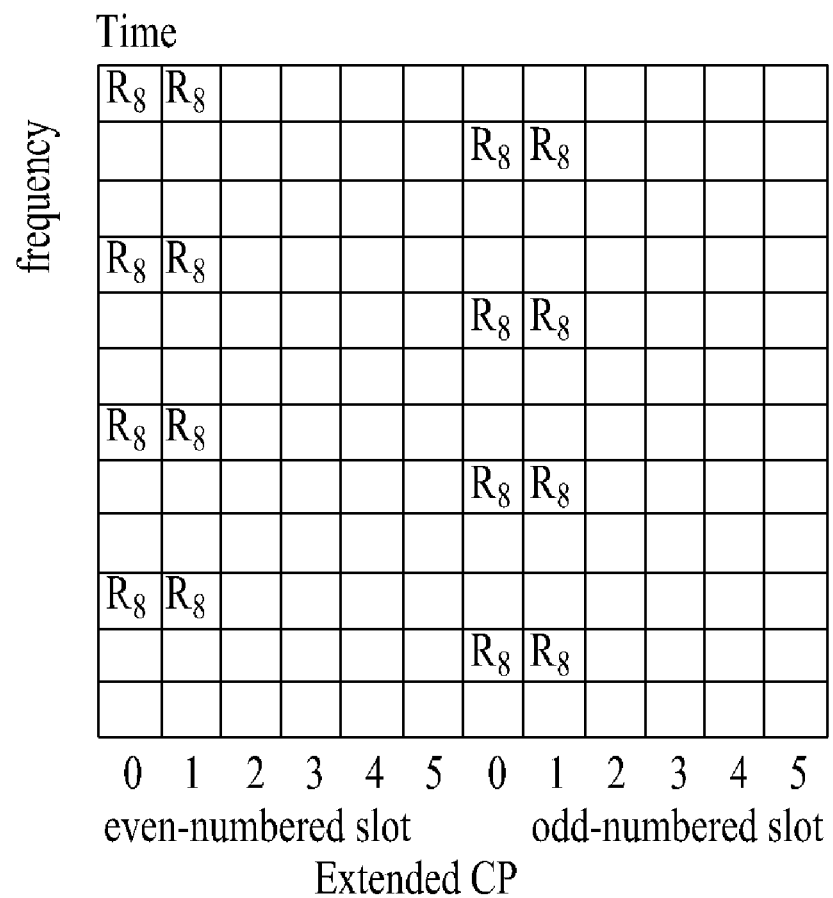
Figure 26F:
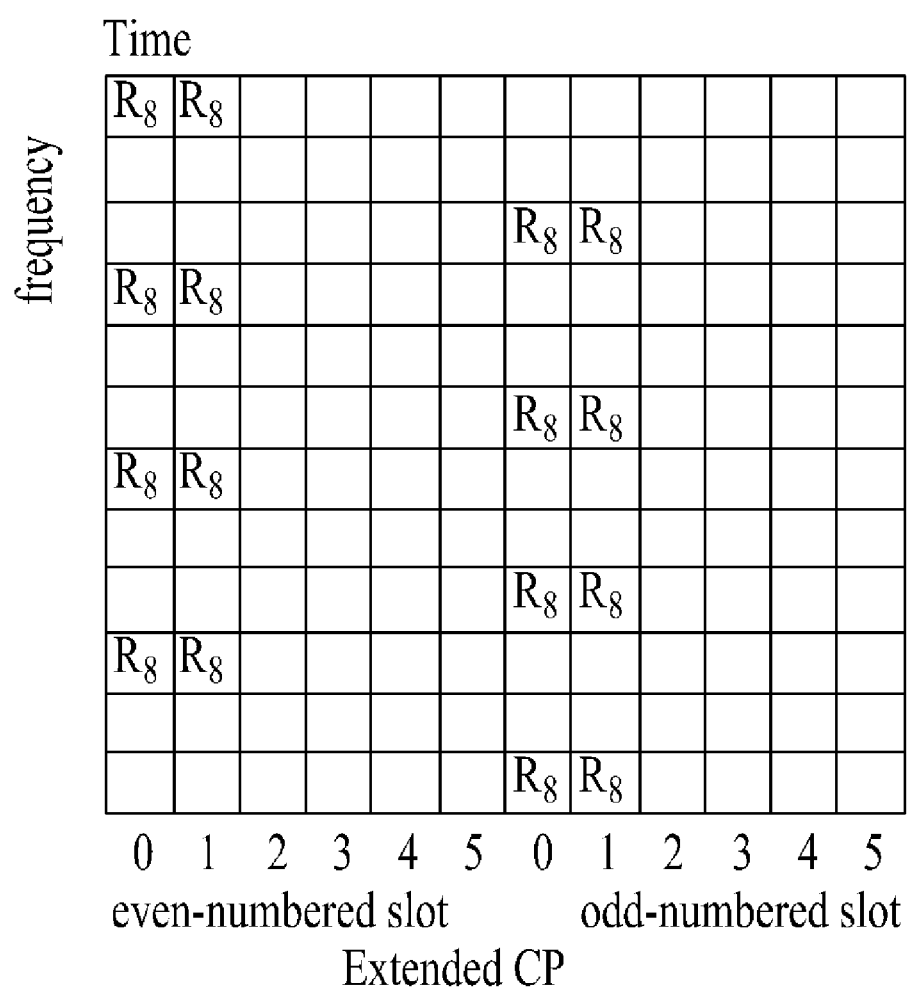
Figure 26G:
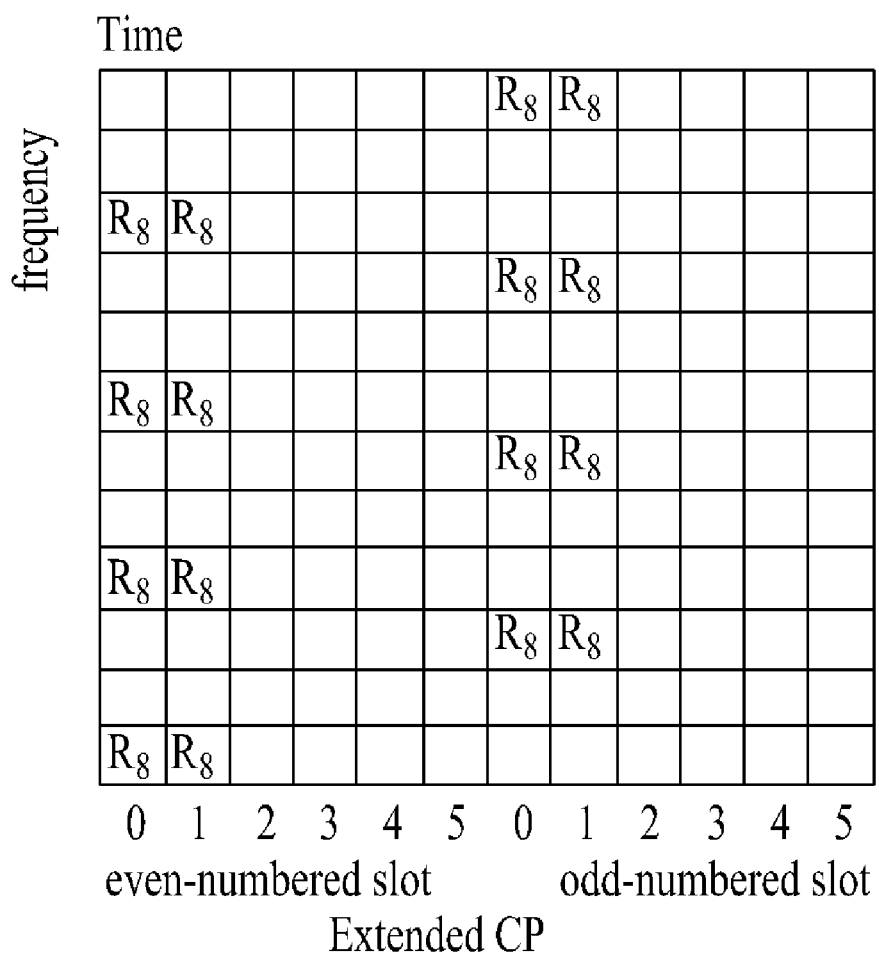
Figure 27A:
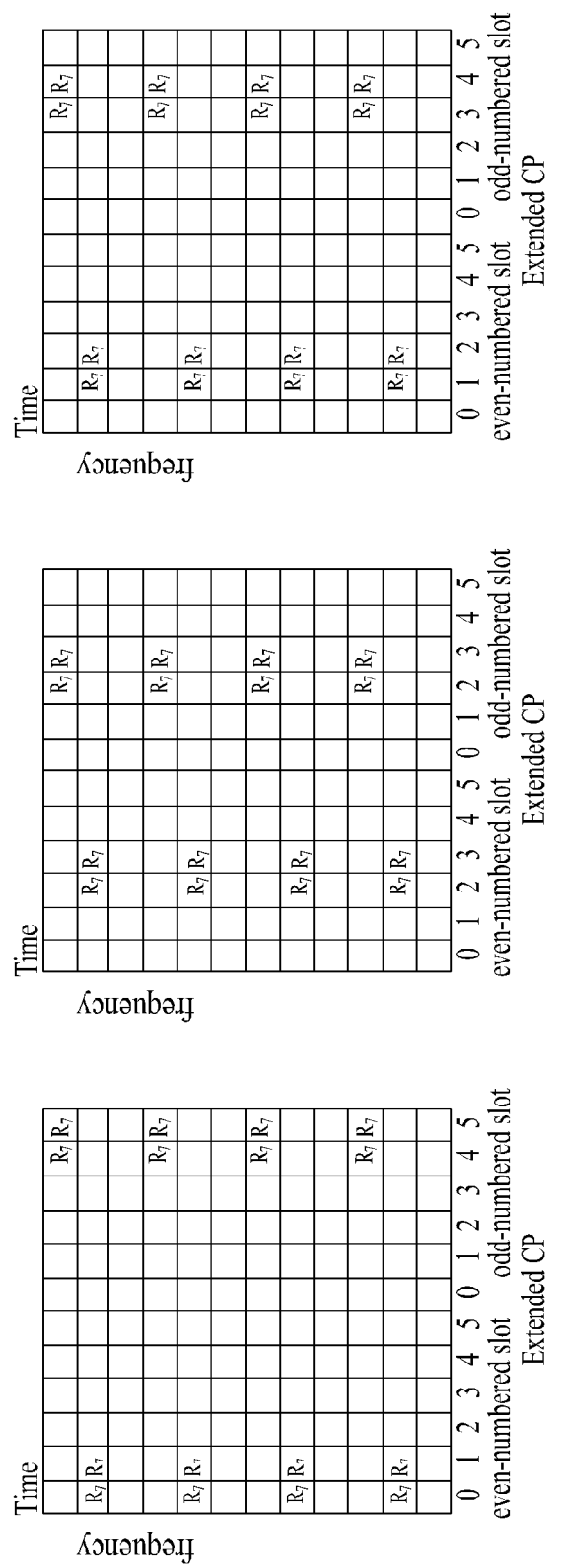
Figure 27C:
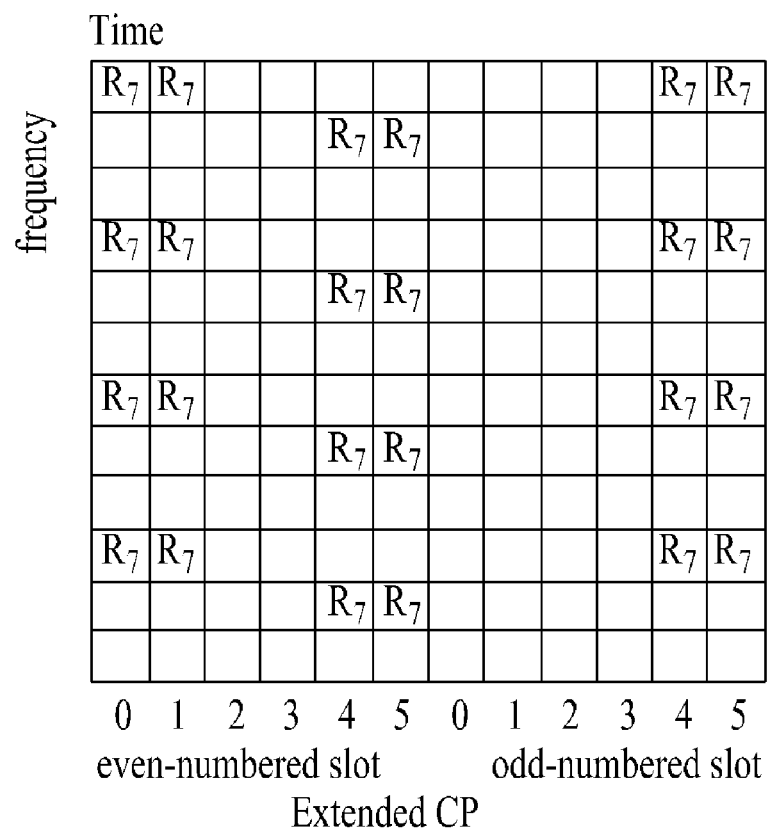
Figure 27D:
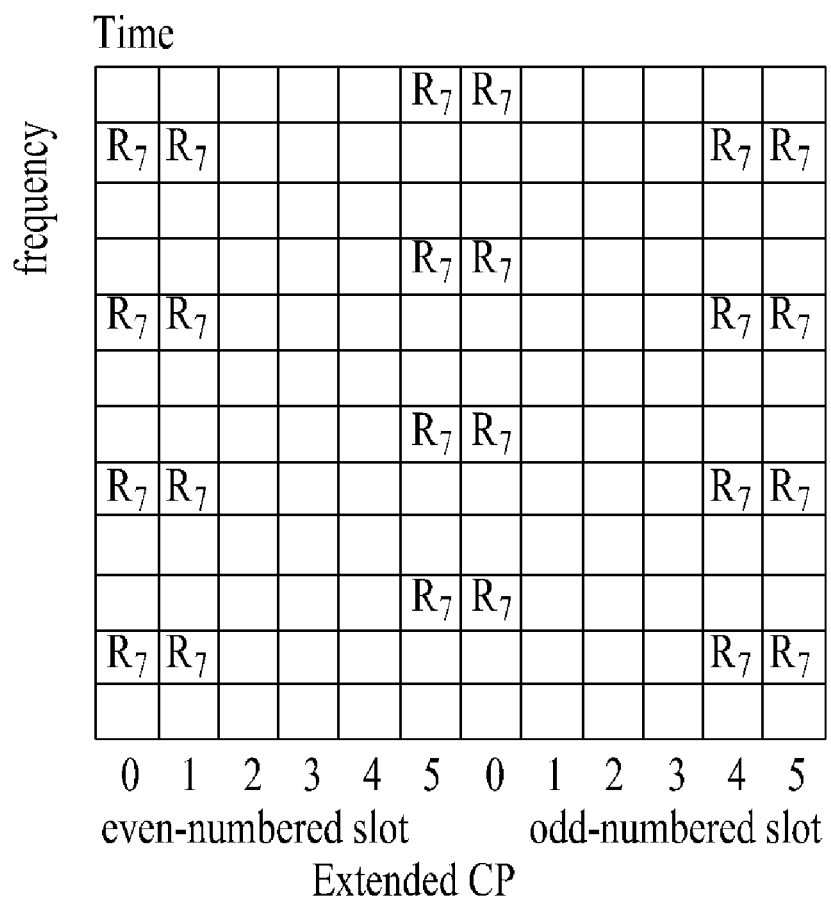
Figure 27E:
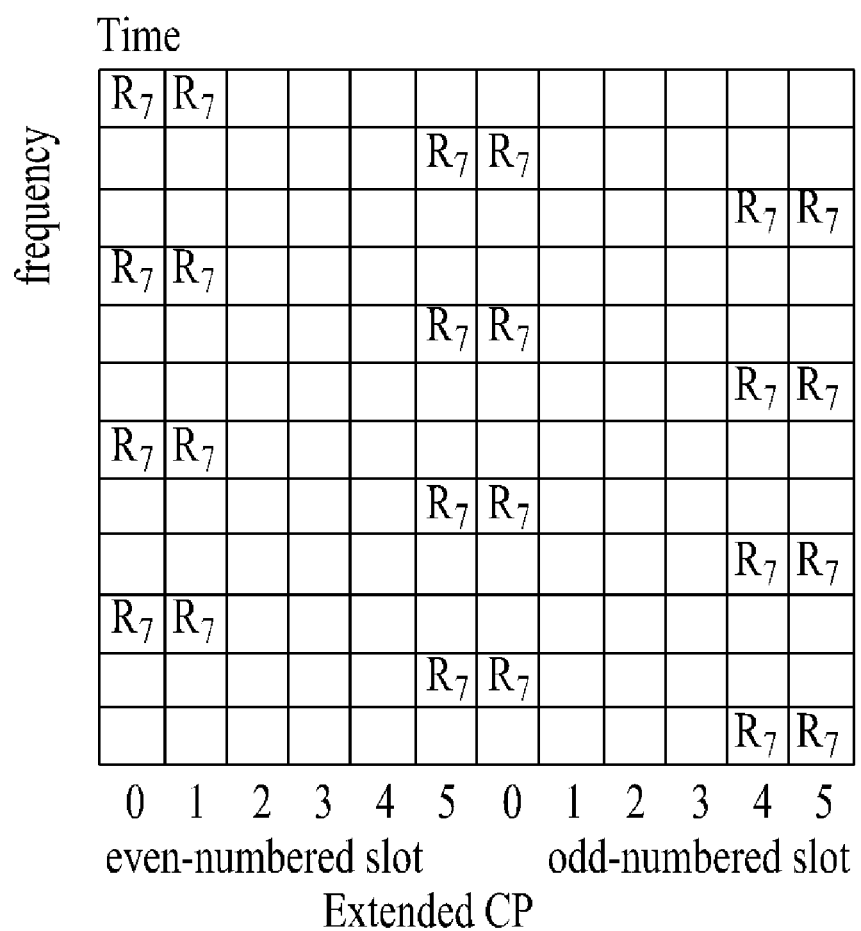
Figure 27F:
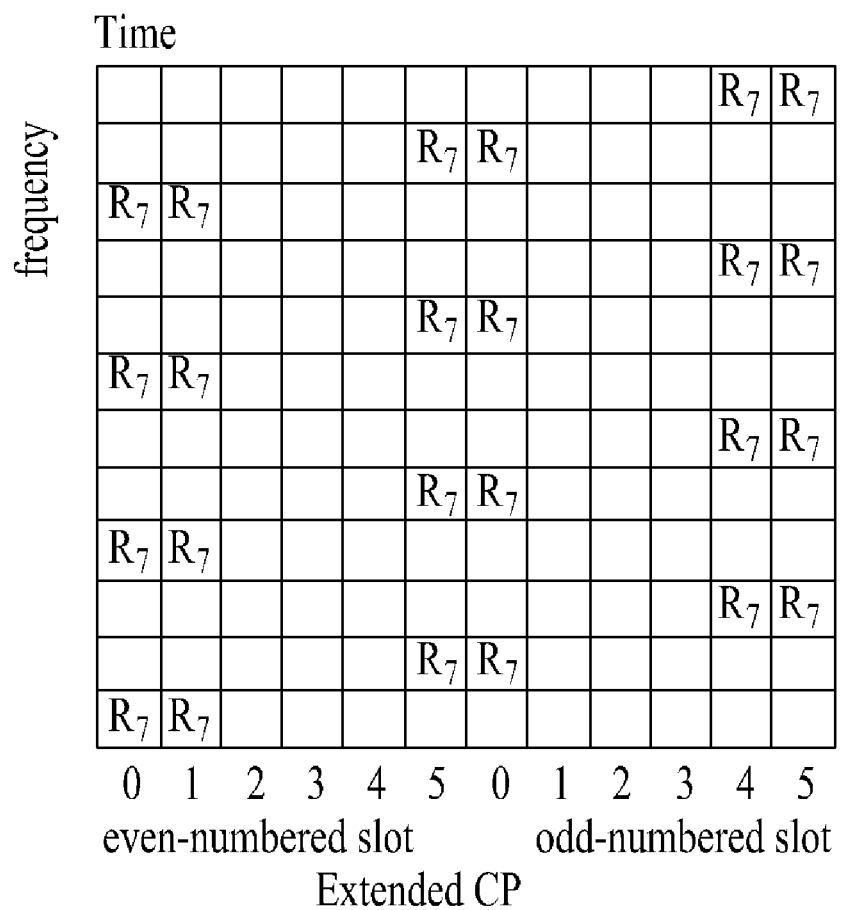
Figure 27G:
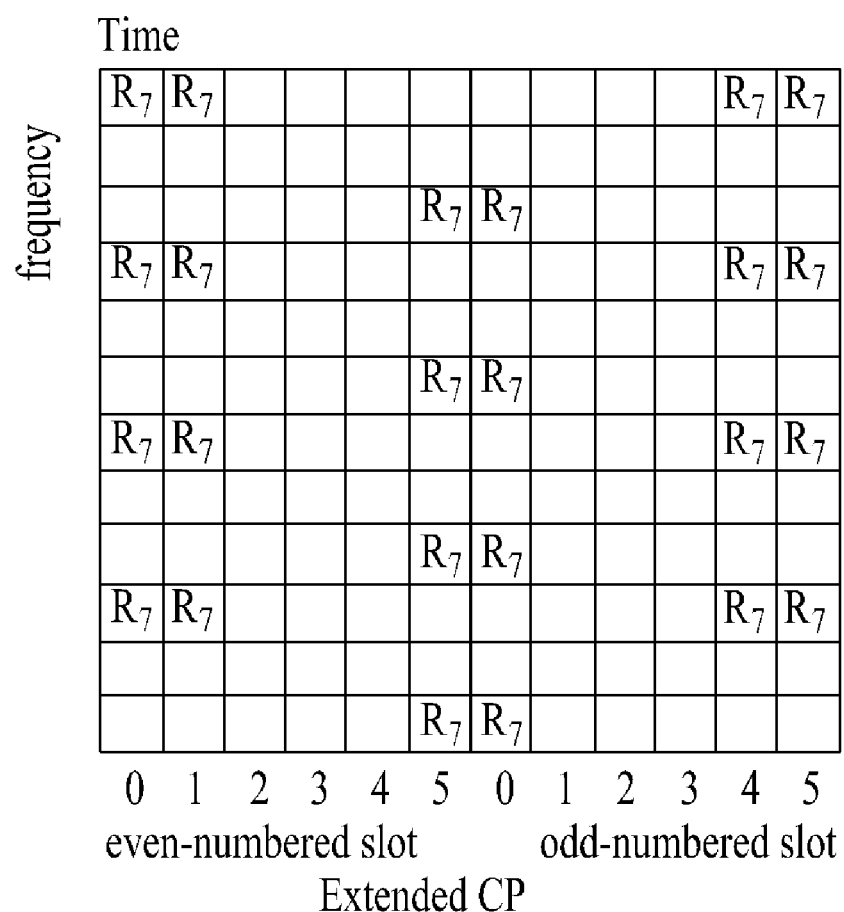
Figure 27H:
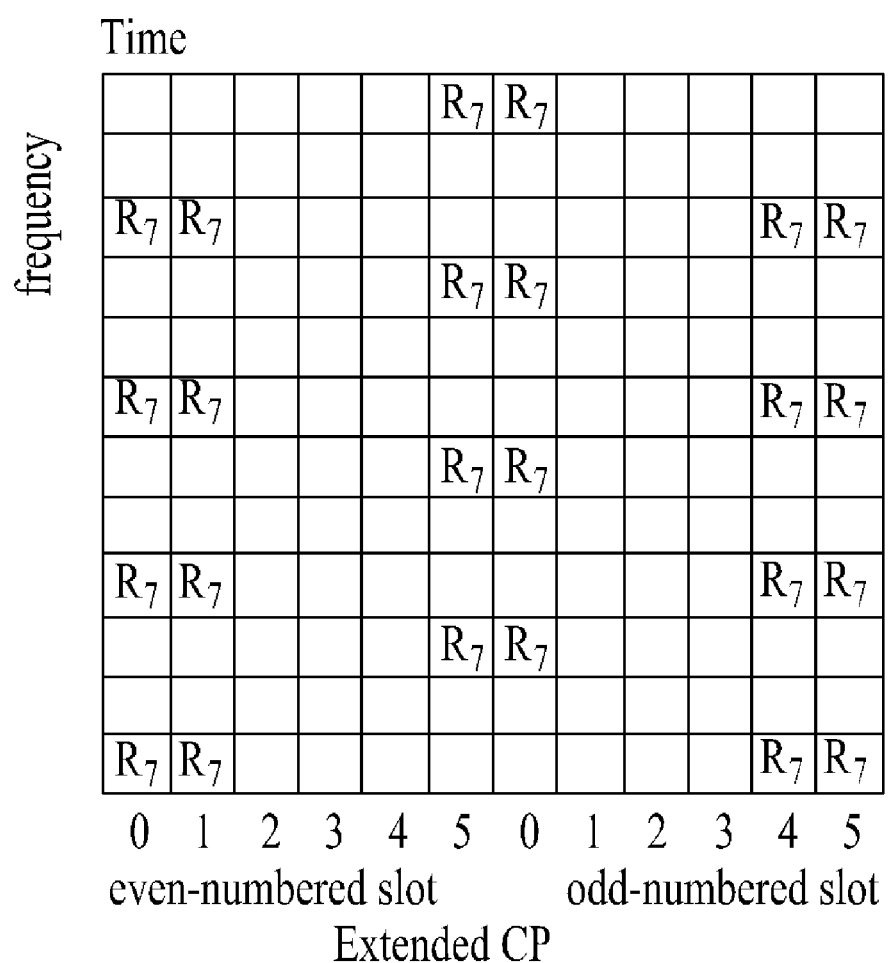

In addition, as shown in FIG. 26C, the UE-specific reference signal may be mapped to REs corresponding to three symbol indices only in the even-numbered slot and mapped to an RE corresponding to one symbol index in an odd-numbered slot. The UE-specific reference signal may be mapped to REs corresponding to four subcarrier indices in the frequency domain.

In FIGS. 26B and 26D to 26G, the UE-specific reference signal may be mapped to REs corresponding to two symbol indices per slot in the time domain and mapped to REs corresponding to four subcarrier indices in the frequency domain.

FIGS. 27A to 27H illustrate UE-specific reference signal mapping patterns for antenna port 7 in the case of all downlink subframes other than the special subframe, to which the extended CP is applied.

In FIG. 27, REs denoted by $R_7$ correspond to REs to which a UE-specific reference signal for antenna port 7 is mapped. As shown in FIGS. 27A and 27B, the UE-specific reference signal may be mapped to REs corresponding to two symbol indices per slot. The UE-specific reference signal may be mapped to REs corresponding to four subcarrier indices in the frequency domain.

In addition, as shown in FIGS. 27C to 27H, the UE-specific reference signal may be mapped to REs corresponding to three symbol indices per slot in the time domain and mapped to REs corresponding to four subcarrier indices in the frequency domain.

FIGS. 28A to 28H illustrate UE-specific reference signal mapping patterns for antenna port 8 in the case of all downlink subframes other than the special subframe, to which the extended CP is applied.

In FIG. 28, REs denoted by $R_7$ correspond to REs to which a UE-specific reference signal for antenna port 7 is mapped. As shown in FIGS. 28A and 28B, the UE-specific reference signal may be mapped to REs corresponding to two symbol indices per slot. The UE-specific reference signal may be mapped to REs corresponding to four subcarrier indices in the frequency domain.

Figure 28A:
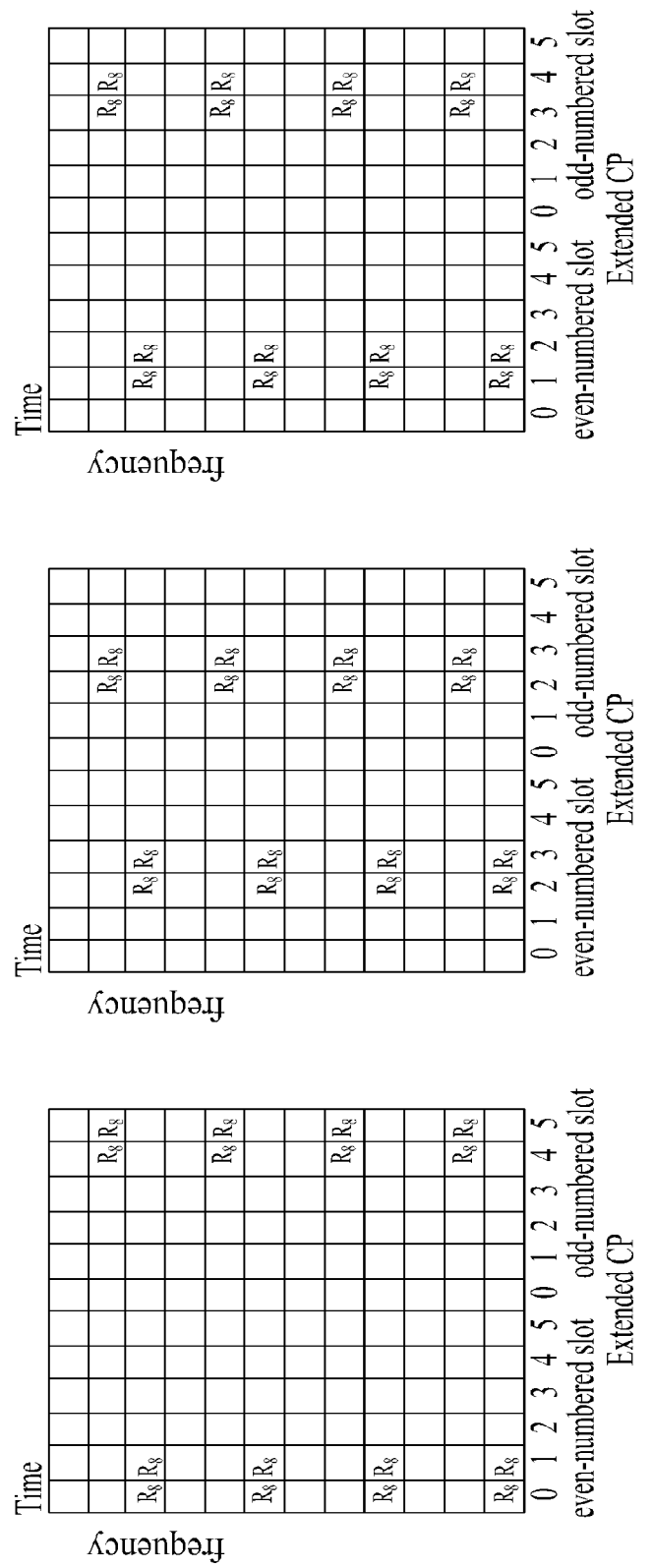
FIGS. 28A to 28H illustrate UE-specific reference signal mapping patterns for antenna port 8 in the case of all downlink subframes other than the special subframe, to which the extended CP is applied.
Figure 28B:
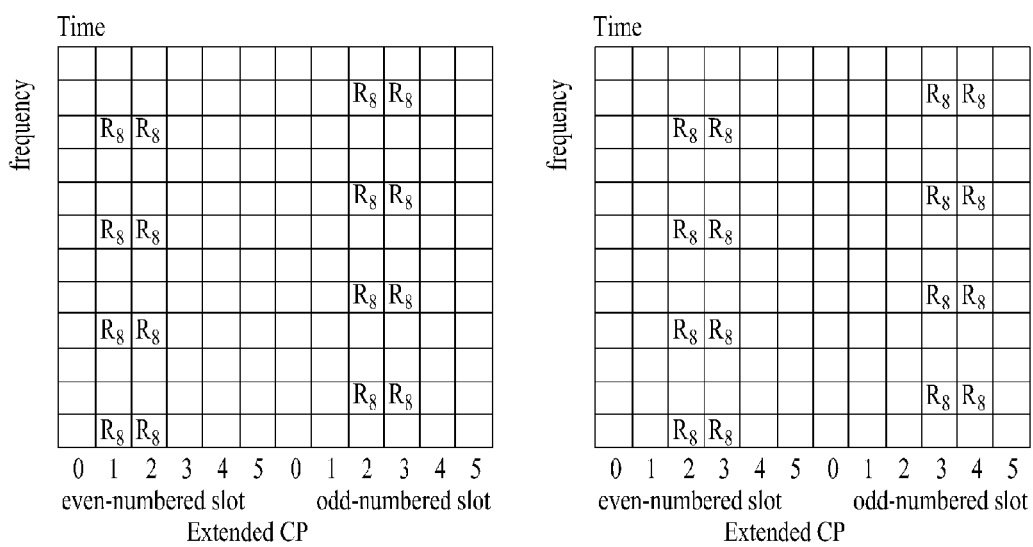
Figure 28C:
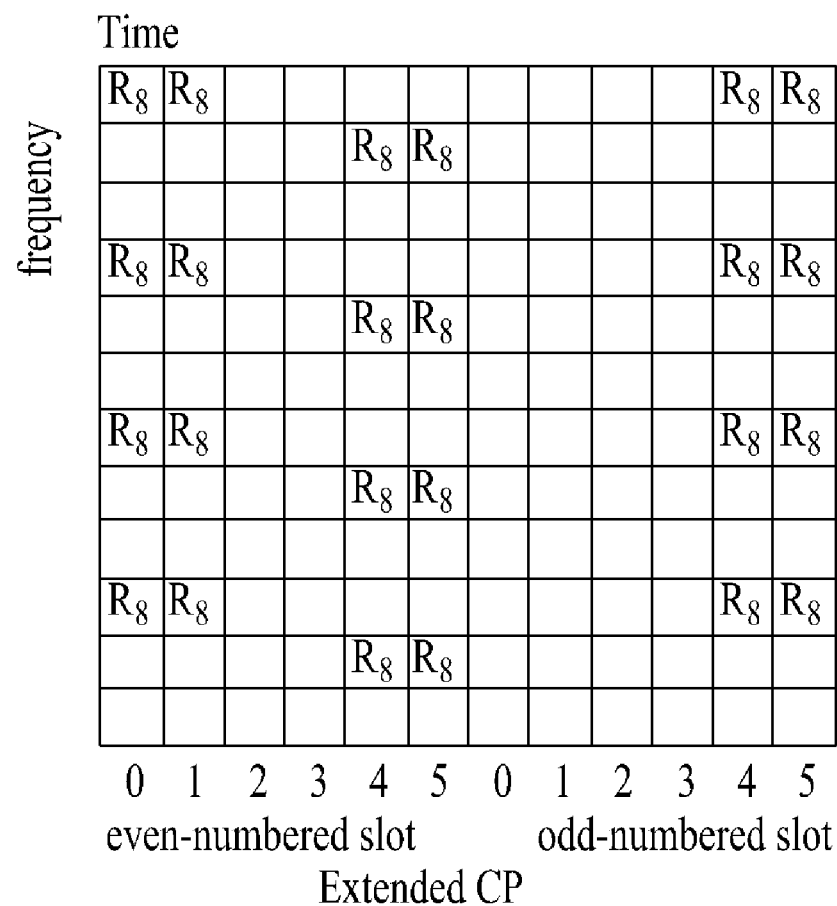
Figure 28D:
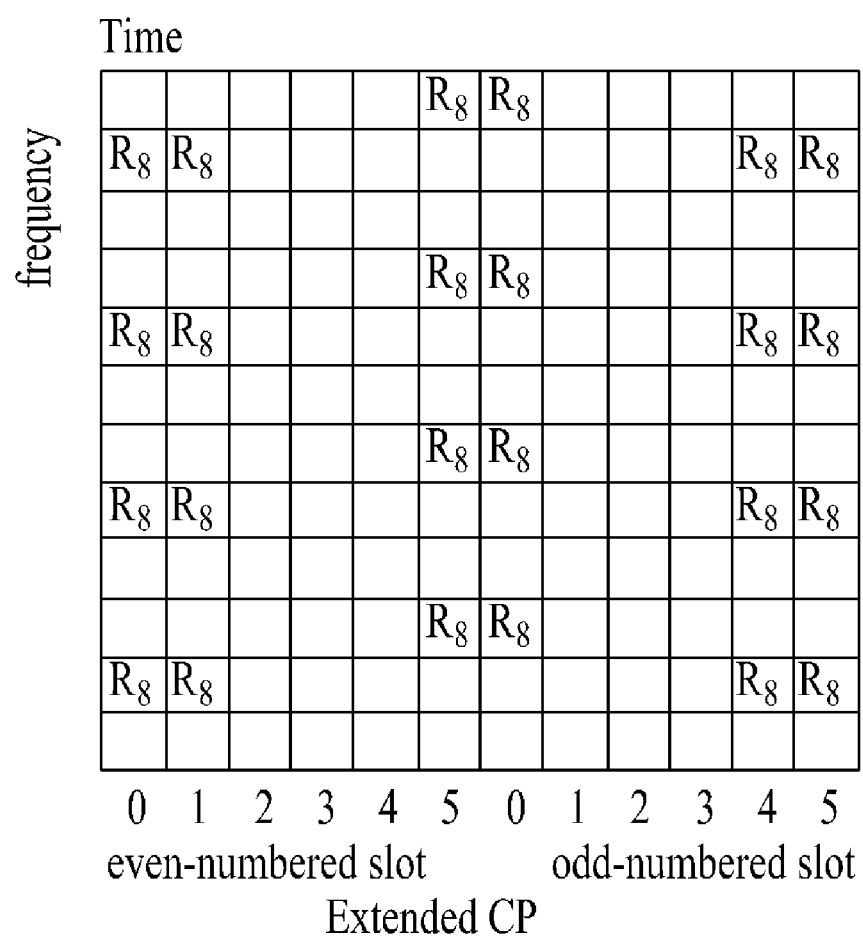
Figure 28E:
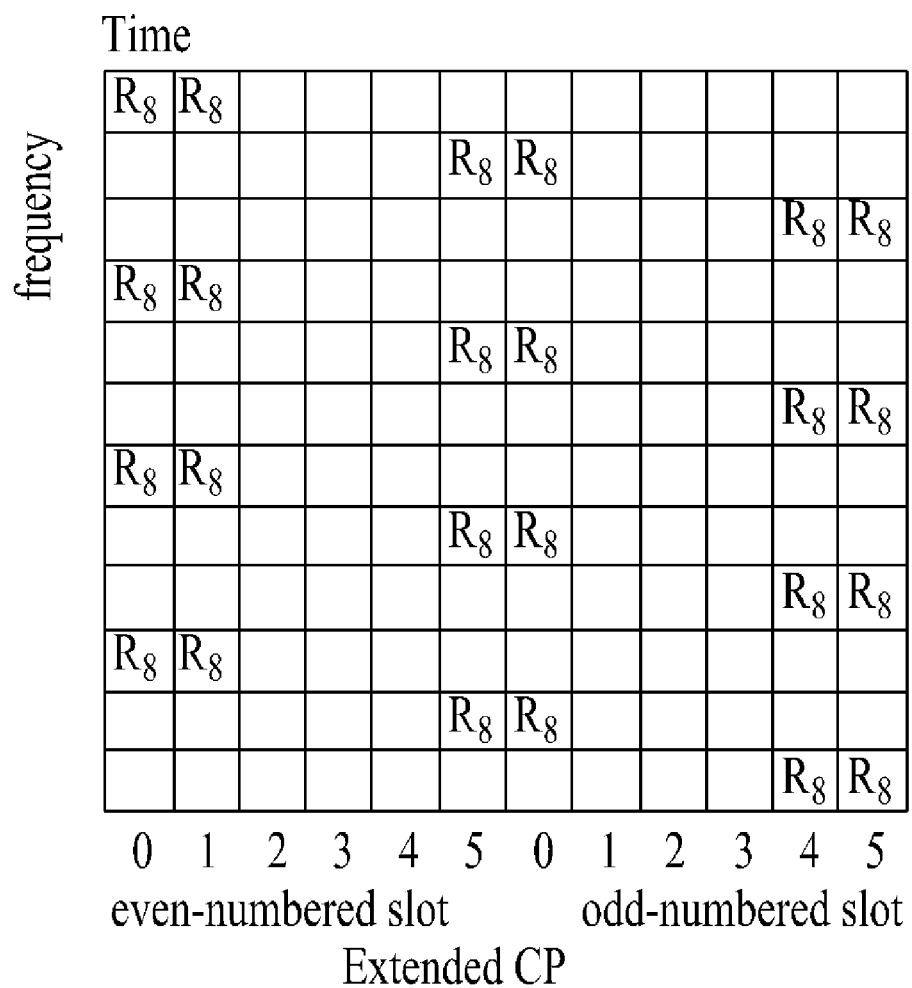
Figure 28F:
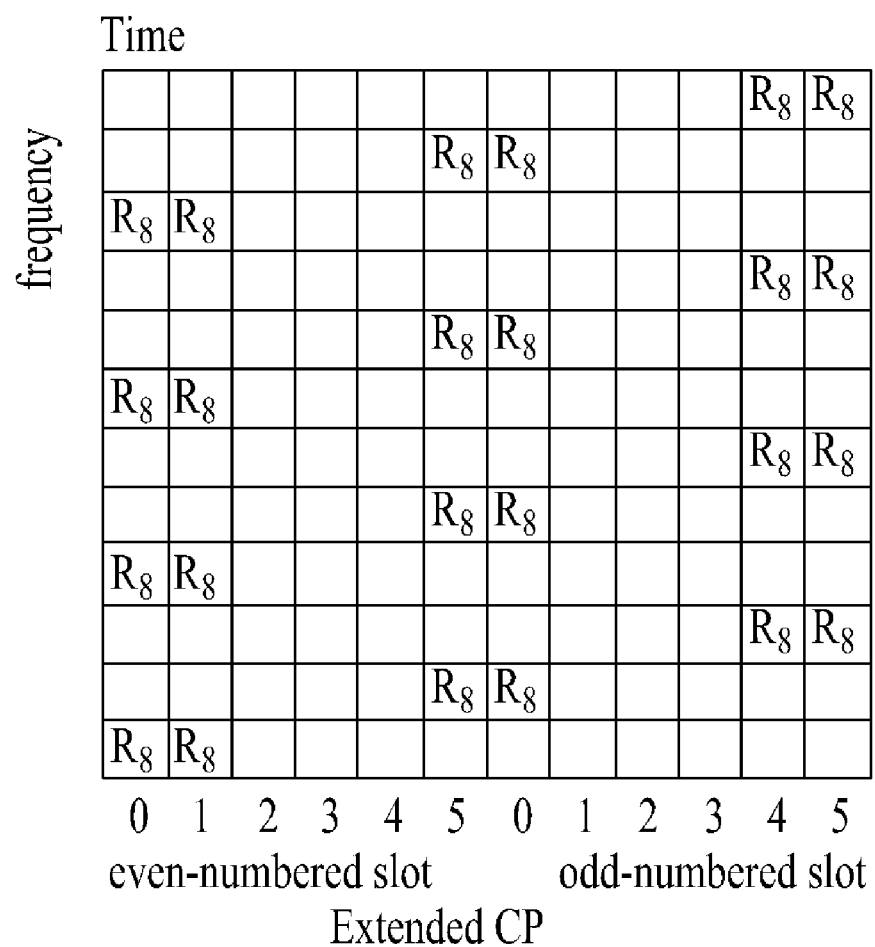
Figure 28G:
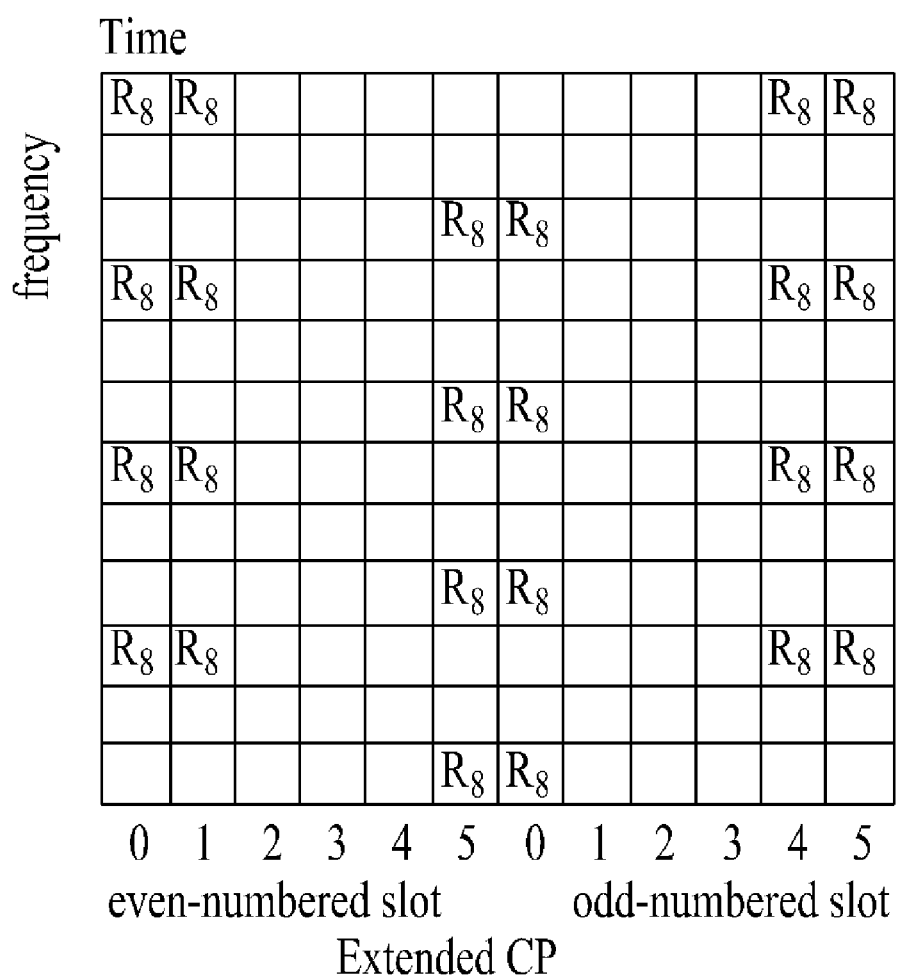
Figure 28H:
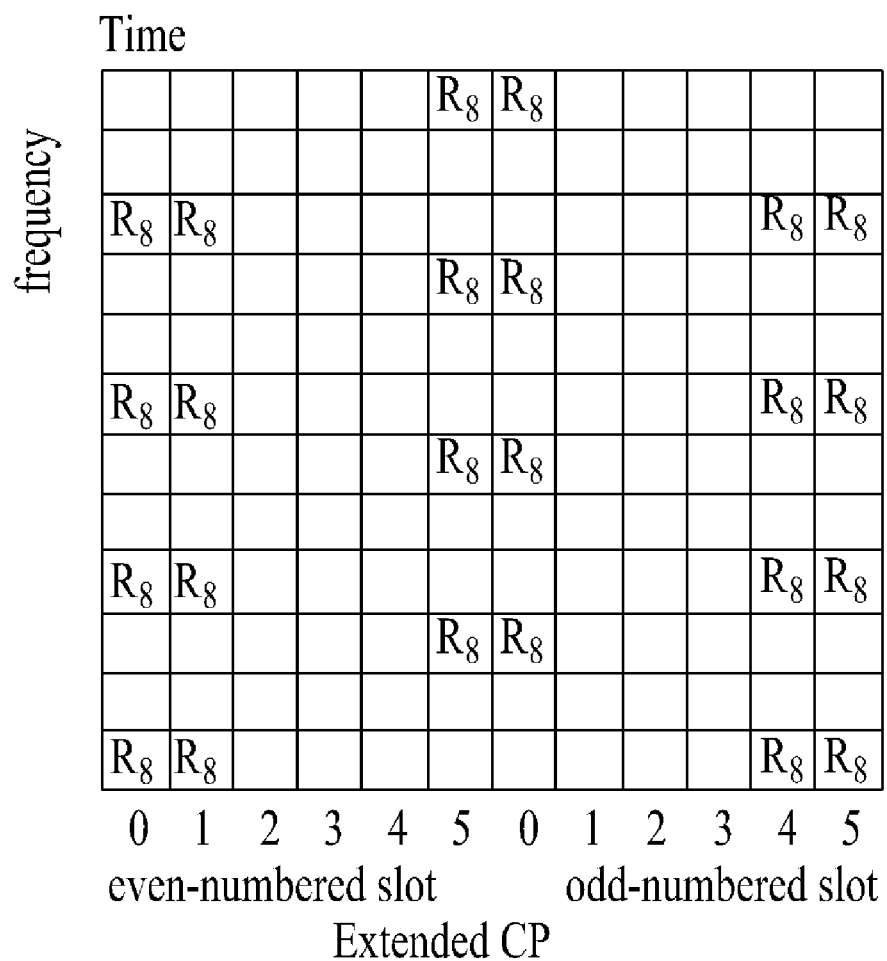
Figure 29A:
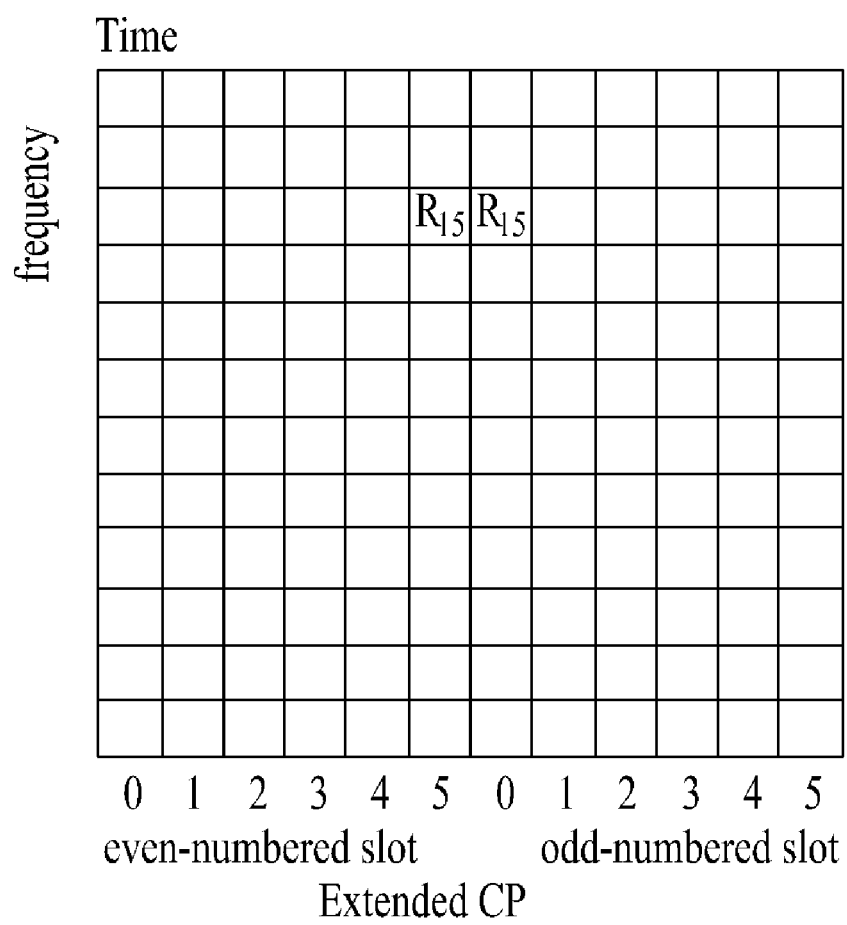
FIGS. 29A to 29H illustrate UE-specific reference signal mapping patterns for antenna ports in downlink subframes other than the special subframe, to which the extended CP is applied.
Figure 29B:
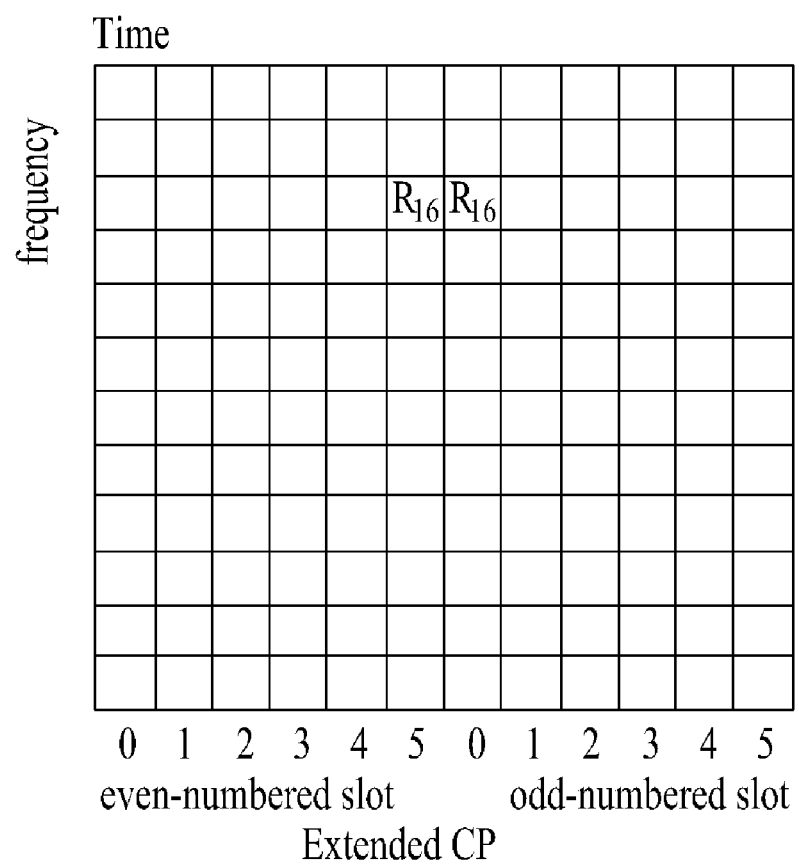
Figure 29C:
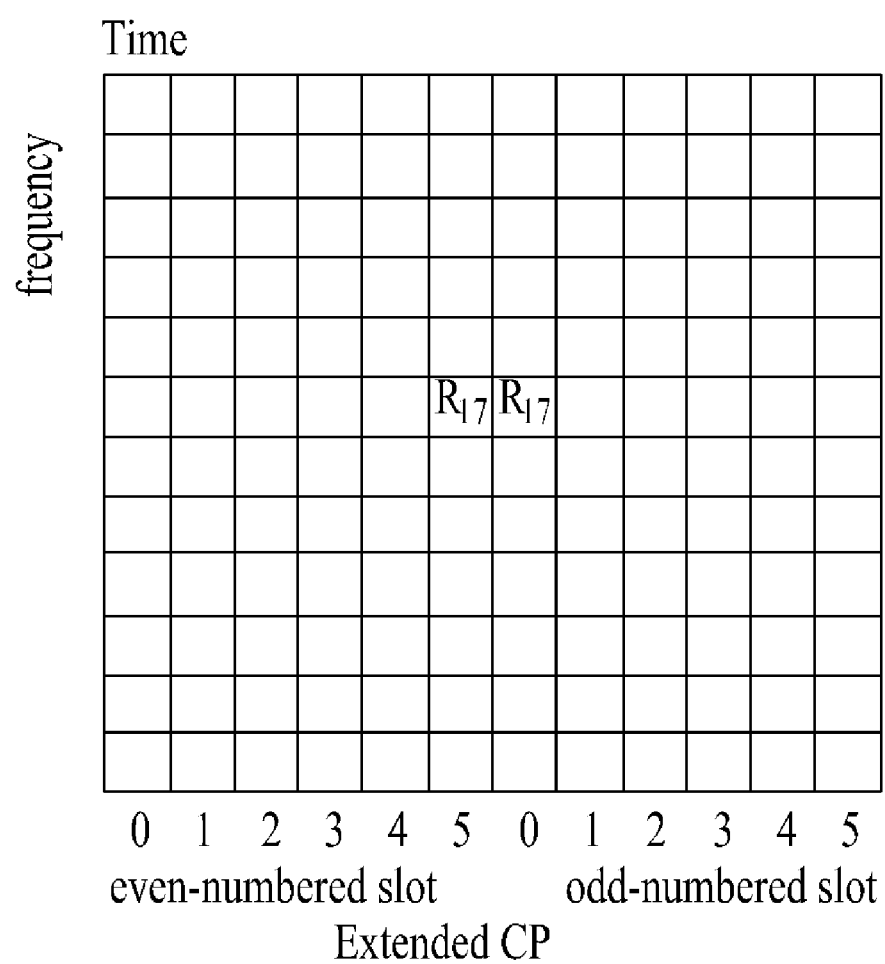
Figure 29D:
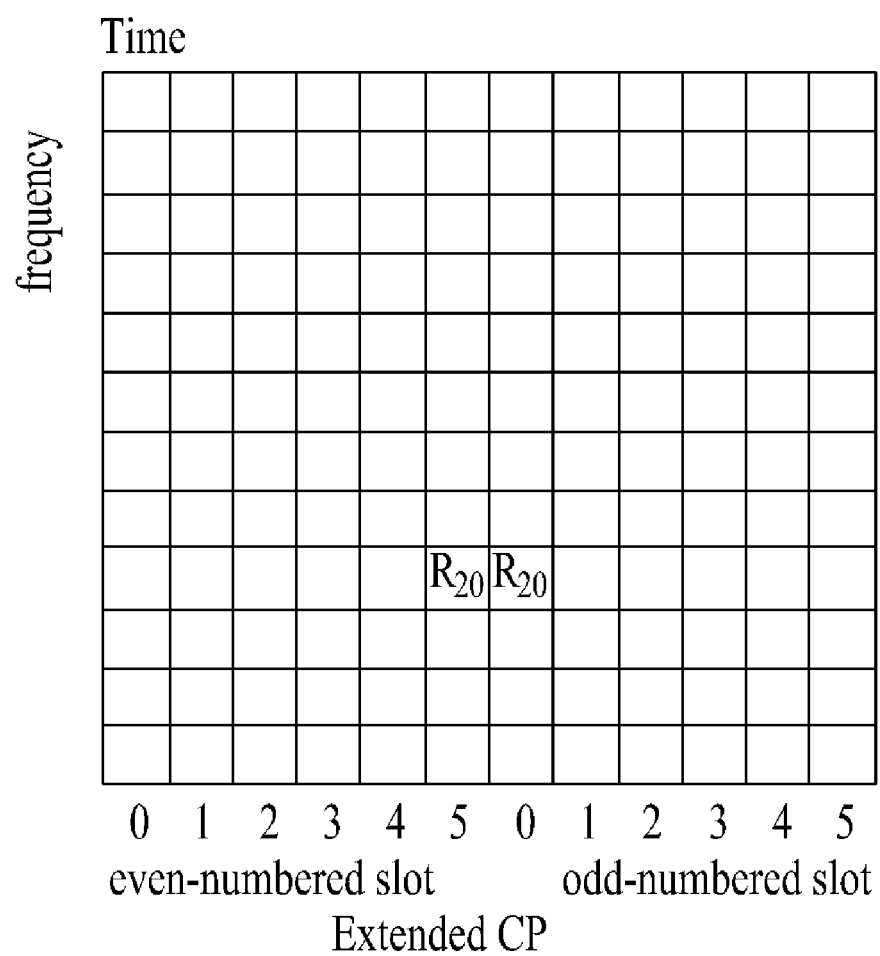
Figure 29E:
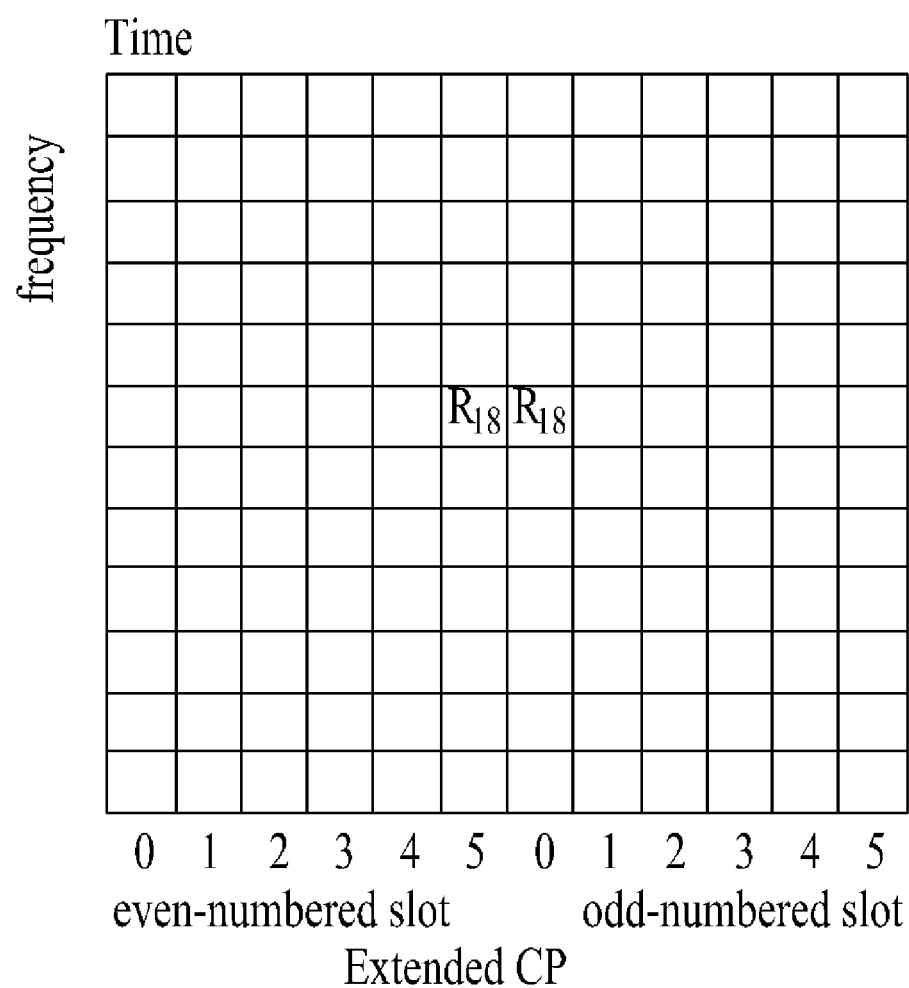
Figure 29F:
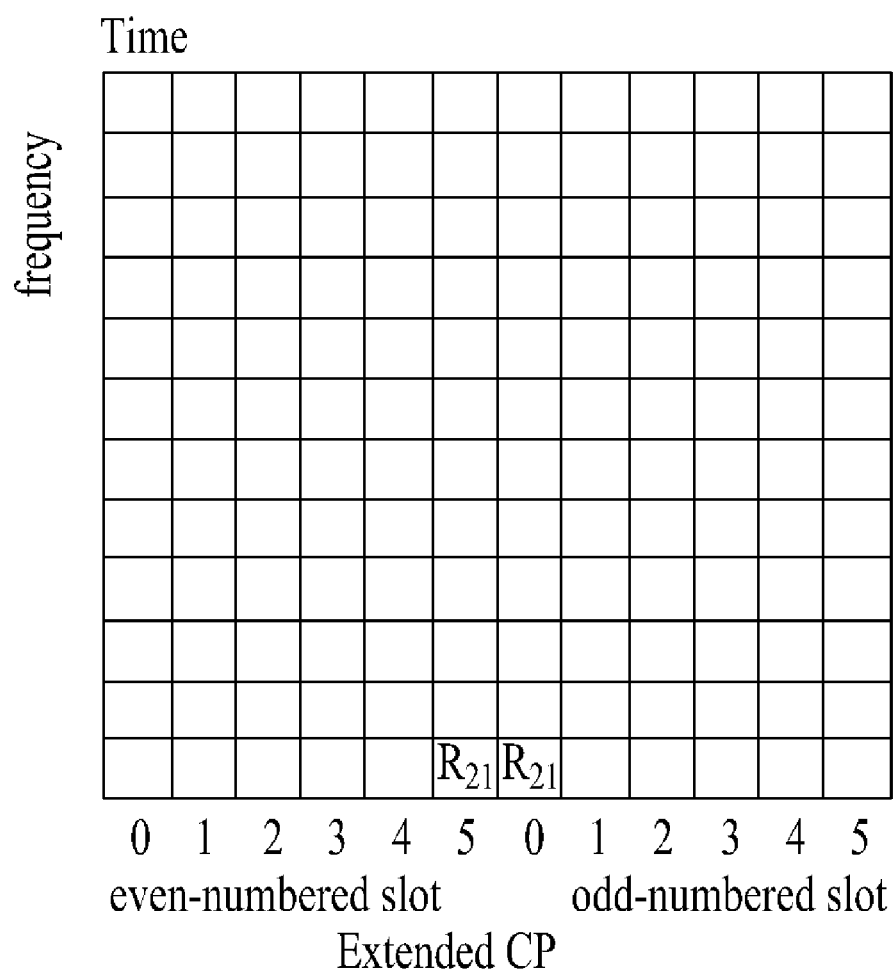
Figure 29G:
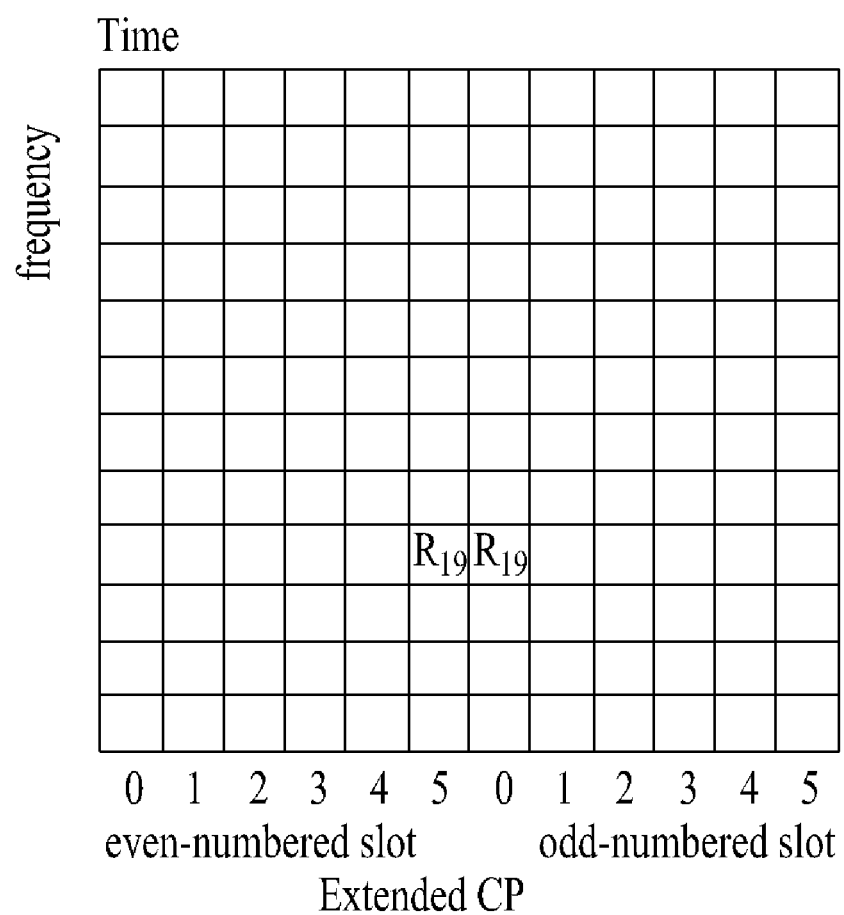
Figure 29H:
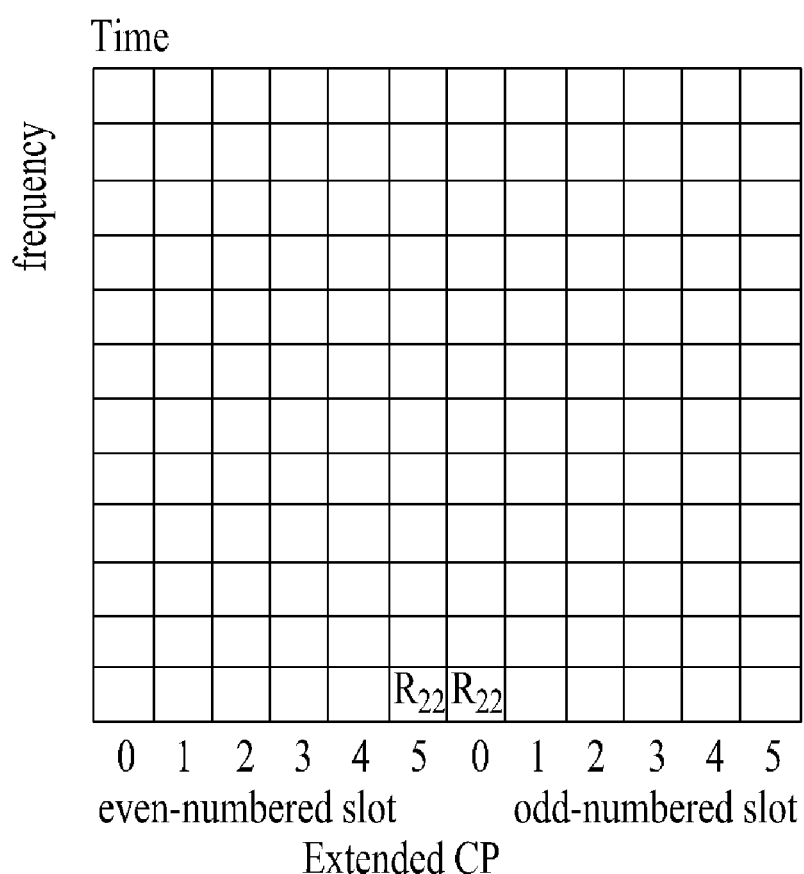

In addition, as shown in FIG. 28C, the UE-specific reference signal may be mapped to REs corresponding to four symbol indices in an even-numbered slot and mapped to REs corresponding to two symbol indices in an odd-numbered slot. The UE-specific reference signal may be mapped to REs corresponding to four subcarrier indices in the frequency domain.

As illustrated in FIGS. 28D to 28H, the UE-specific reference signal may be mapped to REs corresponding to three symbol indices per slot. Here, the UE-specific reference signal may be mapped to REs corresponding to four subcarrier indices in the frequency domain.

In FIGS. 28D to 28H, the UE-specific reference signal may be mapped to REs corresponding to three symbol indices per slot in the time domain and to REs corresponding to four subcarrier indices in the frequency domain.

FIGS. 29A to 29H illustrate UE-specific reference signal mapping patterns for antenna ports in downlink subframes other than the special subframe, to which the extended CP is applied.

FIGS. 29A to 29H respectively show CSI-RS mapping patterns for antenna ports 15, 16, 17, 18, 19, 20, 21 and 22.

In FIGS. 29A to 29H, a CSI-RS may be mapped to an RE corresponding to one symbol index per slot. For example, the CSI-RS may be mapped to an RE corresponding to l=5 in an even-numbered slot and mapped to an RE corresponding to l=0 in an odd-numbered slot.

While CSI-RS mapping patterns other than UE-specific reference signals have been described, the present invention is not limited thereto.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

The method for transmitting and receiving a UE-specific reference signal and the apparatus for the same are applicable to various communication systems such as 3GPP LTE, LTE-A, IEEE 802, etc.

The invention claimed is:

1. A method for transmitting a user equipment (UE)-specific reference signal by a base station (BS) in a wireless communication system, the method comprising:
   generating, by the BS, a sequence of the UE-specific reference signal;
   mapping, by the BS, the UE-specific reference signal to resource elements (REs) using a predetermined pattern; and
   transmitting, by the BS, the UE-specific reference signal to a UE,
   wherein the predetermined pattern is a pattern in which the UE-specific reference signal is mapped to REs corresponding to indices including symbol indices 0, 3 and 6 in an even-numbered index slot in one resource block (RB) and mapped to REs corresponding to indices including symbol indices 2 and 5 in an odd-numbered index slot in the RB.

2. The method according to claim 1, wherein the predetermined pattern is applied to a subframe to which a normal cyclic prefix (CP) is applied.

3. The method according to claim 1, wherein the UE-specific reference signal is mapped to REs corresponding to subcarrier indices 1, 5 and 9 or subcarrier indices 3, 7 and 11 among the REs corresponding to the indices including the symbol indices 0, 3 and 6 in the predetermined pattern.

4. A method for transmitting a user equipment (UE)-specific reference signal by a base station (BS) in a wireless communication system, the method comprising:
   generating, by the BS, a sequence of the UE-specific reference signal;
   mapping, by the BS, the UE-specific reference signal to resource elements (REs) using a predetermined pattern; and
   transmitting, by the BS, the UE-specific reference signal to a UE,
   wherein the predetermined pattern is a pattern in which the UE-specific reference signal is mapped to REs corresponding to indices including symbol indices 1 and 4 per slot in one RB, and
   wherein the UE-specific reference signal is mapped to REs corresponding to subcarrier indices 2, 5, 6 and 11 among the REs corresponding to the indices including the symbol indices 1 and 4 in the predetermined pattern.

5. The method according to claim 4, wherein the predetermined pattern is applied to a subframe to which an extended CP is applied.

6. A base station (BS) for transmitting a user equipment (UE)-specific reference signal in a wireless communication system, the BS comprising:
   a processor configured to:
      generate a sequence of the UE-specific reference signal; and map the UE-specific reference signal to resource elements (REs) using a predetermined pattern; and
a transmitter configured to transmit the UE-specific reference signal to a UE,
wherein the predetermined pattern is a pattern in which the UE-specific reference signal is mapped to REs corresponding to indices including symbol indices 0, 3 and 6 in an even-numbered index slot in one resource block (RB) and mapped to REs corresponding to indices including symbol indices 2 and 5 in an odd-numbered index slot in the RB.

* * * * *